United States Patent
Nguyen et al.

(10) Patent No.: US 9,296,474 B1
(45) Date of Patent: Mar. 29, 2016

(54) CONTROL SYSTEMS WITH NORMALIZED AND COVARIANCE ADAPTATION BY OPTIMAL CONTROL MODIFICATION

(71) Applicant: The United States of America as Represented by the Administrator of the National Aeronautics & Space Administration (NASA), Washington, DC (US)

(72) Inventors: Nhan T. Nguyen, Santa Clara, CA (US); John J. Burken, Tehachapi, CA (US); Curtis E. Hanson, Lancaster, CA (US)

(73) Assignee: The United States of America as Represented by the Administrator of the National Aeronautics & Space Administration (NASA), Washington, DC (US)

( * ) Notice: Subject to any disclaimer, the term of this patent is extended or adjusted under 35 U.S.C. 154(b) by 376 days.

(21) Appl. No.: 13/956,736

(22) Filed: Aug. 1, 2013

Related U.S. Application Data

(60) Provisional application No. 61/798,236, filed on Mar. 15, 2013, provisional application No. 61/679,945, filed on Aug. 6, 2012.

(51) Int. Cl.
- *G05B 13/04* (2006.01)
- *H03H 21/00* (2006.01)
- *B64C 19/00* (2006.01)

(52) U.S. Cl.
CPC .............. *B64C 19/00* (2013.01); *G05B 13/048* (2013.01)

(58) Field of Classification Search
CPC ............... G05B 19/41835; G05B 2219/41232; G05B 2219/41217; G05B 13/027; H03H 21/0021
See application file for complete search history.

(56) References Cited

U.S. PATENT DOCUMENTS

| | | | | |
|---|---|---|---|---|
| 8,285,659 | B1* | 10/2012 | Kulkarni | G05B 17/02 244/76 R |
| 8,489,528 | B2* | 7/2013 | Chowdhary | G06N 3/08 706/21 |
| 2004/0176860 | A1* | 9/2004 | Hovakimyan | G05B 13/02 700/29 |
| 2006/0217819 | A1* | 9/2006 | Cao | G05B 13/027 700/28 |
| 2010/0030716 | A1* | 2/2010 | Calise | G05B 13/027 706/23 |
| 2010/0312365 | A1* | 12/2010 | Levin | G05B 19/41835 700/37 |

OTHER PUBLICATIONS

Nguyen, et al., An Optimal Control Modification to Mode . . . , Proceeds of AIAA Guidance, Navigation and Control Conference and Exhibit, Aug. 18-21, 2008, Honolulu, Hawaii.

(Continued)

*Primary Examiner* — Kenneth M Lo
*Assistant Examiner* — Sunray R Chang
(74) *Attorney, Agent, or Firm* — Christopher J. Menke; Robert M. Padilla; John F. Schipper

(57) ABSTRACT

Disclosed is a novel adaptive control method and system called optimal control modification with normalization and covariance adjustment. The invention addresses specifically to current challenges with adaptive control in these areas: 1) persistent excitation, 2) complex nonlinear input-output mapping, 3) large inputs and persistent learning, and 4) the lack of stability analysis tools for certification. The invention has been subject to many simulations and flight testing. The results substantiate the effectiveness of the invention and demonstrate the technical feasibility for use in modern aircraft flight control systems.

18 Claims, 35 Drawing Sheets

Adaptive Control System 100
Adaptive Control System with Optimal Modification Adaptive Law and Adaptive Gain Normalization Method

(56) References Cited

OTHER PUBLICATIONS

Nguyen, Robust Optimal Adaptive Control Method with Large Adaptive Gain, Proceeds of AIAA Infotech@Aerospace Conference, Apr. 6-9, 2009, Seattle, Washington.

Nguyen, et al., Optimal Control Modification for Robust Adaptation of Singula . . . , AIAA Guidance, Navigation, and Control Conference, Aug. 10-13, 2009, Chicago, Illinois.

Nguyen, Advances in Adaptive Control Methods, NASA Aviation Safety Technical Conference, Nov. 17-19, 2009, McLean, Virginia.

Nguyen, Asymptotic Linearity of Optimal Control Modification Adaptive Law with Analytical Sta . . . , Proceeds of AIAA Infotech@Aerospace, Apr. 20-22, 2010, Atlanta, Georgia.

Burken, et al., Adaptive Flight Control Design with Optimal Control Modification on an F-18 Aircraft Model, AIAA Infotech@ Aerospace, Apr. 20-22, 2010, Atlanta, Georgia.

Nguyen, Optimal Control Modification Adaptive Law for Time-Scale Separated Systems, NASA Publications, Jun. 30, 2010.

Nguyen, Verifiable Adaptive Control with Analytical Stability Margins by Optimal Control Modification, AIAA, Aug. 2, 2010.

Campbell, et al., An Adaptive Control Simulation Study using Pilot Handl . . . , AIAA Guidance, Navigation, and Control Conference, Aug. 2-5, 2010, Toronto, Ontario, Canada.

Hanson, et al., Handling Qualities Evaluations for Low Complexity Model Reference Adaptive Controllers for Reduced Pitch and Roll Damping Scenarios, AIAA, Jul. 18, 2011.

* cited by examiner

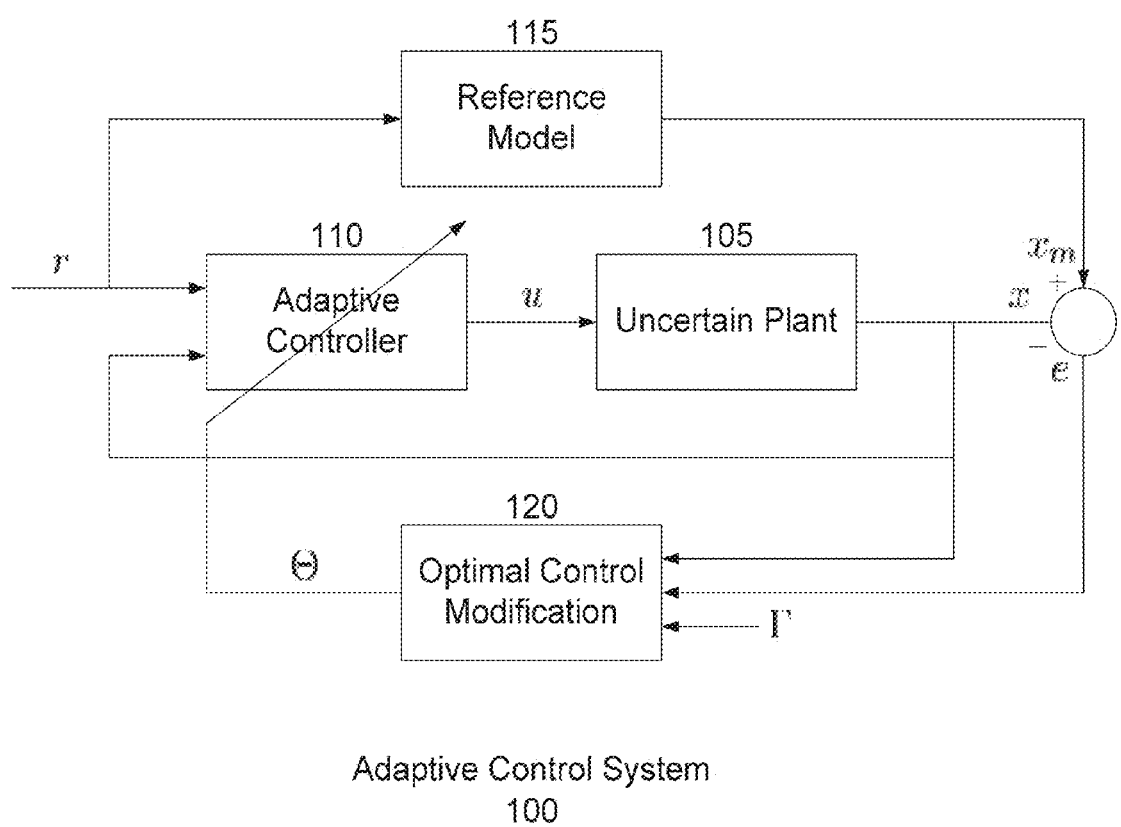
Fig. 1 - Adaptive Control System with Optimal Control Modification Adaptive Law

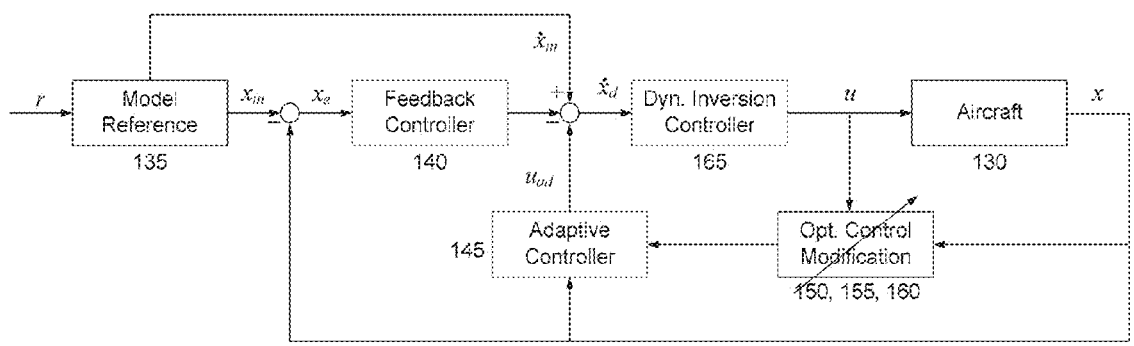
Fig. 2 - Adaptive Flight Control Architecture

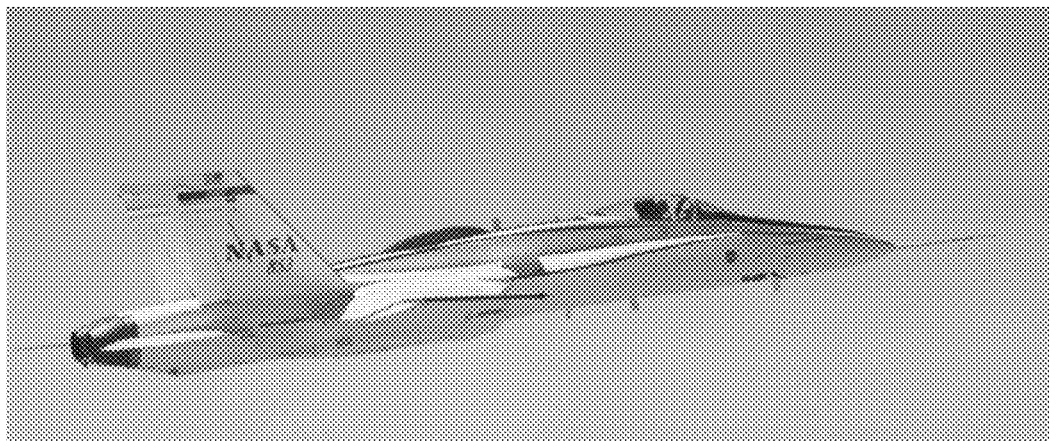
Fig. 3 - NASA F/A-18 Research Test Aircraft Tail Number 853

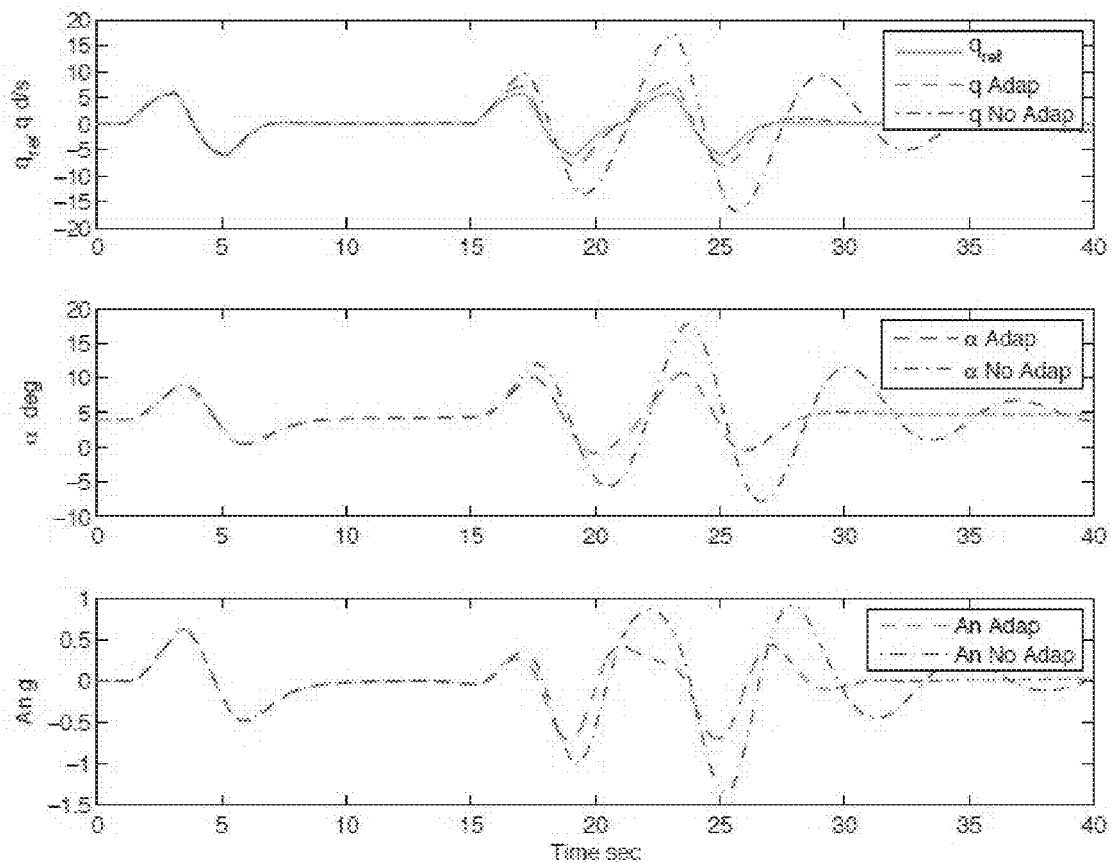
Fig. 4 - Time History of Longitudinal States due to an A-Matrix Failure ($C_{m\alpha}$ Shift at 13 sec) with and without Optimal Control Modification Adaptive Law 150

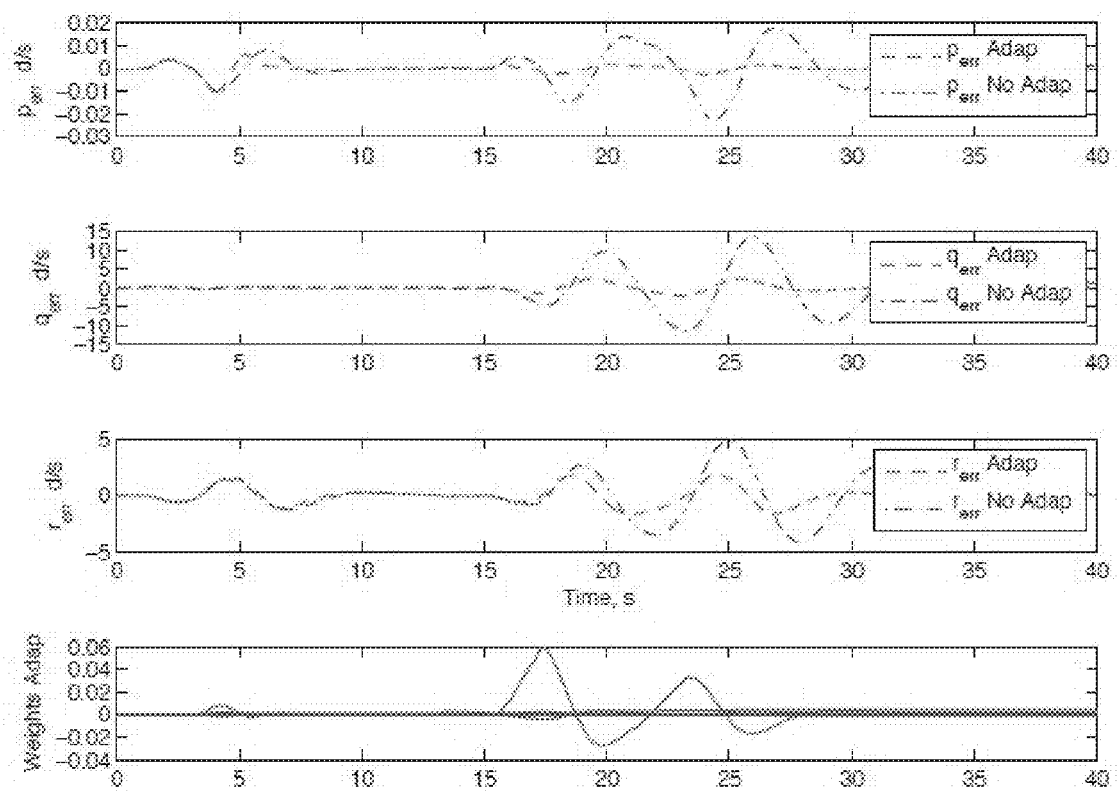
Fig. 5 - Time History of Tracking Errors due to an A-Matrix Failure ($C_{m\alpha}$ Shift at 13 sec) with and without Optimal Control Modification Adaptive Law 150

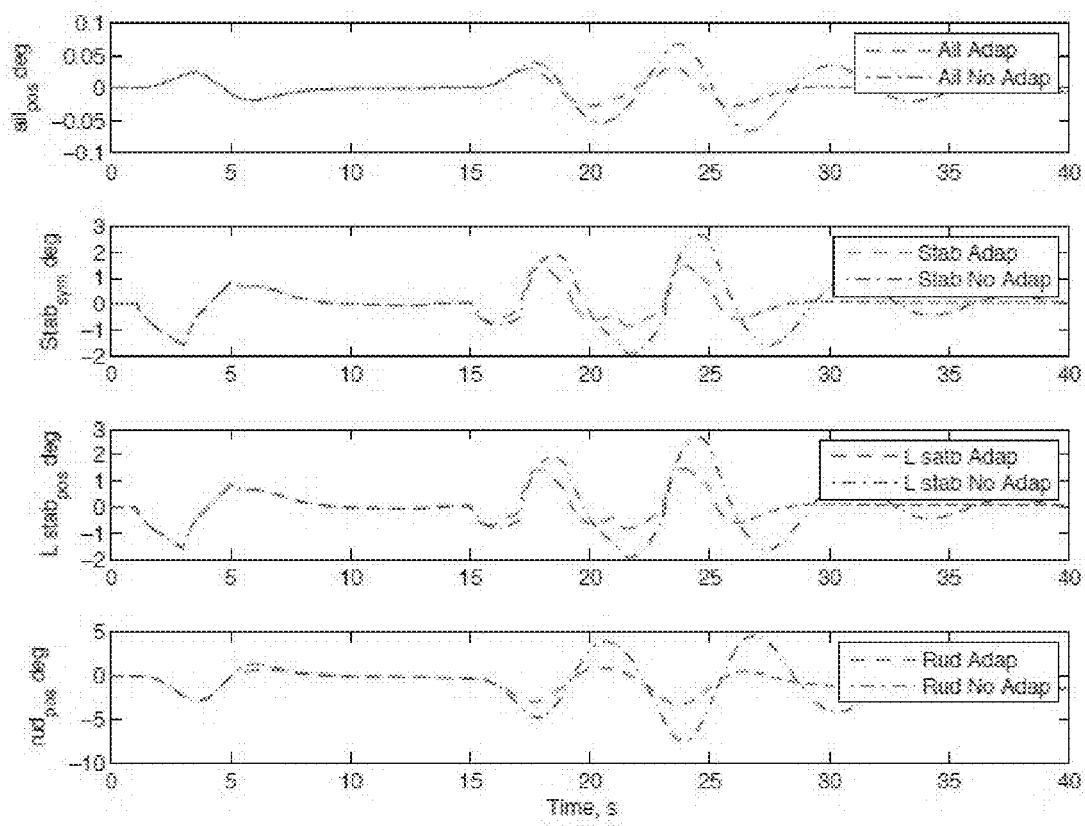
Fig. 6 - Time History of Control Surfaces due to an A-Matrix Failure ($C_{m\alpha}$ Shift at 13 sec) with and without Optimal Control Modification Adaptive Law 150

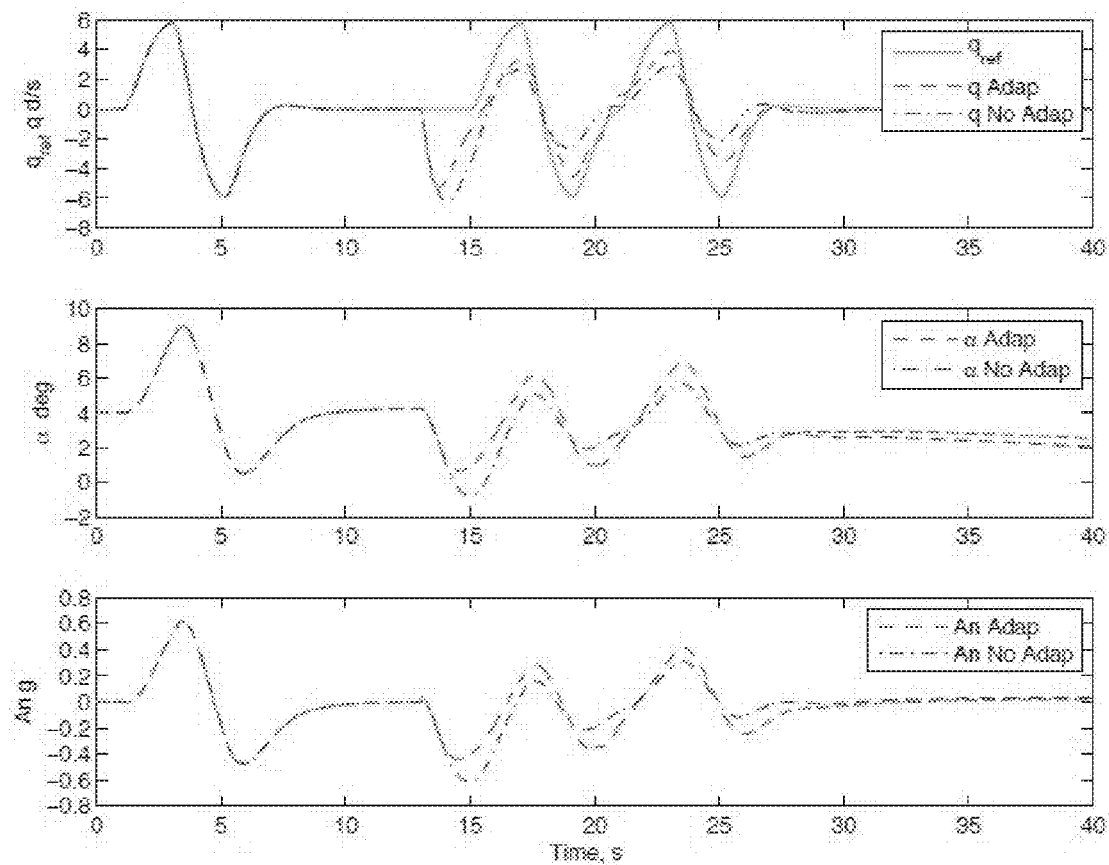
Fig. 7 - Time History of Longitudinal States due to a B-Matrix Failure (Stabilator Jammed at 2.5° at 13 sec) with and without Optimal Control Modification Adaptive Law 150

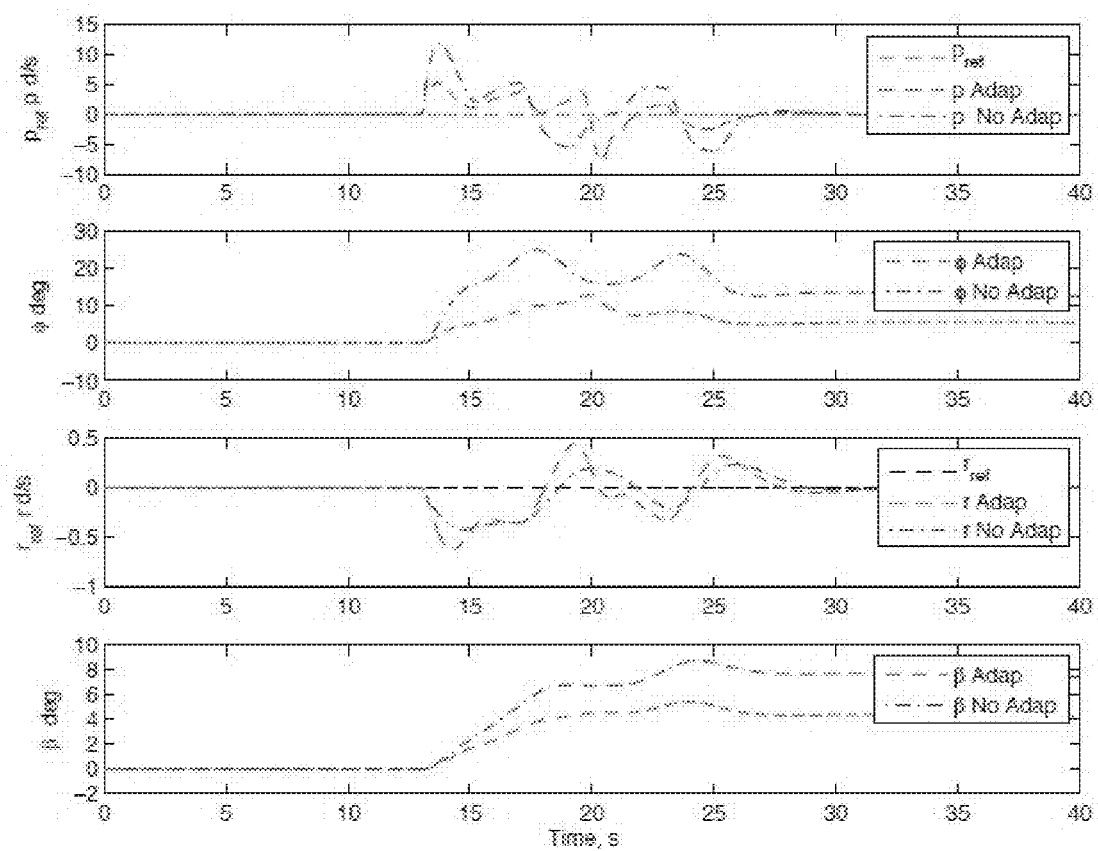
Fig. 8 - Time History of Lateral-Directional States due to a B-Matrix Failure (Stabilator Jammed at 2.5° at 13 sec) with and without Optimal Control Modification Adaptive Law 150

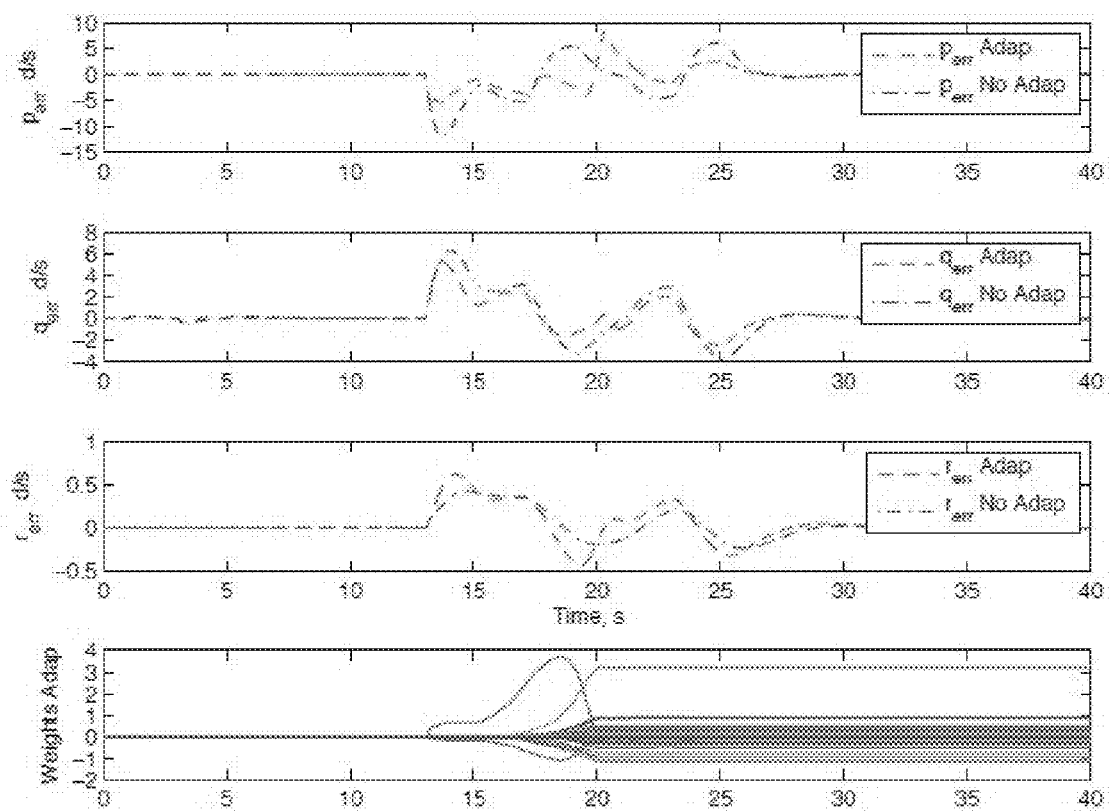
Fig. 9 - Time History of Tracking Errors due to a B-Matrix Failure (Stabilator Jammed at 2.5° at 13 sec) with and without Optimal Control Modification Adaptive Law 150

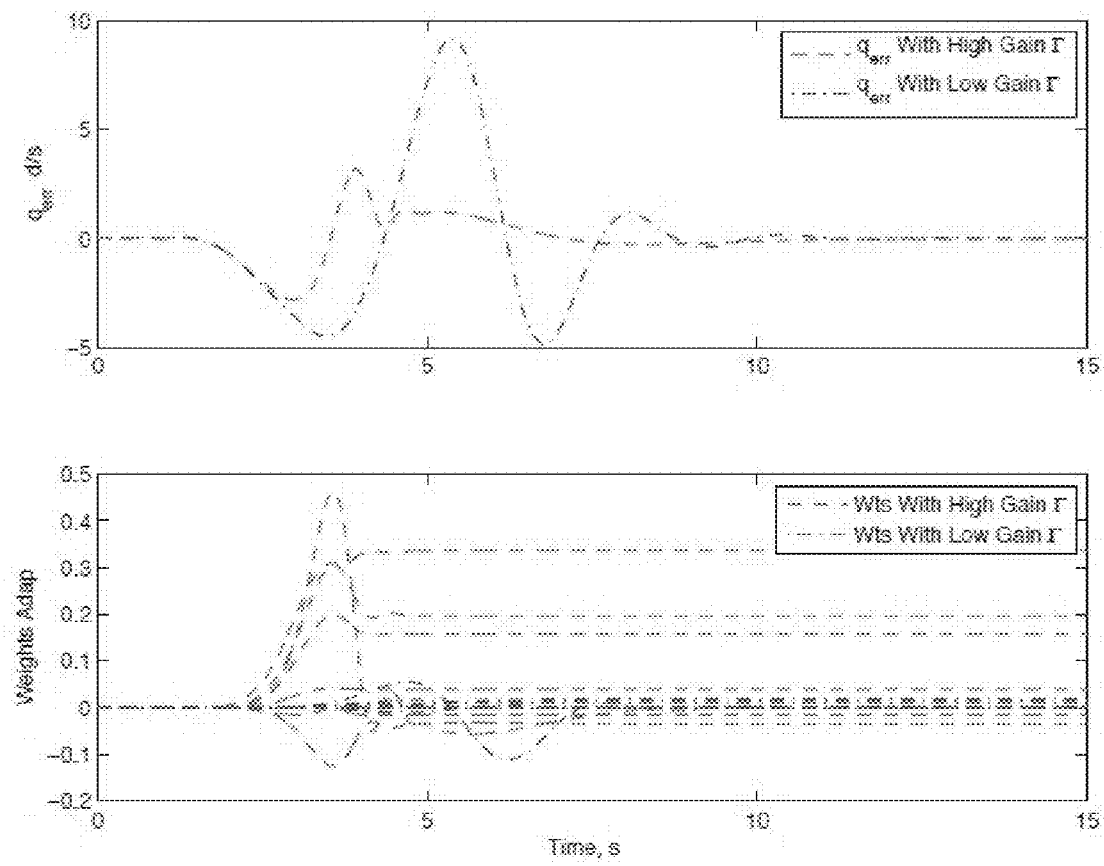
Fig. 10 - Time History of Pitch Rate Error and Weights due to an A-Matrix Failure ($C_{m\alpha}$ Shift at 2 sec) with Optimal Control Modification Adaptive Law 150 ($\Gamma$=0.5 and $\Gamma$=50 with Fixed $\nu$=1)

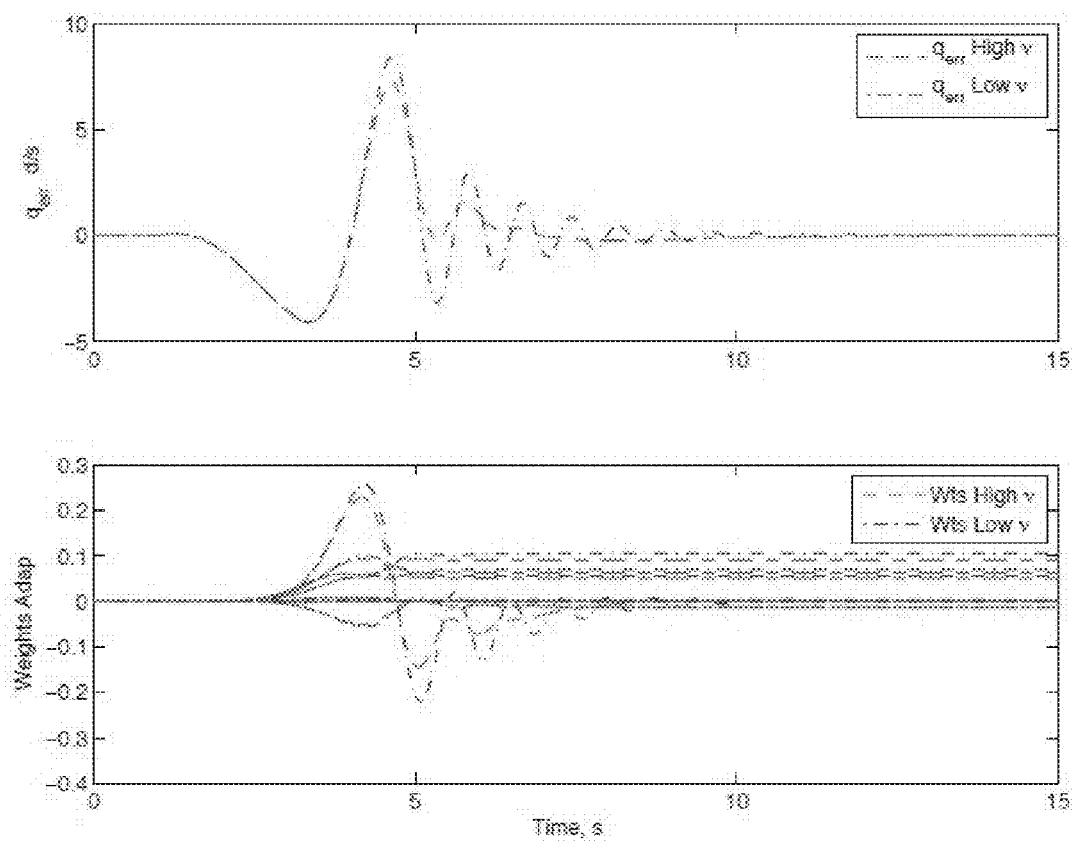
Fig. 11 - Time History of Pitch Rate Error and Weights due to an A-Matrix Failure ($C_{m\alpha}$ Shift at 2 sec) with Optimal Control Modification Adaptive Law 150 (Fixed $\Gamma$=5 with $\nu$=0.25 and $\nu$=1)

Fig. 12 - Advanced Concept Flight Simulator at NASA Ames Research Center

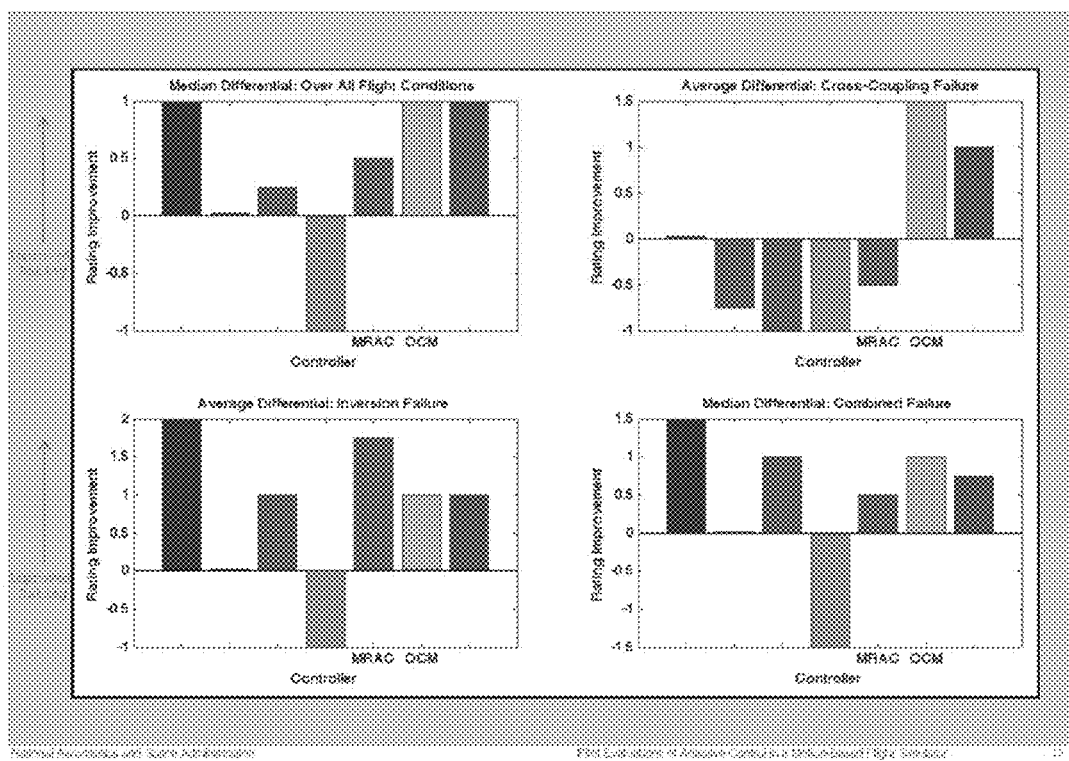
Fig. 13 - Pilot Cooper-Harper Ratings of Adaptive Flight Controllers in Advanced Concept Flight Simulator

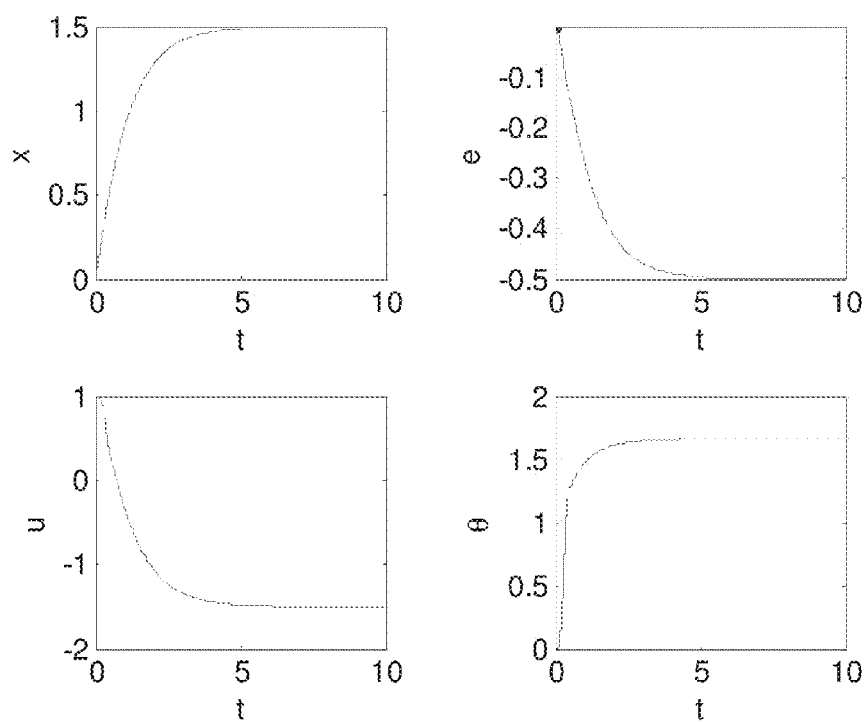
Fig. 14 - Adaptive Control System with Optimal Control Modification Adaptive Law with $t_d$=0.0020 sec

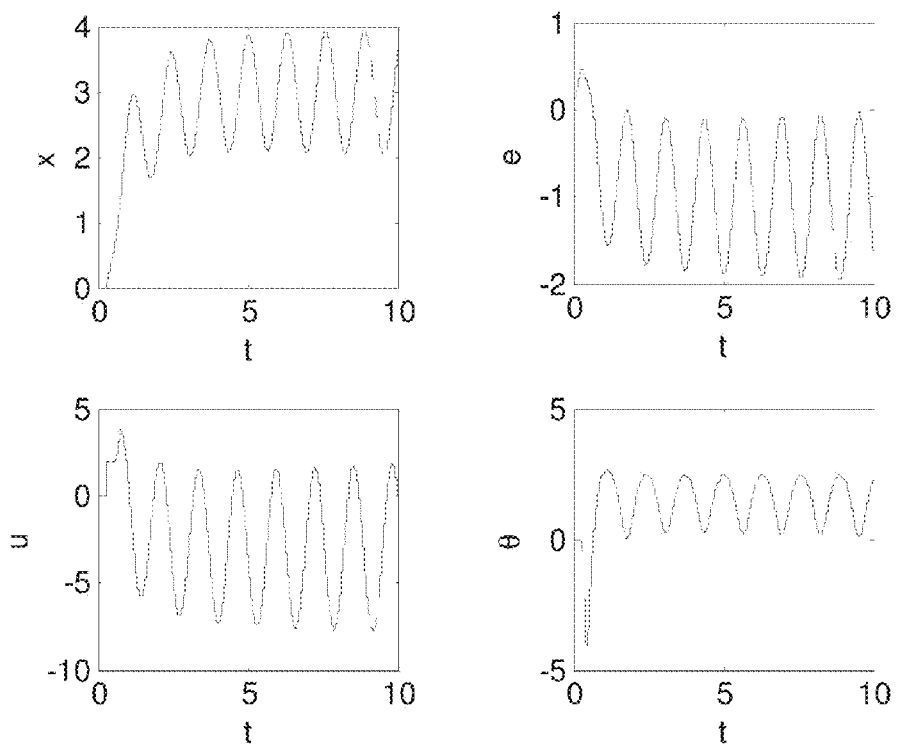
Fig. 15 - Adaptive Control System with Optimal Control Modification Adaptive Law with td=0.2795 sec

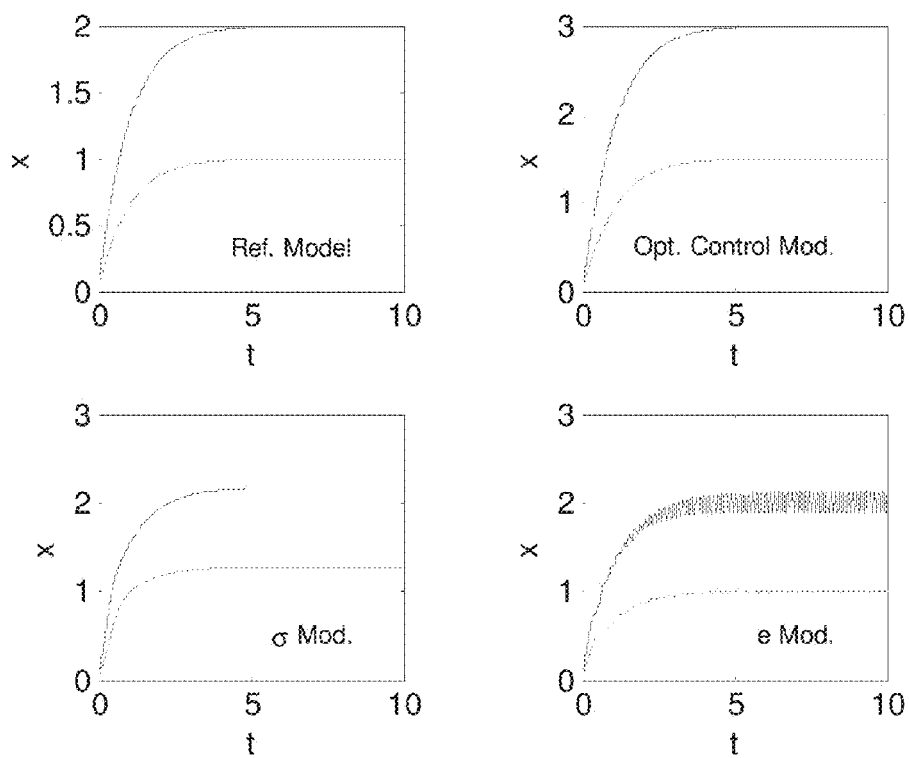
Fig. 16 - Scaled Input-Output Property of Adaptive Control

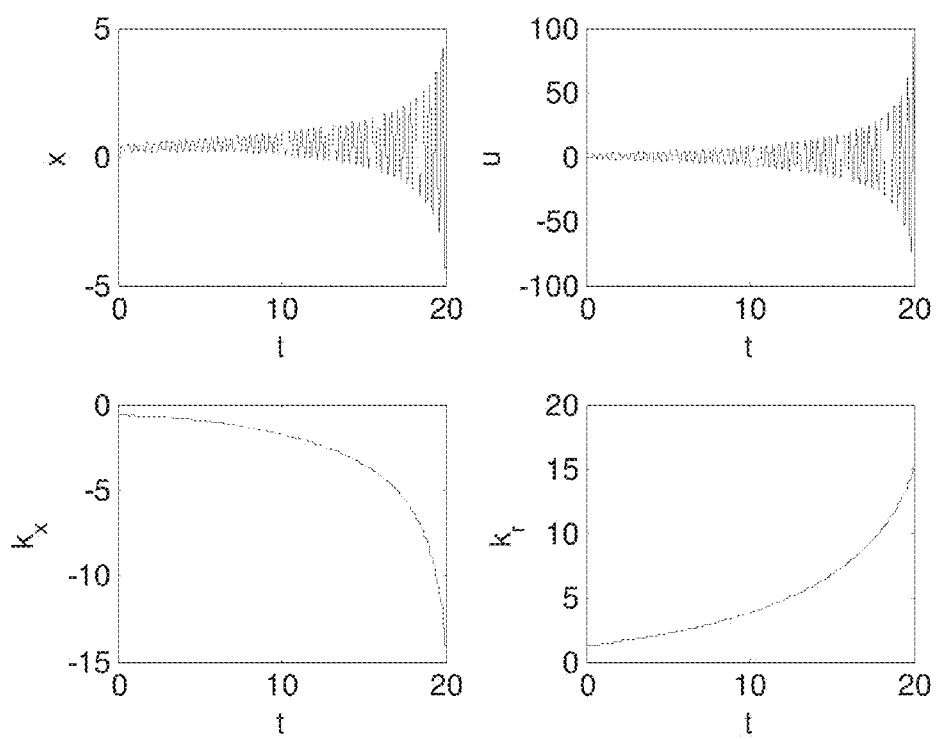
Fig. 17 - Instability of MRAC by Rohrs Counterexample

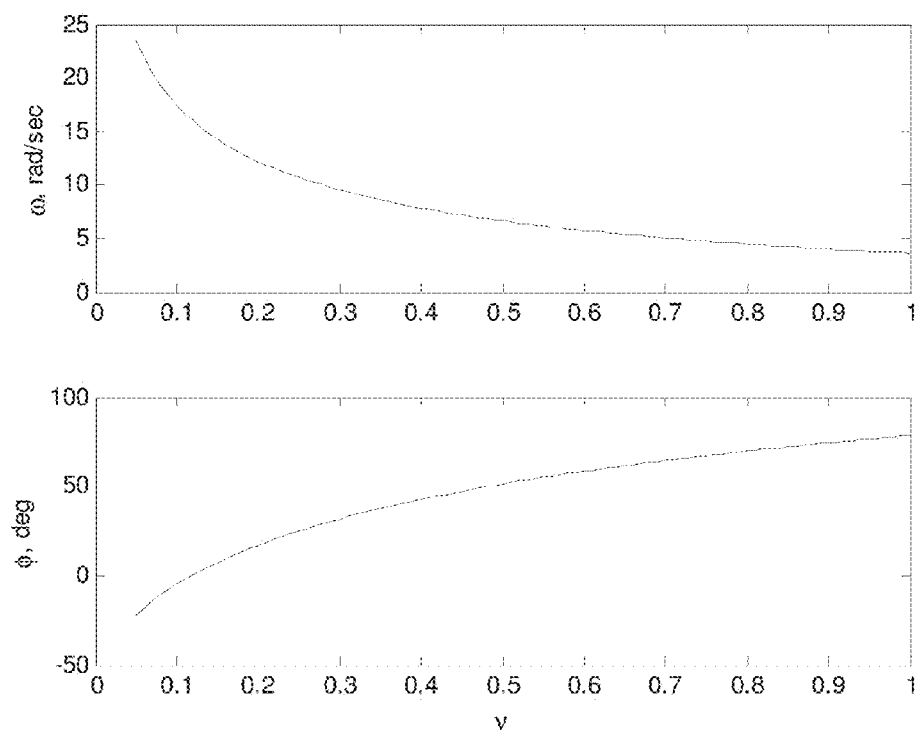
Fig. 18 - Phase Margin and Cross-Over Frequency of Rohrs Counterexample Computed from Linear Asymptotic Property of Optimal Control Modification Adaptive Law

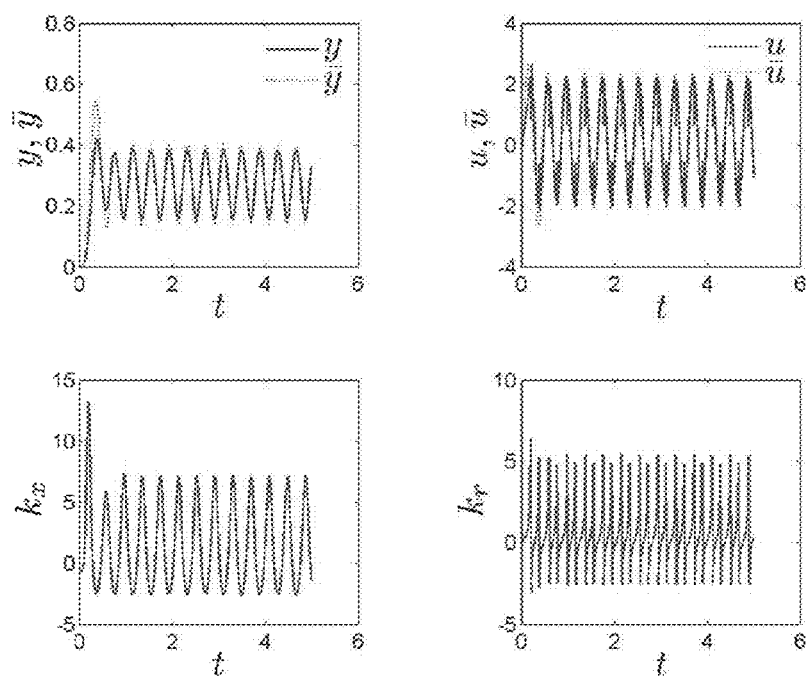
Fig. 19 - Closed-Loop Response of Rohrs Counterexample with Optimal Control Modification Adaptive Law

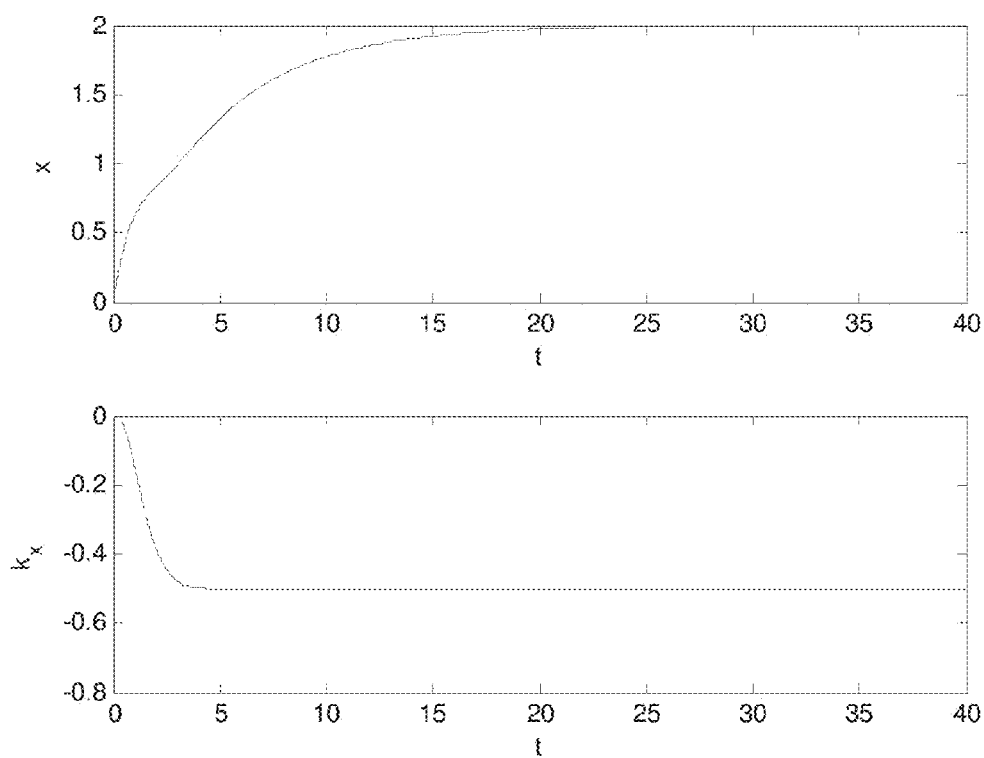
Fig. 20 - Non-Minimum Phase Adaptive Control System with Optimal Control

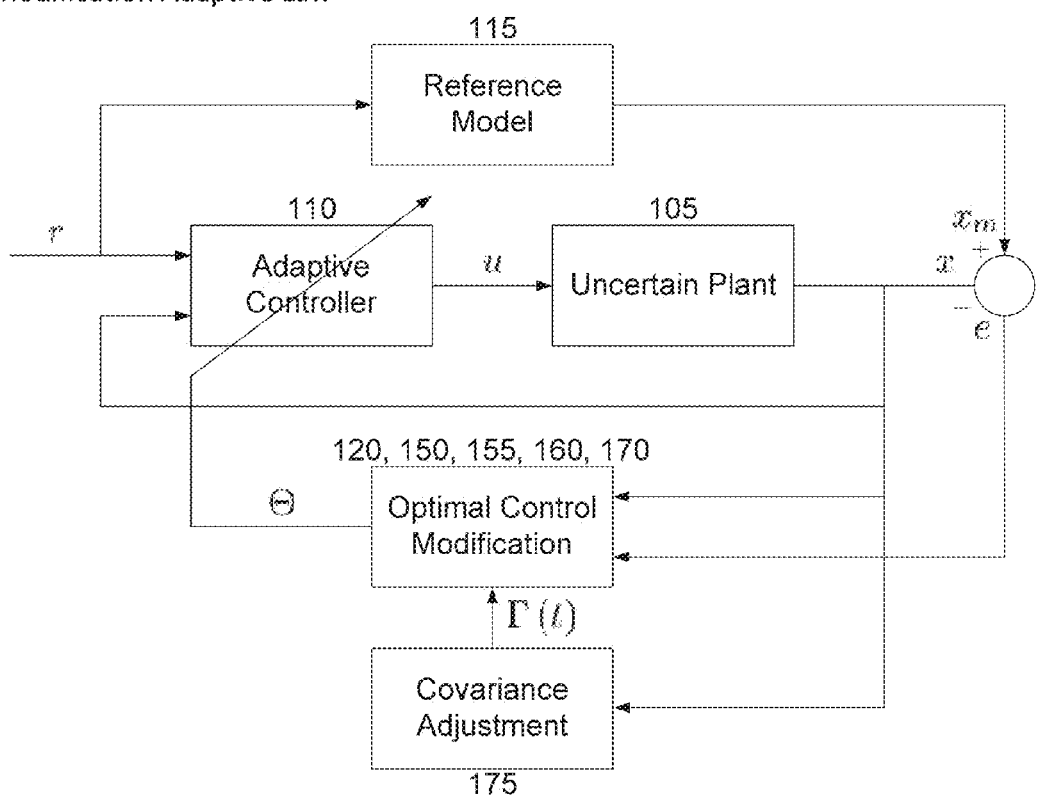
Fig. 21 - Adaptive Control System with Optimal Modification Adaptive Law and Covariance Adaptive Gain Adjustment Method

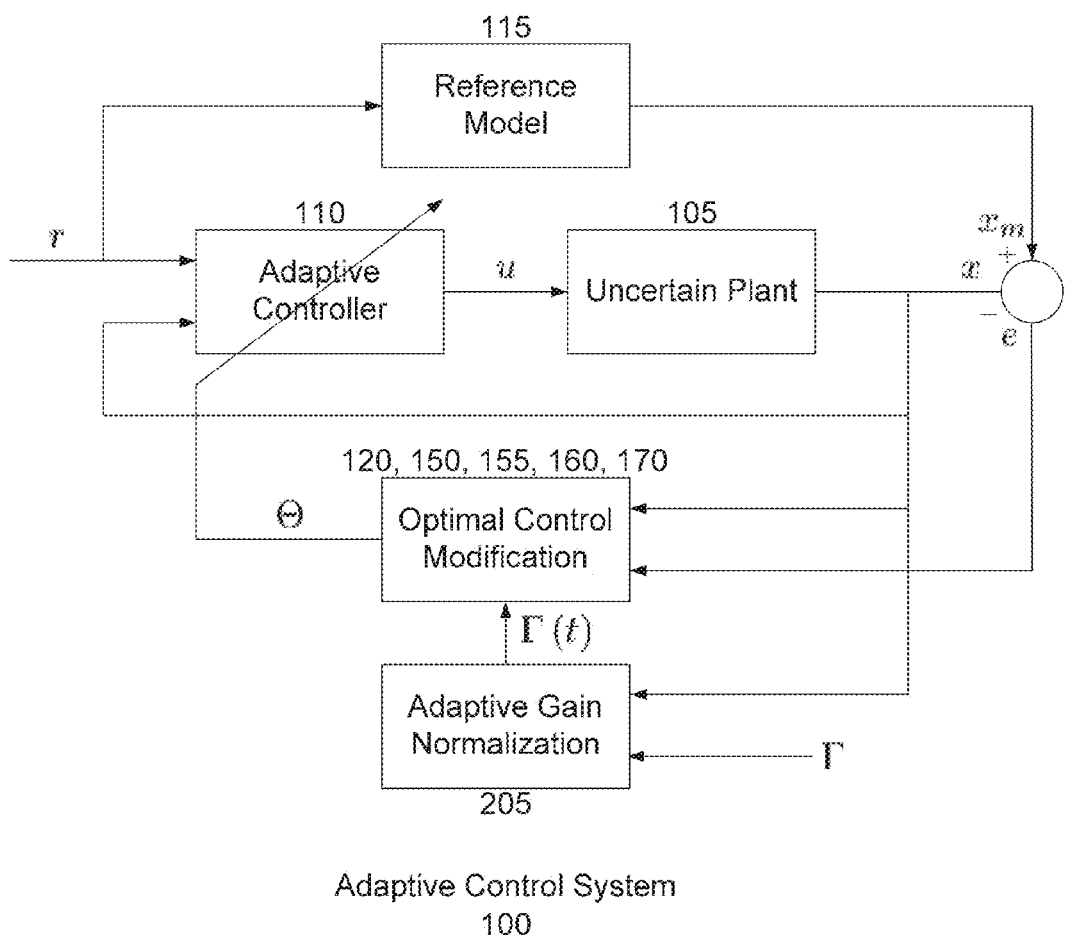
Fig. 22 - Adaptive Control System with Optimal Modification Adaptive Law and Adaptive Gain Normalization Method

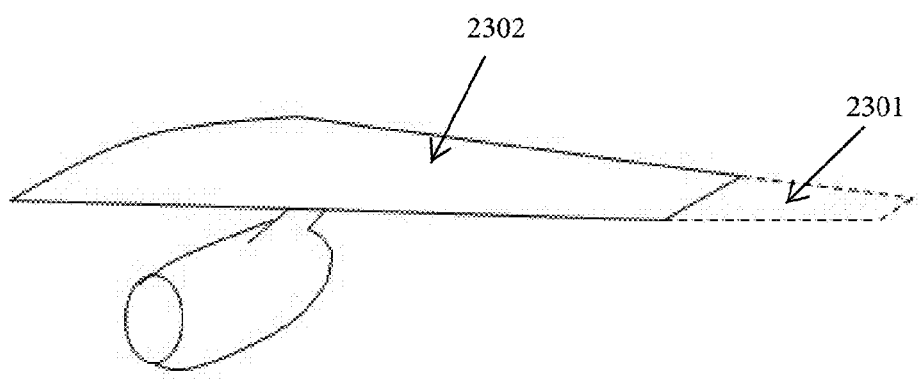
Fig. 23 - Left Wing Damaged, Generic Transport Aircraft

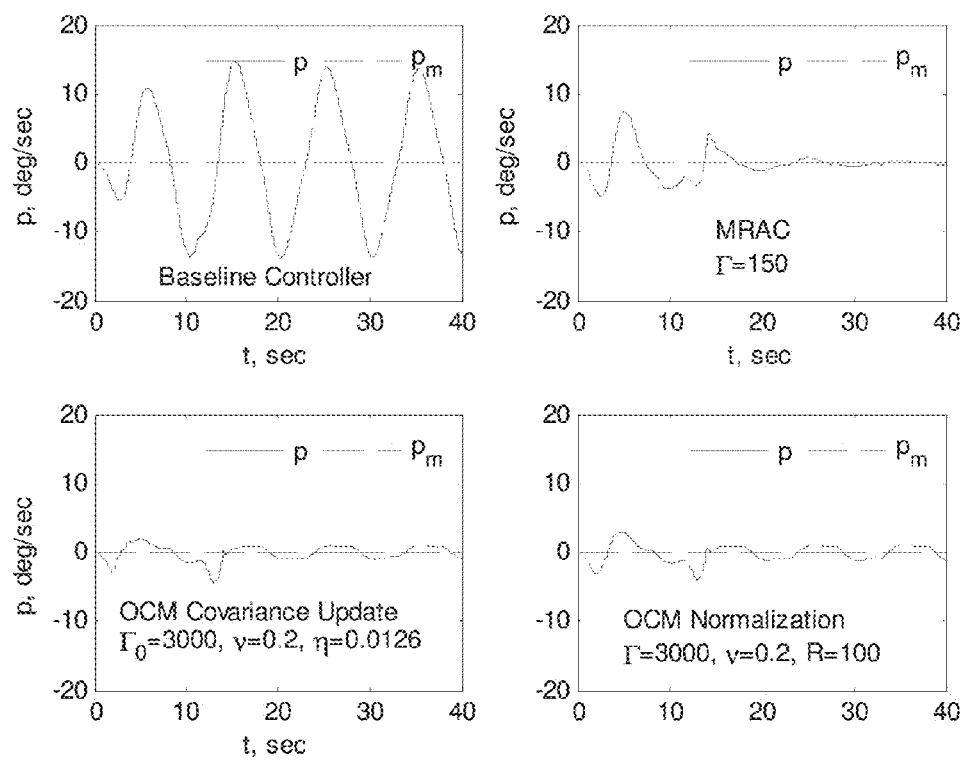
Fig. 24 - Roll Rate Responses due to Left Wing Damage

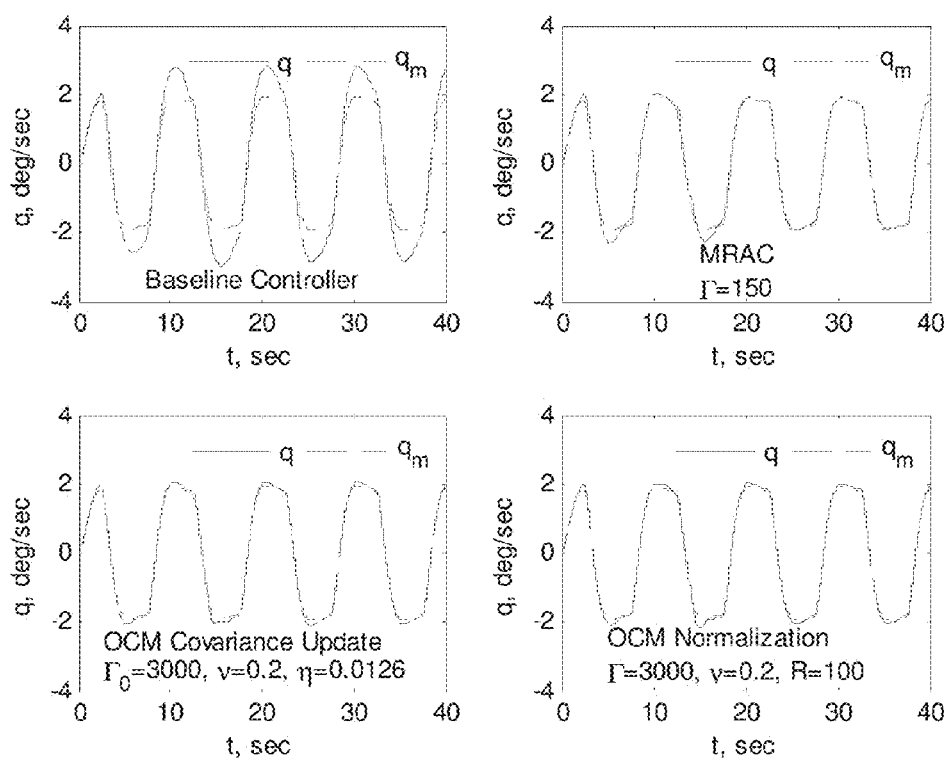
Fig. 25 - Pitch Rate Responses due to Left Wing Damage

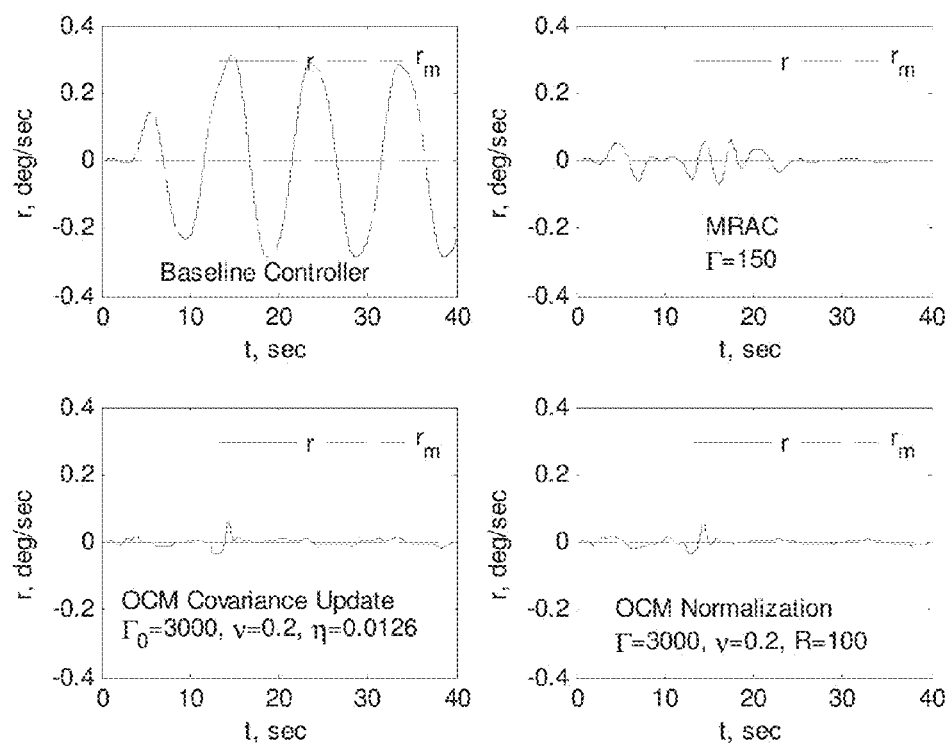
Fig. 26 - Yaw Rate Responses due to Left Wing Damage

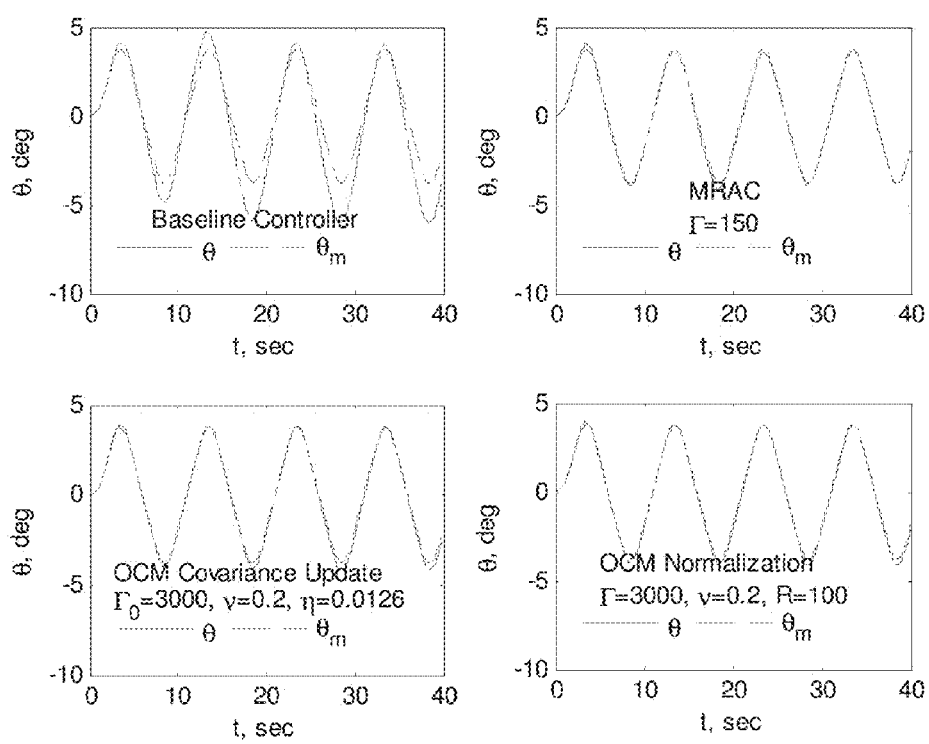
Fig. 27 - Pitch Angle Responses due to Left Wing Damage

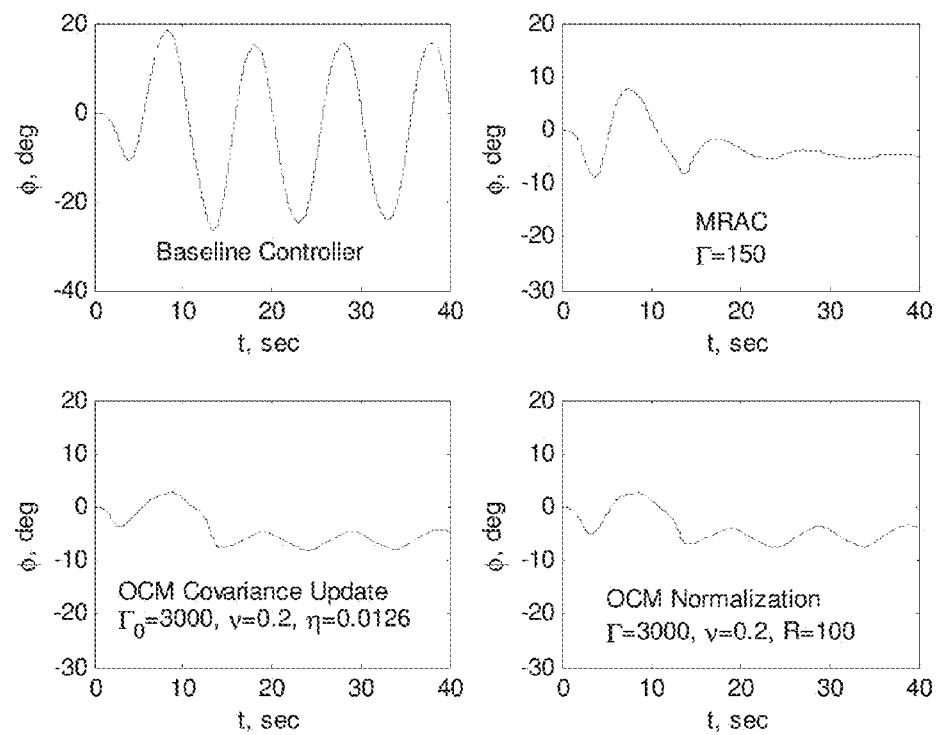
Fig. 28 - Bank Angle Responses due to Left Wing Damage

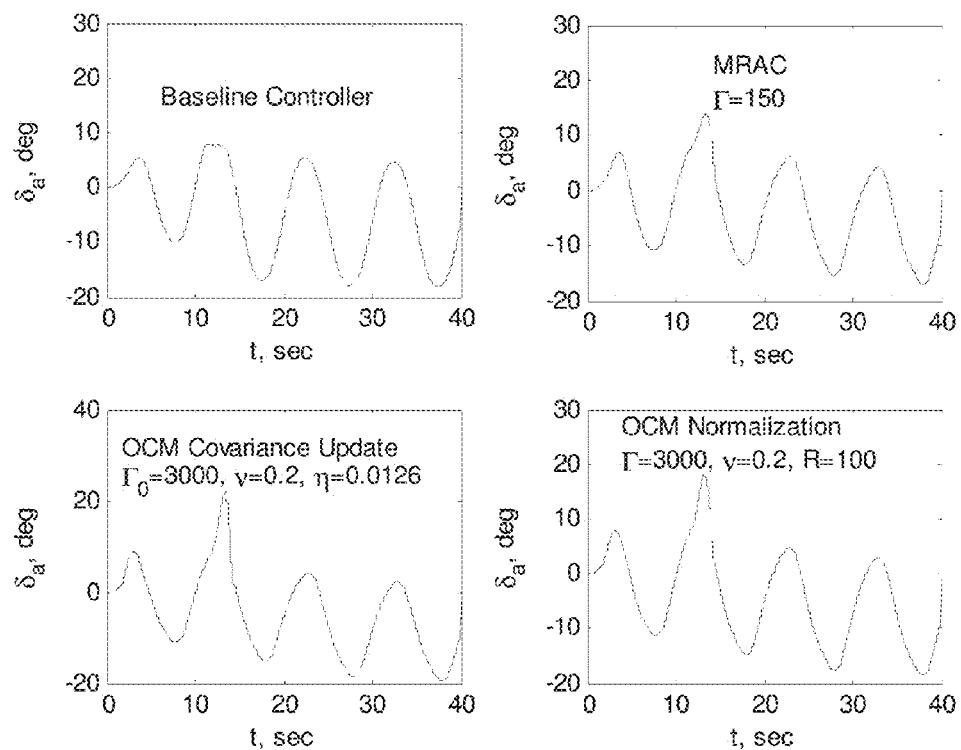
Fig. 29 - Aileron Deflection Responses due to Left Wing Damage

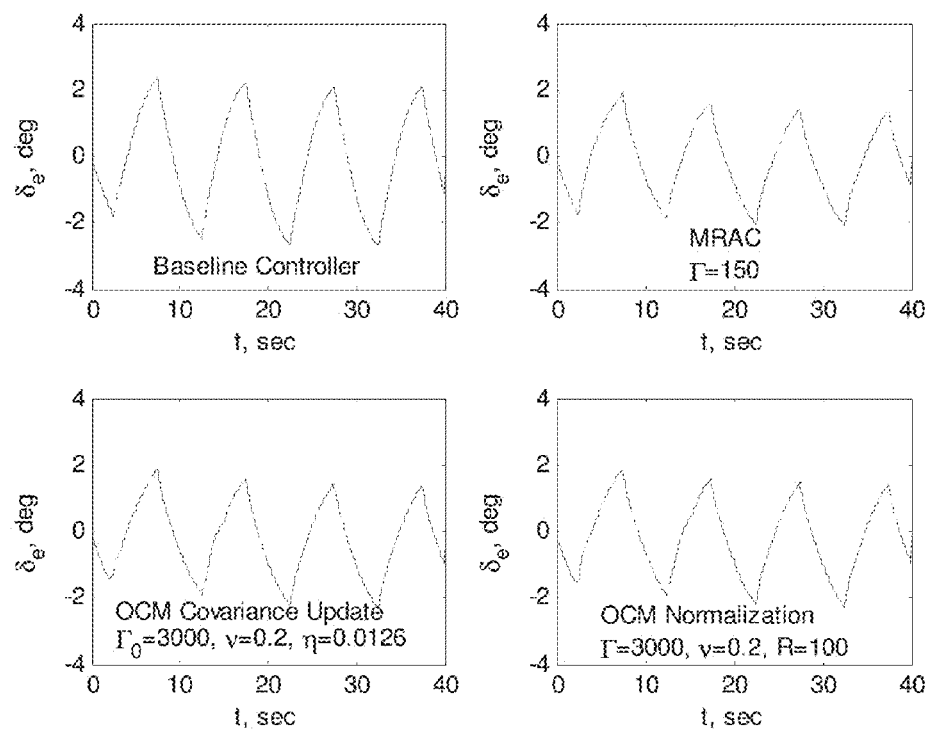
Fig. 30 - Elevator Deflection Responses due to Left Wing Damage

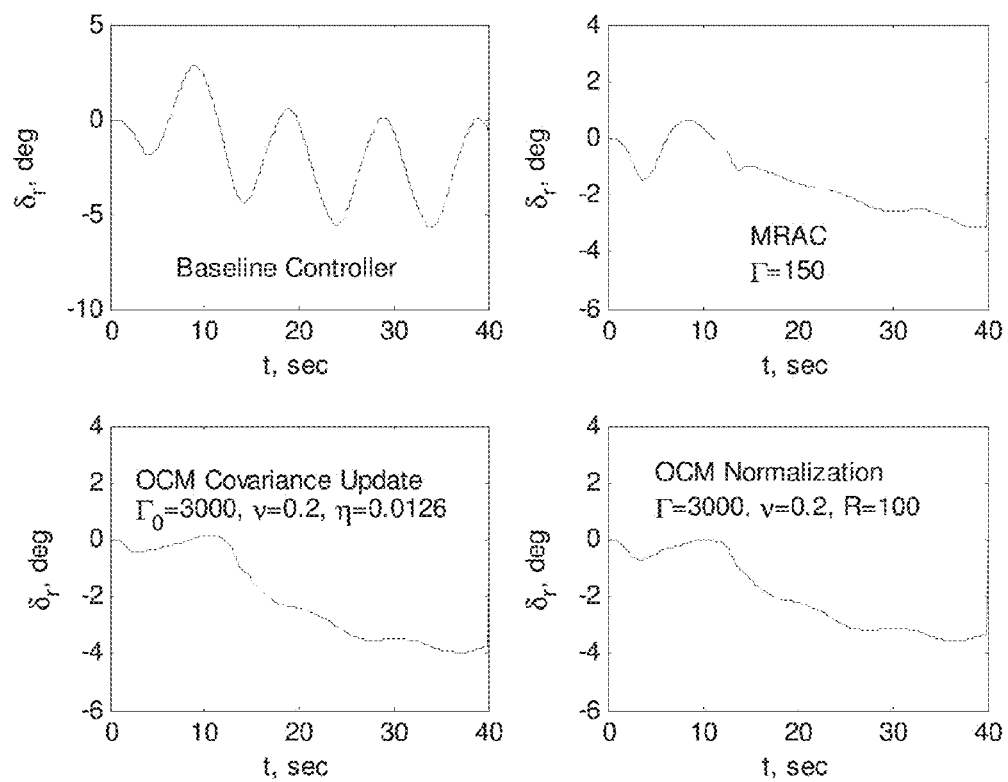
Fig. 31 - Rudder Deflection Responses due to Left Wing Damage

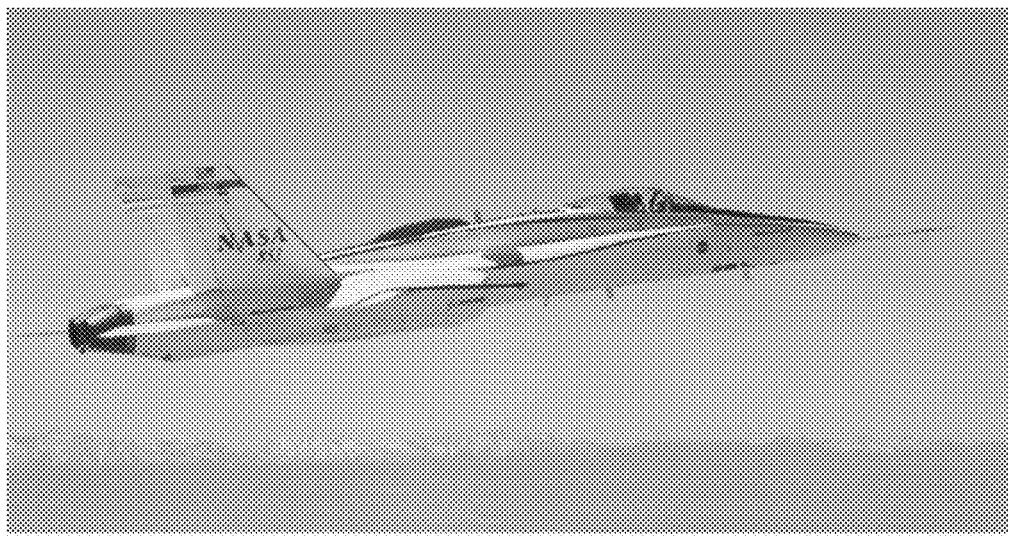
Fig. 32 - NASA Full-scale Advanced Systems Testbed (FAST) F/A-18 Aircraft

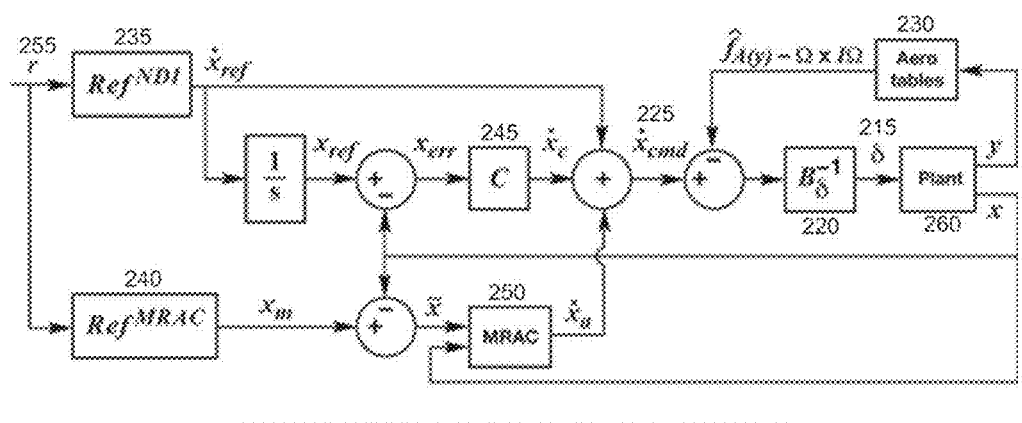
Fig. 33 - Nonlinear Dynamic Inversion Adaptive Flight Control System

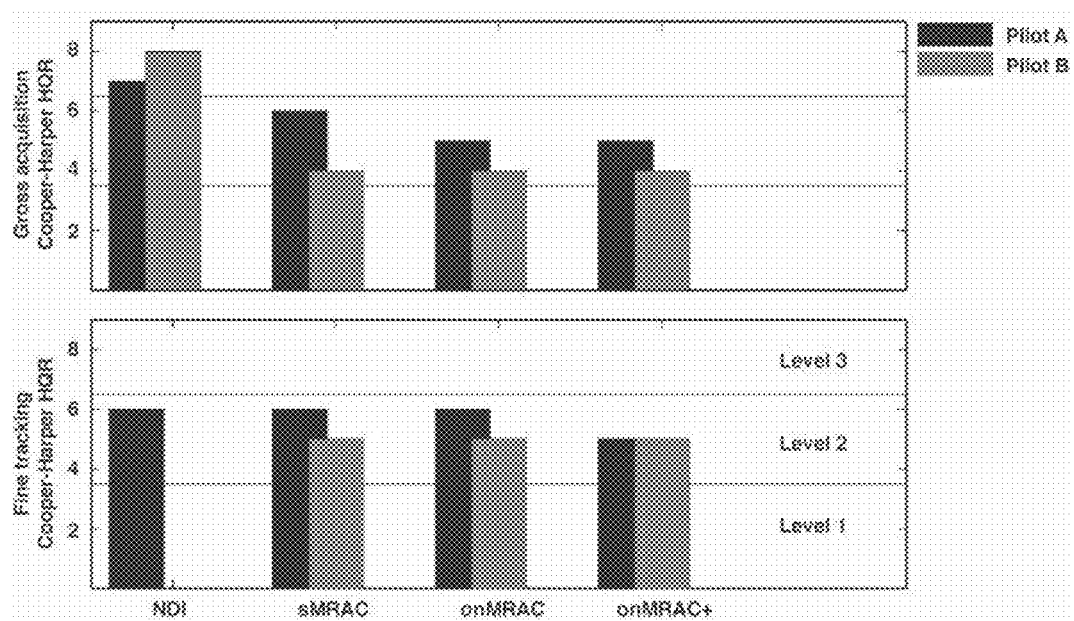
Fig. 34 - Handling Qualities Ratings for 2-g Tracking Task with Reduced Pitch Damping Failure

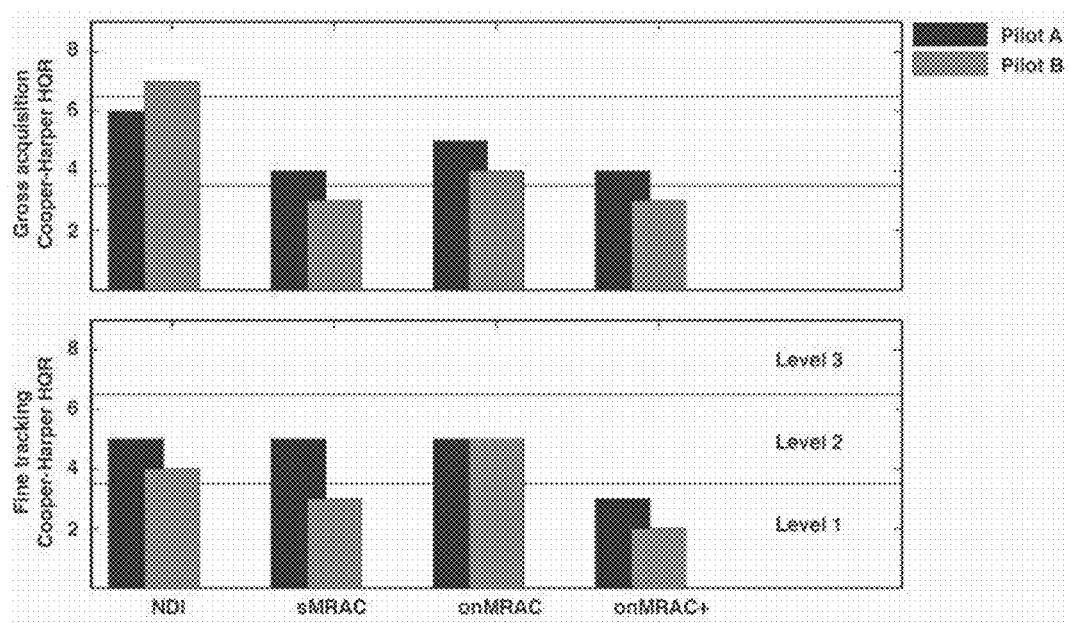
Fig. 35 - Handling Qualities Rating for Formation Tracking Task with Reduced Roll Damping Failure ved employees ofthe United States Government may be manufactured and...

CONTROL SYSTEMS WITH NORMALIZED AND COVARIANCE ADAPTATION BY OPTIMAL CONTROL MODIFICATION

CROSS-REFERENCE TO RELATED APPLICATIONS

The present invention is based upon and claims priority from prior U.S. Provisional Patent Application No. 61/679,945, filed on Aug. 6, 2012 and U.S. Provisional Patent Application No. 61/798,236, filed on Mar. 15, 2013, the entire disclosure of which are herein incorporated by reference in their entirety.

ORIGIN OF INVENTION

The invention described herein was made by employees of the United States Government and may be manufactured and used by or for the Government of the United States of America for governmental purposes without the payment of any royalties thereon or therefore.

BACKGROUND

The present invention relates to control systems for dynamic systems and more specifically to adaptive control systems for an aircraft or, more generally, a flight vehicle.

Feedback control systems are used to control and improve stability of many physical systems such as flight vehicles. Conventional feedback controls are typically designed using a set of constant-value control gains. As a physical system operates over a wide range of operating conditions, the values of the control gains are scheduled as a function of system parameters. This standard approach is known as gain-scheduled feedback control. A conventional feedback control system generally requires a full knowledge of a physical system for which the control system is designed. Under off-nominal operating conditions when a system experiences failures, damage, degradation, or otherwise adverse events, a conventional feedback control system may no longer be effective in maintaining performance and stability of the system.

Adaptive control has been developed to provide a mechanism for changing control gains on line by adaptation to the system uncertainty. Thus, one advantage of adaptive control is its ability to control a physical system that undergoes significant, but unknown changes in the system behaviors. The ability to adjust control gains online makes adaptive control an attractive technology that has been receiving a lot of interests in the industry. Yet, despite the potential benefits, adaptive control has not been accepted as a mature technology which can be readily certified for deployment in mission-critical, safety-critical or human-rated systems such as aircraft flight control systems. A number of challenges presently exist such as the following:

One of problem that has not been well addressed is the adverse effect of persistent excitation. In a nutshell, persistent excitation is a condition that relates to the richness of input signals to a control system. During adaptation, some degree of persistent excitation must exist in an input signal to enable a human operator or an adaptive control system to learn and adapt to the changing environment. However, an excessive degree of persistent excitation can adversely affect stability of the system. The possibility of excessive persistent excitation can exist in off-nominal systems with human operators in the loop who sometimes can unknowingly create persistently exciting large input signal in order to rapidly adapt to the changing environment.

Another important problem that exists in adaptive control is the complex nature of the input-output signals, which are inherently nonlinear. The complex, nonlinear input-output mapping of many adaptive control methods can lead to an unpredictable behavior of a control system. To this extent, an operator cannot learn from a past response to predict what a future response will be. In contrast, a linear input-output mapping is highly desirable since the knowledge from a past response can be used to predict a future response. Consequently, adaptive control systems tend to be unpredictable and inconsistent in their behaviors. The predictability of a control system is a crucial element in the operation of a control system that involves a human operator such as an aircraft pilot or an automobile driver. Unpredictability can result in over-actuated or under-actuated control signals which both can lead to undesirable outcomes and potentially catastrophic consequences.

The sensitivity of adaptive control systems to large inputs and persistent learning is another important consideration. Because of the nonlinear behaviors, large inputs can lead to deleterious effects on adaptive control systems. A physical system may be stable when small amplitude inputs are used in adaptive control, but the same system can become unstable when the input amplitude increases. The amplitude of an input can be difficult to control because it can be generated by a human operator like a pilot. Persistent learning is referred to the process of constant adaptation to small error signals. In some situations, when an adaptive control system has achieved sufficient performance, the adaptation process needs to be scaled down. Maintaining a constant state of fast adaptation even after the errors have diminished can result in persistent learning. At best, persistent learning would do nothing to further improve the performance. At worst, persistent learning reduces robustness of an adaptive control system by constantly adapting to small error signals.

The most fundamental issue is the lack of metrics to assess stability of an adaptive control system. Currently, there are no well-established metrics or methods for analyzing thereof that can satisfy conventional certification requirements for adaptive control. Unlike conventional classical linear control which is endowed with many important and useful tools for analyzing performance and stability certification requirements of a closed-loop system, adaptive control suffers a disadvantage of the lack thereof. Consequently, there is currently no fielded adaptive control system certified for use in any production system.

A distinct feature of a typical adaptive control design is the ad-hoc, trial-and-error nature of the design process which involves selecting suitable design parameters such as the adaptive gain, or adaptation rate, without analytical methods for guiding the design. A trial-and-error design process may enable an adaptive control system to work well under a design conditions, but by the same token may fail to work well under other conditions. As a result, this ad-hoc process tends to make the design of adaptive control to be particularly difficult to implement by general practitioners of control systems.

There exist several robust modification adaptive control methods. The two most popular conventional methods are the σ-modification and the e-modification. Both or these methods were established in the 1980's. The σ-modification adaptive control provides a constant damping mechanism to limit the adaptation process from becoming unstable, and the e-modification provides a damping mechanism that is proportional to the norm of the tracking error signal to accomplish the same. The projection method is another popular method that is used to bound adaptive parameters to prevent issues with persistent learning. As with most adaptive control methods, the aforementioned challenges exist in one form or another.

BRIEF SUMMARY

A novel method for improving performance and stability of control systems has been developed. This method represents a significant advancement in the state-of-the art in adaptive control technology. The present invention discloses a new type of adaptive control law, called optimal control modification, which blends two control technologies together: optimal control and adaptive control. Unlike the prior art, the present invention provides: 1) the introduction of a damping mechanism that is proportional to a property known as persistent excitation to improve robustness of adaptation in the presence of persistently exciting signals, 2) the existence of linear asymptotic properties that make the method well suited for design and analysis for performance and stability guarantee, and 3) the use of a time-varying adaptive gain by two methods: normalization and covariance adjustment to further improve stability of the control systems in the presence of time delay and unmodeled dynamics.

The method has gone through a series of validation process ranging from many desktop aircraft flight control simulations to a pilot evaluation in high-fidelity motion-based Advanced Concept Flight Simulator at NASA Ames that culminated in a recent flight test program on a NASA F/A-18A research test aircraft. The successful pilot-in-the-loop flight test of the optimal control method on the NASA F/A-18A aircraft represents the further point in technology validation at NASA. No other adaptive control method in the field is presently known to have gone through a validation process this far that involves flight testing on a human-rated high-performance aircraft.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 1 illustrates a block diagram of an adaptive control system with the optimal control modification adaptive law as taught by the present invention;

FIG. 2 illustrates a block diagram of a dynamic inversion adaptive flight control architecture;

FIG. 3 is a photograph of the NASA F/A-18 research test aircraft, tail number 853; which is the subject aircraft for the application of the present invention;

FIG. 4 is the plot of the time history of the longitudinal states due to an A-matrix failure ($C_{m_\alpha}$ shift at 13 sec) in the NASA F/A-18 model with and without the optimal control modification adaptive law;

FIG. 5 is the plot of the time history of the tracking errors due to an A-matrix failure ($C_{m_\alpha}$ shift at 13 sec) in the NASA F/A-18 model with and without the optimal control modification adaptive law;

FIG. 6 is the plot of the time history of the control surfaces due to an A-matrix failure ($C_{m_\alpha}$ shift at 13 sec) in the NASA F/A-18 model with and without the optimal control modification adaptive law;

FIG. 7 is the plot of the time history of the longitudinal states due to a B-matrix failure (stabilator jammed at 2.5° at 113 sec) in the NASA F/A-18 model with and without the optimal control modification adaptive law;

FIG. 8 is the plot of the time history of the lateral-directional states due to a B-matrix failure (stabilator jammed at 2.5° at 13 sec) in the NASA F/A-18 model with and without the optimal control modification adaptive law;

FIG. 9 is the plot of the time history of the tracking errors due to a B-matrix failure (stabilator jammed at 2.5° at 13 sec) in the NASA F/A-18 model with and without the optimal control modification adaptive law;

FIG. 10 is the plot of the time history of the pitch rate error and weights due to an A-matrix failure ($C_{m_\alpha}$ shift at 2 sec) in the NASA F/A-18 model with the optimal control modification adaptive law ($\Gamma$=0.5 and $\Gamma$=50 with fixed $\nu$=1);

FIG. 11 is the plot of the time history of the pitch rate error and weights due to an A-matrix failure ($C_{m_\alpha}$ shift at 2 sec) in the NASA F/A-18 model with the optimal control modification adaptive law (Fixed $\Gamma$=5 with $\nu$=0.25 and $\nu$=1);

FIG. 12 is a photograph of the Advanced Concept Flight Simulator at NASA Ames Research Center in which a pilot study was conducted to evaluate the optimal control modification adaptive law among six other adaptive controllers;

FIG. 13 is the pilot Cooper-Harper Ratings of the seven adaptive flight controllers evaluated by 8 NASA test pilots in the Advanced Concept Flight Simulator;

FIG. 14 is the plot of the response of a first-order SISO plant with the optimal control modification adaptive law with a time delay $t_d$=0.0020 sec showing the agreement between the analytical values and the numerical values of the steady state error and the equilibrium value of the adaptive parameter;

FIG. 15 is the plot of the response of a first-order SISO plant with the optimal control modification adaptive law with a time delay $t_d$=0.2795 sec showing the agreement between the analytical value and the numerical value of the time-delay margin;

FIG. 16 is the plot of the response of the same first-order SISO plant with the optimal control modification adaptive law showing the existence of a scaled input-output property of the optimal control modification adaptive law and the lack thereof of the prior art $\sigma$-modification and e-modification;

FIG. 17 is the plot of the response of the first-order SISO plant with unmodeled dynamics in the Rohrs counterexample illustrating the instability phenomenon of standard model-reference adaptive control;

FIG. 18 is the plot of the phase margin and the cross-over frequency of the Rohrs counterexample as analytically computed from the linear asymptotic property of the optimal control modification adaptive law as taught by the present invention;

FIG. 19 is the plot of the response of the first-order SISO plant with unmodeled dynamics in the Rohrs counterexample of Rohrs Counterexample showing stability and the agreement between the analytically predicted output and the numerically computed output with the optimal control modification adaptive law;

FIG. 20 is the plot of the response of a non-minimum phase first-order SISO plant illustrating an analytical method for computing the modification parameter $\nu$ to ensure stable adaptation for a non-minimum phase plant;

FIG. 21 illustrates an adaptive control system with the optimal control modification adaptive law that further includes the covariance adaptive gain adjustment method as taught by the present invention;

FIG. 22 illustrates an adaptive control system with the optimal control modification adaptive law that further includes the adaptive gain normalization method as taught by the present invention;

FIG. 23 illustrates a partial left wing tip damage, which is the subject aircraft for the application of the present invention;

FIG. 24 is the plot of the roll rate responses due to the left wing damage for four different flight controllers;

FIG. 25 is the plot of the pitch rate responses due to the left wing damage for four different flight controllers;

FIG. 26 is the plot of the yaw rate responses due to the left wing damage for four different flight controllers;

FIG. 27 is the plot of the pitch angle responses due to the left wing damage for four different flight controllers;

FIG. 28 is the plot of the bank angle responses due to the left wing damage for four different flight controllers;

FIG. 29 is the plot of the aileron deflection responses due to the left wing damage for four different flight controllers;

FIG. 30 is the plot of the elevator deflection responses due to the left wing damage for four different flight controllers;

FIG. 31 is the plot of the rudder deflection responses due to the left wing damage for four different flight controllers;

FIG. 32 is a photograph of the NASA Full-scale Advanced Systems Testbed (FAST) F/A-18 research test aircraft, tail number 853;

FIG. 33 is the block diagram of the nonlinear dynamic inversion adaptive flight control system implemented on NASA FAST aircraft employing the optimal control modification adaptive law with the adaptive gain normalization;

FIG. 34 is the plot of the handling qualities ratings for a 2-g tracking task with a reduced pitch damping failure; and FIG. 35 is the plot of the handling qualities rating for a formation tracking task with a reduced roll damping failure.

DETAILED DESCRIPTION

The present invention addresses the current problems in adaptive control technology with a novel adaptive control method, called optimal control modification which blends two control technologies together: optimal control and adaptive control. The key features that differentiate this invention from the prior art are: 1) the introduction of a damping mechanism that is proportional to property known as persistent excitation to improve robustness of adaptation in the presence of persistently exciting signals, 2) the linear asymptotic linear property that makes the method more amenable to performance and stability analysis in a linear context, and 3) the use of a time-varying adaptive gain by two methods: normalization and covariance adjustment to further improve stability of the control systems in the presence of time delay and unmodeled dynamics.

The present invention addresses specifically to current challenges with adaptive control in these areas: 1) persistent excitation, 2) complex nonlinear input-output mapping, 3) large inputs and persistent learning, and 4) the lack of stability analysis tools for certification. The invention has been subject to many simulations and flight testing. The results substantiate the effectiveness of the invention and demonstrate the technical feasibility for use in modem aircraft flight control systems.

The present invention successfully addresses the existing problems with the following unique features:

The optimal control modification provides robustness to persistently exciting input signals by adding a damping mechanism proportional to the persistent excitation quantity. Thus, as a persistently exciting input signal is applied to allow an adaptive control system to learn, the present invention will provide an effective damping mechanism to counteract any adverse effects of persistent excitation that can lead to instability.

An important key enabling feature of the present invention is the linear asymptotic property. For a linear plant with uncertainty, the optimal control modification approaches asymptotically to a linear control system under fast adaptation. The condition of fast adaptation means that the rate at which the adaptive parameters rule estimated by the optimal control modification is sufficiently large relative to the rate of the system response. With fast adaptation, the behavior of the optimal control modification is asymptotically linear. This feature is the most unique attribute as compared to any other existing conventional adaptive control methods, with the exception of the L1 adaptive control. This feature affords a number of advantages. First and foremost, the optimal control modification substantially reduces the complex nonlinear input-output mapping of conventional adaptive control methods. The asymptotic linear property therefore makes the present invention much more predictable and consistent in its performance.

Another key feature of the optimal control modification is the use of normalization or covariance adjustment of time-varying adaptive gain to reduce adverse effects of large amplitude inputs and persistent learning. The normalization effectively modifies the adaptive gain by dividing the adaptive gain by the squares of the input amplitudes, so that the optimal control modification is much less sensitive to large amplitude inputs. As a result, the optimal control modification can achieve a significant increase in stability margins. Another method for improving stability margins by eliminating or reducing persistent learning is the covariance adjustment method. During adaptation, the covariance adjustment method continuously adjusts the adaptation rate or adaptive gain from an initial large value toward a final lower value. Thus, once the adaptation has achieved its objective of restoring performance, a large adaptive gain is no longer needed and therefore should be reduced. As a result, a significant increase in robustness is attained.

In regards to the lack of metrics for stability and methods for analyzing thereof, the linear asymptotic property of the optimal control modification affords an important advantage. Stability of conventional model-reference adaptive control generally decreases with increasing the adaptive gain. In the limit, a stability margin of the standard model-reference adaptive control tends to zero as the adaptive gain becomes infinitely large. With fast adaptation, the adaptive gain is assumed to be infinitely large or much larger than the rate of the system response. Then, the optimal control modification tends to a linear control system. The feedback control system in the limit behaves as a linear control system, unlike most conventional adaptive control methods. Because the feedback control system is asymptotically linear, there exist many well-accepted metrics for analyzing stability of such systems. These stability metrics are used in many well-established control system specifications such as MIL-SPEC. Moreover, there are many widely available methods for analyzing stability of linear control systems. Thus, the present invention can potentially address the lack of a certification process for adaptive control by leveraging the linear asymptotic property to enable adaptive control based on the present invention to be analyzed using well-established metrics for stability and methods for analyzing thereof.

This innovation is expected to have a wide range of commercial potential applications in aerospace industry, transport vehicle industry, etc. In particular, flight control is one area of major interest and high potential applications. Aviation industry which may be interested in this technology includes Boeing, Honeywell, and others. NASA aviation safety research as well as space launch vehicle system development could be potential users of this technology.

Optimal Control Modification Adaptive Control

Learning is an optimization process that attempts to reconstruct a model of a system which operates in an uncertain environment. The optimization process is designed to minimize the error between the model of the system and the actual observed behaviors of the system. The optimality of the process results in a mathematical law that describes the adaptation or learning process. Therefore, the notion of optimization is a fundamental principle of system identification or parameter estimation techniques which can be viewed as an adaptation process.

The notion of optimization is generally not considered in the standard model-reference adaptive control. The parameter estimation process based on the standard model-reference adaptive control approach is usually driven by the error between the reference model outputs and the actual system outputs, known as tracking error. The learning or adaptive law is effectively a nonlinear parameter estimation process. Asymptotic tracking, which is referred to the tracking error tending to zero in the limit, is an ideal behavior of the standard model-reference adaptive control which can be achieved if the structure of the uncertainty is known. However, with uncertainty with unknown structures or unmodeled dynamics, the standard model-reference adaptive control can become unstable.

Parameter drift is a numerical phenomenon in adaptive control that results in a blow-up of adaptive parameters. This blow-up is caused by the ideal behavior of asymptotic tracking of the standard model-reference adaptive control which results in infinite adaptive parameters in an attempt of seeking a zero tracking error in the limit. This can be mathematically illustrated by a simple control system expression:

$$\dot{x} = ax + bu + w \quad (1)$$

$$u = -k_x(t)x \quad (2)$$

where $k_x(t)$ is an adaptive feedback gain which can be computed by the standard model-reference adaptive control.

For a sufficient large disturbance, the standard model-reference adaptive control attempts to generate a high-gain control in order to reduce the effect of the disturbance. In the limit, the steady-state solution of x is obtained as $$\lim_{t \to \infty} x = -\frac{w}{a - k_x(t)} \quad (3)$$

In order to seek a zero solution in the limit, $k_x(t)$ must tend to a very large value in the limit. Thus, the standard model-reference adaptive control can cause $k_x(t)$ to become unbounded. In practice, a high-gain control with a large value of $k_x(t)$ can be problematic since real systems can include other closed-loop behaviors that can lead to instability when k(t) becomes large. Thus, parameter drift can lead to instability in practical applications.

As the complexity of a control systems increases, robustness of adaptive control becomes increasingly difficult to ascertain. By definition, robustness is the ability for a control system to remain stable in the presence of unstructured uncertainty and or unmodeled dynamics. In practical applications, the knowledge of a real system can never be established exactly. Thus, a mathematical model of a physical system often cannot fully capture all the real, but unknown effects due to unstructured uncertainty and or unmodeled dynamics. All these effects can produce unstable closed-loop dynamics using the standard model-reference adaptive control.

The present invention takes advantage of the notion of optimization or optimal control to improve robustness of adaptive control by means of the development novel adaptive control method called optimal control modification. The optimization framework is posed as a minimization of the $L_2$ norm of the tracking error bounded away from the origin by a finite distance. This distance is a measure of robustness. Thus, the optimization is designed explicitly to trade away the ideal property of asymptotic tracking of the standard model-reference adaptive control for improved robustness by minimizing the following cost function:

$$J = \lim_{t \to \infty} \frac{1}{2} \int_0^{t_f} (e - \Delta)^T Q(e - \Delta) dt \quad (4)$$

where e(t) is the tracking error and $\Delta(t)$ is an unknown lower bound of the tracking error, which represents a distance from the origin.

By avoiding asymptotic tracking, the present invention can achieve improved robustness while maintaining sufficient performance with bounded tracking error. In fact, almost all conventional robust adaptive control methods achieve bounded tracking as opposed to asymptotic tracking in exchange for improved robustness. Unlike many conventional robust adaptive control methods, the present invention accounts for bounded tracking explicitly in an optimization framework.

To further elucidate the novelty of the present invention, refer to FIG. 1 which illustrates an adaptive control system 100 of the present invention. The adaptive control system 100 further comprises a nonlinear plant 105, an adaptive controller 110, a reference model 115, and an optimal control modification adaptive law 120 as taught by the present invention.

The nonlinear plant 105 with a matched uncertainty and an unmatched disturbance is described mathematically as $$\dot{x} = Ax + B[u + \Theta^{*T}\Phi(x)] + w \quad (5)$$

where x(t) is a state vector, u(t) is a control vector, A and B are known matrices such that the pair (A,B) is controllable, $\Theta^*$ is an unknown constant ideal weight matrix that represents a parametric uncertainty, $\Phi(x)$ is a vector of known basis functions that are continuous and at least in $C^1$, and w(t) is a bounded disturbance with an upper bound $w_0$.

The feedback adaptive controller 110 represented by u(t), is designed to achieve a command-following objective as $$u = -K_x x + K_r r - u_{ad} \quad (6)$$

where r(t) is a bounded command vector, $K_x$ is a stable feedback gain matrix such that $A - BK_x$ is Hurwitz, $K_r$ is a command feedforward gain matrix, and $u_{ad}(t)$ is an adaptive control signal of the present invention which estimates the parametric uncertainty in the plant as $$u_{ad} = \Theta^T \Phi(x) \quad (7)$$

where $\Theta(t)$ is an estimate of the parametric uncertainty $\Theta^*$.

The adaptive controller 110 is designed to follow the reference model 115 which is defined as $$\dot{x}_m = A_m x_m + B_m r \quad (8)$$

where $A_m = A - BK_x$ and $B_m = BK_r$.

Let $\tilde{\Theta}=\Theta-\Theta^*$ be an estimation error of the parametric uncertainty and $e=x_m-x$ be the tracking error, then the tracking error equation becomes $$\dot{e}=A_m e+B\tilde{\Theta}^T\Phi(x)-w \quad (9)$$

The optimization can be formulated as a dynamically constrained optimization problem using the Pontryagin's Maximum Principle. Towards that end, defining a Hamiltonian $$H(e,\tilde{\Theta})=1/2(e-\Delta)^T Q(e-\Delta)+p^T(t)[A_m e+B\tilde{\Theta}^T\Phi(x)-w] \quad (10)$$

where $p(t)$ is an adjoint variable.

Then the adjoint equation can be obtained from the necessary condition as $$\dot{p}=-\nabla H_e^T=-Q^*(e-\Delta)-A_m^T p \quad (11)$$

with the transversality condition $p(t_f \to \infty)=0$ since $e(0)$ is known.

The optimal control modification adaptive law 120 can then be formulated by a gradient method as $$\dot{\tilde{\Theta}}=-\Gamma\nabla H_{\Theta^T}=-\Gamma\Phi(x)p^T B \quad (12)$$

where $\Gamma=\Gamma^T>0$ is a constant positive-definite adaptive gain matrix.

A sweep method can be used to obtain an approximate solution of the adjoint variable. Upon analysis, it can be shown that the adjoint variable $p(t)$ is obtained as $$p=Pe-\nu A_m^{-T}PB\Theta^T\Phi(x) \quad (13)$$

where $\nu>0$ is the modification parameter which is a design free parameter such that $\nu=1$ corresponds to the approximate optimal solution and $\nu \neq 1$ corresponds to a sub-optimal solution, and $P=P^T>0$ is a positive-definite matrix which solves the following Lyapunov equation:

$$PA_m+A_m^T P+Q=0 \quad (14)$$

where $Q=Q^T>0$ is a positive-definite weighting matrix.

This leads to the following optimal control modification adaptive law 120 which is the basis of the present invention:

$$\dot{\Theta}=-\Gamma\Phi(x)[e^T P-\nu\Phi^T(x)\Theta B^T P A_m^{-1}]B \quad (15)$$

The inputs of the optimal control modification adaptive law 120 are the tracking error $e(t)$ and the basis function $\Phi(x)$. The design parameters of the optimal control modification adaptive law 120 are the adaptive gain matrix $\Gamma$, the weighting matrix $Q$ which influences the Lyapunov matrix $P$, and the modification parameter $\nu$.

In the expression of the optimal control modification adaptive law 120, the first term inside the bracket is the standard adaptive law. The second term is the result of the optimization. This term is referred to as the optimal control modification term. Contained therein is a product term $\Phi(x)\Phi^T(x)$ which represents the effect of a persistent excitation condition $$1/T\int_{t_0}^{t_0+T}\Phi(x)\Phi^T(x)d\tau \geq \alpha I \quad (16)$$

Thus, the optimal control modification term effectively provides a damping mechanism that is proportional to the persistent excitation to reduce the adverse effect thereof on adaptive control.

The role of the modification parameter $\nu$ is important. If performance is more desired in a control design than robustness, then $\nu$ could be selected to be a small value. In the limit when $\nu=0$, the standard model-reference adaptive control is recovered and asymptotic tracking is achieved but at the expense of robustness. On the other hand, if robustness is a priority in a design, then a larger value of $\nu$ can be chosen.

The bound on $\Delta(t)$ as $t_f \to \infty$ can be estimated by $$\|\Delta\| \leq \frac{1}{\lambda_{min}(Q)}\left[\nu\|A_m^{-T}PB\|\left\|\frac{d(\Theta^T\Phi(x))}{dt}\right\|+\|P\|(\|B\|\|\Theta^*\|\|\Phi(x)\|+w_0)\right] \quad (17)$$

which is dependent upon the modification parameter $\nu$, the norm of the parametric uncertainty $\|\Theta^*\|$, and the upper bound of the disturbance $w_0$.

The optimal control formulation of the optimal control modification codification adaptive law 120 thus shows that $\|\Delta(t)\|$ will always remain finite as long as the uncertainty and or the disturbance exists. Therefore, bounded tracking as opposed to asymptotic tracking is better achieved with the optimal control modification adaptive law 120 to improve robustness. In contrast, the standard model-reference adaptive control can achieve the ideal property of asymptotic tracking if the disturbance $w(t)=0$, but usually at the expense of robustness to unmodeled dynamics, time delay, and exogenous disturbances. In the presence of the disturbance $w(t)$, the standard model-reference adaptive control can result in a parameter drift when the adaptive parameter $\Theta(t)$ can grow unbounded. Thus, in many real systems, asymptotic tracking is a very demanding requirement, if not almost impossible, that usually cannot be met without any restrictions. The optimal control formulation of the optimal control modification adaptive law 120 therefore demonstrates that bounded tracking is a more realistic control objective if robustness is to be satisfied concurrently. Since $\|\Delta\|$ is proportional to the modification parameter $\nu$, the optimal control modification adaptive law 120 can be designed judiciously to trade performance with robustness. Increasing the value of the modification parameter $\nu$ will reduce tracking performance but by the same token increase robustness. This trade-off generally exists in most feedback control systems but the standard model-reference adaptive control.

Using the standard Lyapunov stability theory, it can be shown that the optimal control modification adaptive law 120 is stable and results in an uniformly ultimately bounded tracking with the following ultimate bound:

$$\|e\| \leq \rho = \sqrt{\frac{\lambda_{max}(P)\delta^2+\lambda_{max}(\Gamma^{-1})\kappa^2}{\lambda_{min}(P)}} \quad (18)$$

where $$\delta = c_2+\sqrt{c_2^2+\frac{\nu c_3 c_4^2}{c_1}} \quad (19)$$

$$\kappa = c_4+\sqrt{c_4^2+\frac{c_1 c_2^2}{\nu c_3}} \quad (20)$$

for any modification parameter $0<\nu<\nu_{max}$, where $$c_1=\lambda_{min}(Q), c_2=\frac{\lambda_{max}(P)w_0}{\lambda_{min}(Q)},$$

$$c_3=\lambda_{min}(B^T A_m^{-T} Q A_m^{-1} B)\Phi_0^2,$$

$$c_4 = \frac{\|B^T P A_m^{-1} B\| \Theta_0}{\lambda_{min}(B^T A_m^{-T} Q A_m^{-1} B)},$$

$\Theta_0 = \max\|\Theta^*\|$, and $\|\Phi(x)\| \leq \Phi_0$.

The stability proof uses the following Lyapunov candidate function:

$$V(e,\tilde{\Theta}) = e^T P e + \text{trace}(\tilde{\Theta}^T \Gamma^{-1} \tilde{\Theta}) \tag{21}$$

Then, $\dot{V}(e,\tilde{\Theta})$ is evaluated as $$\dot{V}(e,\tilde{\Theta}) \leq -c_1(\|e\|-c_2)^2 + c_1 c_2^2 - \nu c_3(\|\tilde{\Theta}\|-c_4)^2 + \nu c_3 c_4^2 \tag{22}$$

Let $$B_\delta = \{(e,\tilde{\Theta}): c_1(\|e\|-c_2)^2 + \nu c_3(\|\tilde{\Theta}\|-c_4)^2 \leq c_1 c_2^2 + \nu c_3 c_4^2\} \tag{23}$$

Then, $\dot{V}(e,\tilde{\Theta}) > 0$ inside of $B_\delta$, but $\dot{V}(e,\tilde{\Theta}) \leq 0$ outside $B_\delta$. Therefore $V(e,\tilde{\Theta})$ is a decreasing function outside of $B_\delta$. This implies that trajectories $(e(0),\tilde{\Theta}(0))$ will be uniformly ultimately bounded after some time $t > T$.

The maximum value of the modification parameter $\nu_{max}$ can be established to ensure the largest $\dot{V}(e,\tilde{\Theta}) \leq 0$. Then, for any $0 < \nu < \nu_{max}$, $\|\Phi(x)\| \leq \Phi_0$ is bounded.

The modification parameter $\nu$ is dependent on the a priori knowledge of the bounds on the uncertainty as well as the disturbance to guarantee stability. Moreover, in the presence of a disturbance, i.e., $c_2 \neq 0$, then for the standard model-reference adaptive control which corresponds to $\nu = 0$, $\kappa$ is unbounded. This implies an unbounded parameter variation for the standard model-reference adaptive control in the presence of a disturbance. This observation is consistent with the parameter drift phenomenon.

Adaptive Flight Control with Optimal Control Modification Adaptive Law

Consider the following adaptive flight control architecture as shown in FIG. 2. The adaptive flight control architecture 125 comprises an aircraft plant 130, a reference model 135 that translates rate commands into desired acceleration commands, a nominal proportional-integral (PI) feedback controller 140 for rate stabilization and tracking, an adaptive controller 145 with the optimal control modification adaptive law 150 or its alternative embodiments 155 and 160, and a dynamic inversion controller 165 that computes actuator commands using desired acceleration commands.

Adaptive flight control can be used to provide consistent handling qualities and restore stability of aircraft under off-nominal flight conditions such as those due to failures or damage. Suppose the aircraft plant 130 is described by $$\dot{x} = A_{11}x + A_{12}z + B_1 u + f_1(x,z) \tag{24}$$

$$\dot{z} = A_{21}x + A_{22}z + B_2 u + f_2(x,z) \tag{25}$$

where $A_{ij}$ and $B_i$, $i=1,2$, $j=1,2$ are nominal aircraft matrices which are assumed to be known, $x = [p\ q\ r]^T$ is an inner loop state vector of roll, pitch, and yaw rates; $z = [\Delta\Phi\ \Delta\alpha\ \Delta\beta\ \Delta V\ \Delta h\ \Delta\theta]^T$ is an outer loop state vector of aircraft attitude angles, airspeed, and altitude; $u = [\Delta\delta_a\ \Delta\delta_e\ \Delta\delta_r]^T$ is a control vector of aileron, elevator, and rudder deflections; and $f_i(x,z)$, $i=1,2$ is an uncertainty due to off-nominal events which can be approximated as $$f_i(x,z) = \Theta^{*T}_i \Phi(x,z) + \epsilon(x,z) \tag{26}$$

where $\Theta^*_i$ is an unknown, constant ideal weight matrix, and $\Phi(x,z)$ is the input basis function vector chosen to be $$\Phi(x,z) = [x^T\ px^T\ qx^T\ rx^T\ z^T\ u^T(x,z)]^T \tag{27}$$

The inner-loop rate feedback control is designed to improve aircraft rate response characteristics such as the short-period mode and the Dutch roll mode. The reference model 135 is a second-order model that specifies desired handling qualities with good damping and natural frequency characteristics as shown:

$$(s^2 + 2\zeta_p\omega_p s + \omega_p^2)\Phi_m = g_p \delta_{lat} \tag{28}$$

$$(s^2 + 2\zeta_q\omega_q s + \omega_q^2)\theta_m = g_q \delta_{lon} \tag{29}$$

$$(s^2 + 2\zeta_r\omega_r s + \omega_r^2)\beta_m = g_r \delta_{rud} \tag{30}$$

where $\Phi_m$, $\theta_m$, and $\beta_m$ are the reference bank, pitch, and sideslip angles; $\omega_p$, $\omega_q$, and $\omega_r$ are the natural frequencies for desired handling qualities in the roll, pitch, and yaw axes; $\zeta_p$, $\zeta_q$, and $\zeta_r$ are the desired damping ratios; $\delta_{lat}$, $\delta_{lon}$, and $\delta_{rud}$ are the lateral stick input, longitudinal stick input, and rudder pedal input; and $g_p$, $g_q$, and $g_r$ are the input gains.

Let $p_m = \dot{\Phi}_m$, $q_m = \dot{\theta}_m$, and $r_m = -\dot{\beta}_m$, then the reference model 135 can be represented as $$\dot{x}_m = -K_p x_m - K_i \int_0^t x_m d\tau + Gr \tag{31}$$

where $x_m = [p_m\ q_m\ r_m]^T$, $K_p = \text{diag}(2\zeta_p\omega_p, 2\zeta_q\omega_q, 2\zeta_r\omega_r)$, $K_i = \text{diag}(\omega_p^2, \omega_q^2, \omega_r^2) = \Omega^2$, $G = \text{diag}(g_p, g_q, g_r)$, and $r = [\delta_{lat}\ \delta_{lon}\ \delta_{rud}]^T$.

In an alternative embodiment, the reference model 135 could be a first-order model in the roll axis as shown:

$$(s + \omega_p)p_m = g_p \delta_{lat} \tag{32}$$

Assuming the pair $(A_{11}, B_1)$ is controllable and the outer loop state vector $z(t)$ is stabilizable, the nominal PI feedback controller 140, defined by $u_e$, is given by $$u_e = K_p(x_m - x) + K_i \int_0^t (x_m - x) d\tau \tag{33}$$

and the adaptive controller 145, defined by $u_{ad}(t)$, is given by $$u_{ad} = \Theta_1^T \Phi(x,z) \tag{34}$$

Assuming $B_1$ is invertible, then the dynamic inversion controller 165 is computed as $$u + B_1^{-1}(\dot{x}_m - A_{11}x - A_{12}z + u_e - u_{ad}) \tag{35}$$

In a more general case when the control vector has more inputs than the number of states to be controlled, then an optimal control allocation strategy using a pseudo-inverse method is used to compute the dynamic inversion controller 165 as $$u = B_1^T(B_1 B_1^T)^{-1}(\dot{x}_m - A_{11}x - A_{12}z + u_e - u_{ad}) \tag{36}$$

Let $e = [\int_0^t (x_m - x) d\tau\ x_m - x]^T$ be the tracking error, then the tracking error equation is given by $$\dot{e} = A_m e + B[\Theta_1^T \Phi(x,z) - f_1(x,z)] \tag{37}$$

where $$A_m = \begin{bmatrix} 0 & I \\ -K_i & -K_p \end{bmatrix} \tag{38}$$

$$B = \begin{bmatrix} 0 \\ I \end{bmatrix} \tag{39}$$

Let $Q = 2cI$ where $c > 0$ is a weighting constant and $I$ is an identity matrix, then can be shown that $$P = c\begin{bmatrix} K_i^{-1} K_p + K_p^{-1}(K_i + I) & K_i^{-1} \\ K_i^{-1} & K_p^{-1}(I + K_i^{-1}) \end{bmatrix} > 0 \tag{40}$$

$$PB = c \begin{bmatrix} K_i^{-1} \\ K_p^{-1}(I + K_i^{-1}) \end{bmatrix} \quad (41)$$

$$B^T P A_m^{-1} B = -c K_i^{-2} < 0 \quad (42)$$

Then, the optimal control modification adaptive law 150 for a nominal PI feedback controller is specified by $$\dot{\Theta}_1 = -\Gamma[\Phi(x,z)e^T PB + c\nu\Phi(x,z)\Phi^T(x,z)\Theta_1 K_i^{-2}] \quad (43)$$

which can also be expressed as $$\dot{\Theta}_1 = -\Gamma[\Phi(x,z)e^T PB + c\nu\Phi(x,z)\Phi^T(x,z)\Theta_1 \Omega^{-4}] \quad (44)$$

Suppose the nominal feedback controller is of a proportional-integral-derivative (PID) type in an alternative embodiment with $$u_e = K_p(x_m - x) + K_i \int_0^t [x_m(\tau) - x(\tau)]d\tau + K_d(\dot{x}_m - \dot{x}) \quad (45)$$

where $K_d = \text{diag}(k_{d_p}, k_{d_q}, k_{d_r})$.

Then, the optimal control modification adaptive law 155 for a nominal PID feedback controller is specified by $$\dot{\Theta}_1 = -\Gamma[\Phi(x,z)e^T P(I+K_d)^{-1}B + c\nu\Phi(x,z)\Phi^T(x,z)\Theta_1 K_i^{-2}] \quad (46)$$

where $$P(I + K_d)^{-1}B = c\begin{bmatrix} K_i^{-1} \\ K_p^{-1}[I + (I + K_d)K_i^{-1}] \end{bmatrix} \quad (47)$$

Furthermore, in yet another alternative embodiment, the nominal feedback controller is of a proportional type $$u_e = K_p(x_m - x) \quad (48)$$

associated with a first-order reference model with $K_i = 0$.

Then, the optimal control modification adaptive law 160 for a nominal proportional feedback controller is specified by $$\dot{\Theta}_1 = -c\Gamma[\Phi(x,z)(x_m^T - x^T)K_p^{-1} + \nu\Phi(x,z)\Phi^T(x,z)\Theta_1 K_p^{-2}] \quad (49)$$

2.1 Adaptive Flight Control Simulations of F-18 Aircraft

To demonstrate the effectiveness of the adaptive flight control architecture 125, simulations were conducted on a damaged F-18 aircraft model of NASA F/A-18 research test aircraft, tail number 853 as shown in the photograph of FIG. 3, with both the standard baseline dynamic inversion controller and the adaptive controller with the optimal control modification adaptive law 150. The results demonstrate the effectiveness of the proposed modification in tracking a reference model.

The flight condition is a test point of Mach 0.5 and an altitude of 15,000 ft. All of the pilot inputs to the simulation time histories are from "canned" piloted stick inputs and no attempts to correct for the aircraft attitudes are added to the piloted inputs. This "canned pilot input" method was used only for comparison purposes. For instance, when a failure is imparted on the aircraft and the resulting attitudes change minimally, the control system is said to have good restoring properties. All the test cases have a one frame delay (1/100 second) at the actuators for added realistic implementation purposes.

The first case is an A-matrix failure imposed on the aircraft with a destabilizing CG shift or a $C_{m_\alpha}$ change. FIG. 4 shows a 40-sec time history in which 3 longitudinal pilot stick inputs are presented and the failure is imposed at 13 sec. In the first 13 sec, a normal health response shows how the pitch rate follows the commanded pitch rate (green) and the stick command (black). After the failure is inserted, the response without adaptation shows that the aircraft is stable but with low damping and 2 overshoots (blue). With adaptation on (red), the response is much better and follows the commanded pitch rate. By the third pilot input, the adaptation response is close to the commanded pitch rate. Notice the low tracking error between $q_{ref}$ and q before the failure and the better tracking response with adaptation after the failure. FIG. 4 also shows the angle of attack and normal acceleration responses associated with the $C_{m_\alpha}$ change; and that the system behaves better with adaptation than without.

FIG. 5 shows the tracking error in the roll, pitch and yaw axes along with the adaptation weights. The errors are better with adaptation and the weights are convergent. The results show that the adaptation helps with respect to the tracking task (q-command) and increases the damping. FIG. 6 shows the surface positions with and without adaptation. The actuator models are high-fidelity fourth-order models with time delays. As expected, the surfaces are well-damped with adaptation on. After observing the weights and how they converge, the control surfaces, and the tracking errors, the final analysis for the A-matrix failure example shows that adaptation helps compared to the no adaptation case.

The second case is a B-matrix failure imposed on the left stabilator 13 sec into the simulation run. The left stabilator is jammed (or locked) at +2.5° from trim. FIG. 7 shows a 40-sec time history of the longitudinal responses. During the first 13 sec, the pitch rate follows the commanded pitch rate, but after the failure insertion there is a large downward motion and the system cannot track very well. Aircraft response comparison with this B-matrix failure shown in FIG. 7 indicates a better response with adaptation on. Pitch rate follows the reference better with adaptation on. The lateral-directional responses from the same longitudinal command also show better aircraft response with adaptation, as shown in FIG. 8. The roll rate with adaptation is smaller than without adaptation. The bank angle and sideslip angle both come back to wings-level with adaptation but stay 10° and 8°, respectively, without adaptation. Note that there are no lateral-directional pilot inputs ($p_{ref}$ and $r_{ref}$ are zero). FIG. 9 shows smaller tracking errors and converging neural networks weights. Analysis indicates the system is stable and the performance is better with adaption.

Simulations is also conducted to show that the adaptive gain $\Gamma$ can be increased and the aircraft will remain stable. The optimal control modification adaptive law 120 and the various alternative embodiments thereof 150, 155, and 160 enable fast adaptation with good damping. The test case changes the adaptation rate from 0.5 to 50 while keeping the modification parameter $\nu$ constant at 1. FIG. 10 shows the same A-matrix failure occurring at 2 sec instead of at 13 sec and is followed by a pitch input. As FIG. 10 shows, the pitch rate tracking error is large with an adaptive gain $\Gamma$ of 0.5 compared to 50. The weights are also shown, and the larger adaptive gain increases the size of the weights as expected. Note that in both cases the system weights are convergent and the tracking error is better with the larger adaptive gain. FIG. 11 shows what happens when the modification parameter $\nu$ is changed from 0.25 to 1 while keeping the adaptive gain constant at $\Gamma$=5. The tracking error has low damping with the lower modification parameter $\nu$ of 0.25 as expected. In both cases the weights converge to reasonable values. The results and analysis show that larger adaptive gains can be tolerated with the optimal control modification adaptive law 120 and the various alternative embodiments thereof 150, 155, and 160. The modification parameter $\nu$ can be used to tune the desired performance.

2.2 Pilot Study in Motion-Based Flight Simulator

To compare the effectiveness of the optimal control modification adaptive law 120 and the various alternative embodiments thereof 150, 155, and 160, a pilot study was conducted in the Advanced Concept Flight Simulator (ACFS), as shown in the photograph of FIG. 12, in the Crew-Vehicle System Research Facility (CVSRF) at NASA Ames Research Center. The ACFS is a motion-based flight simulator which employs advanced fly-by-wire digital flight control systems with a flight deck that includes head-up displays, a customizable flight management system, and modern flight instruments and electronics. Pilot inputs are provided by a side stick for controlling aircraft in pitch and roll axes.

The pilot study evaluated a number of adaptive control methods. A high-fidelity flight dynamic model was developed to simulate a medium-range generic transport aircraft. A number of failure and damage emulations were implemented including asymmetric damage to the left horizontal tail and elevator, flight control faults emulated by scaling the control sensitivity matrix (B-matrix failures), and combined failures. Eight different NASA test pilots participated in the study. For each failure emulation, each pilot was asked to provide Cooper-Harper Ratings (CHR) for a series of flight tasks, which included large amplitude attitude capture tasks and crosswind approach and landing tasks.

Seven adaptive flight control methods were selected for the pilot study that include: the e-modification as the baseline controller, the optimal control modification adaptive law 120, and five others. Based on the pilot CHR, the optimal control modification adaptive law 120, indicated in FIG. 13 by the acronym OCM, performed the most consistently well over all flight conditions, as shown in FIG. 13.

Linear Asymptotic Property of Optimal Control Modification Adaptive Law

Adaptive control is a promising technology that can improve performance and stability of an uncertain system. Yet, in spite of all the progress made in the field of adaptive control, certification of adaptive control for use in production systems, mission- or safety-critical systems remains far in the future. This is because a certification process has not been developed for adaptive control and the only certification process applicable to flight control systems is based on classical control metrics. Performance metrics such as overshoot and settling time, and stability metrics such as phase and gain margins are frequently used for certification of flight control systems.

On the other hand, adaptive control as a nonlinear control method is not endowed with any nice properties or metrics associated with linear classical control. The only tool available for analyzing stability of nonlinear control systems is the Lyapenov stability theory. This theory, while it is a powerful technique for stability analysis, cannot be used to provide an evidence of stability margins in the context of linear classical control. The lack of analytical methods for analyzing stability margins and performance metrics which are often required for certification of a flight control system. Therefore, this challenge can be overcome by either developing a new certification process for adaptive control or adopting new methods for certain classes of adaptive control that can provide an evidence of classical control metrics.

The optimal control modification adaptive law 120 and the various alternative embodiments thereof 150, 155, and 160 as taught by the present invention exhibit an important property called linear asymptotic property. This limiting property effectively reduces the optimal control modification adaptive law 120 and various alternative embodiments thereof to a linear feedback control in the limit as the adaptation tends to the equilibrium or under fast adaptation when a large adaptive gain is used. Therefore, if an open-loop system is linear with uncertainty, then the linear asymptotic property can be invoked to show that the feedback control system will be linear in the limit. This property therefore affords certain advantages over conventional adaptive controls in the ability to allow the optimal control modification adaptive law 120 and the various alternative embodiments thereof 150, 155, and 160 to be analyzed for performance and stability metrics in a linear system context.

To further elucidate the concept of linear asymptotic property, consider the following linear system with a matched linear uncertainty and an unmatched disturbance:

$$\dot{x} = Ax + B(u + \Theta^{*T}x) + w \tag{50}$$

The optimal control modification adaptive law 170 for this system is given by $$\dot{\Theta} = -\Gamma x(e^T P - \nu x^T \Theta B^T P A_m^{-1})B \tag{51}$$

The optimal control modification adaptive law 170 tends to an equilibrium when $\dot{\Theta} \to 0$ as $t \to \infty$ or when $\Gamma^{-1}\dot{\Theta} \to 0$ under fast adaptation as $\Gamma \to \infty$. In the limit, the linear asymptotic property of the optimal control modification adaptive law 170 is described by $$\Theta^T x = \frac{1}{\nu}(B^T A_m^{-T} P B)^{-1} B^T P e \tag{52}$$

Then, the feedback control system tends to a linear asymptotic system in the limit as $$\dot{x} = \left(A_m + \frac{1}{\nu}P^{-1}A_m^T P + B\Theta^{*T}\right)x - \frac{1}{\nu}P^{-1}A_m^T P x_m + B_m r + w \tag{53}$$

The maximum value of the modification parameter $\nu_{max}$ be established such that the matrix $$A_m + \frac{1}{\nu}P^{-1}A_m^T P + B\Theta^{*T}$$

is a stable Hurwitz matrix with negative real part eigenvalues.

The linear asymptotic property of the optimal control modification adaptive law 170 is quite useful since it can be analyzed by many linear analysis tools. Moreover, because of its linear asymptotic property, the feedback control system has a scaled input-output behavior under fast adaptation. That is, if r(t) is scaled by a multiplier c, then x(t) is scaled by the same amount. More specifically, let $x(t) = x_0(t)$ be the response due to $r(t) = r_0(t)$, then if $r(t) = cr_0(t)$ where c is a constant, then it follows that $x(t) = cx_0(t)$. This scaled input-output behavior helps improve predictability of the optimal control modification adaptive law 170 under fast adaptation.

The linear asymptotic property can be used to compute the steady state tracking error in the limit as $t \to \infty$ or $\Gamma \to \infty$.

$$\lim_{t \to \infty} \|\bar{e}\| = \tag{54}$$

$$\left\| -A_m^{-1}B_m + \left(A_m + \frac{1}{\nu}P^{-1}A_m^T P + B\Theta^{*T}\right)^{-1} \left(\frac{1}{\nu}P^{-1}A_m^T P A_m^{-1} + I\right)B_m \right\|$$

$$\|r\|_\infty$$

More importantly, the linear asymptotic property also affords another advantage in that stability margins of a feedback control system can be analyzed in a linear system context.

Consider a first-order time-delay SISO system with the optimal control modification adaptive law 170.

$$\dot{x} = ax + b[u(t-t_d) + \theta^* x] \quad (55)$$

$$u = -k_x x + k_r r - \theta x \quad (56)$$

$$\dot{\theta} = -\gamma(xeb - \nu x^2 a_m^{-1} b^2 \theta) \quad (57)$$

with $a$ and $b$ known, $\theta^*$ as the parametric uncertainty, and $a_m = a - bk_x < 0$.

Invoking the linear asymptotic property, the equilibrium value of $\theta x$ is $$\bar{\theta}x = \frac{x_m - x}{\nu a_m^{-1} b} \quad (58)$$

Then, the feedback control system becomes in the limit $$\dot{x} = (a + b\theta^*)x + \left(-bk_x + \frac{a_m}{\nu}\right)x(t-t_d) - \frac{a_m}{\nu}x_m(t-t_d) + bk_r r(t-t_d) \quad (59)$$

If $\theta^*$ is a non-destabilizing uncertainty with $a - bk_x + b\theta^* < 0$, then the modification parameter $\nu$ has no upper limit. On the other hand, if $\theta^*$ is a destabilizing uncertainty with $a - bk_x + b\theta^* > 0$, then $0 < \nu < \nu_{max}$ where $$\nu_{max} = -\frac{a_m}{a - bk_x + b\theta^*} \quad (60)$$

This system can be analyzed using linear analysis tools to estimate linear stability margins. To simplify the analysis, let $r(t)=1$ and $x_m(t)=1$. Then it can be shown that the effective cross-over frequency, time delay margin, and phase margin of the linear asymptotic system are given by $$\omega = \sqrt{\left(-bk_x + \frac{a_m}{\nu}\right)^2 - (a + b\theta^*)^2} \quad (61)$$

$$t_d = \frac{1}{\omega}\cos^{-1}\left(\frac{a + b\theta^*}{bk_x - \frac{a_m}{\nu}}\right) \quad (62)$$

$$\Phi = \omega t_d \quad (63)$$

Note that if $\nu = 0$, then the optimal control modification adaptive law 170 reverts to the standard model-reference adaptive control. Then, the time delay margin tends to zero since $\omega \to \infty$ and thus $t_d \to 0$ as $\nu \to 0$. This is consistent with the fact the standard model-reference adaptive control has zero robustness when the adaptive gain becomes large, whereas the optimal control modification adaptive law 170 retains its robustness with a finite time delay margin.

Thus, in general, consider the following input-delay linear system with a matched linear uncertainty and an unmatched disturbance:

$$\dot{x} = Ax + B[u(t-t_d) + \Theta^{*T}x] + w \quad (64)$$

Using the linear asymptotic property of the optimal control modification adaptive law 170, the input-delay feedback control system tends to a linear asymptotic system y in the limit as $$\dot{x} = (A + B\Theta^{*T})x + \left(-BK_x x + \frac{1}{\nu}P^{-1}A_m^T P\right)x(t-t_d) - \quad (65)$$
$$\frac{1}{\nu}P^{-1}A_m^T P x_m(t-t_d) + B_m r(t-t_d) + w$$

Using the mean value theorem, $r(t-t_d)$ can be expressed as $$\dot{r}(t) = \frac{r(t) - r(t - t_d)}{t_d} \quad (66)$$

Thus, the input-delay feedback control system also includes dynamics of the reference model and the reference command signal. The combined system is expressed as $$\dot{z} = A_c z(t) - A_d z(t-t_d) + \nu \quad (67)$$

where $z = [x \ x^m \ r]^T$, $z = [w \ 0 \ 0]^T$, and $$A_c = \begin{bmatrix} A + B\Theta^{*T} & 0 & 0 \\ 0 & A_m & 0 \\ 0 & 0 & \dfrac{1}{t_d} \end{bmatrix} \quad (68)$$

$$A_d = \begin{bmatrix} BK_x x - \dfrac{1}{\nu}P^{-1}A_m^T P & \dfrac{1}{\nu}P^{-1}A_m^T P & 0 \\ 0 & 0 & 0 \\ 0 & 0 & \dfrac{1}{t_d} \end{bmatrix} \quad (69)$$

The modification parameter $\nu$ is chosen such that the matrix $A_m + 1/\nu P^{-1}A_m^T P + B\Theta^{*T}$ is a Hurwitz matrix. Then, if the input time delay is given, then the modification parameter $\nu$ must also satisfy the stability condition of a delayed system as $$\det(j\omega - A_c + A_d e^{-j\omega t_d}) = 0 \quad (70)$$

Otherwise, the stability condition of a delayed system can be used to calculate stability margins of the input-delay feedback control system.

For low-order systems, the stability condition of a delayed system can be analyzed easily. For higher-order systems, the analysis may become more tedious. Thus, in an alternative embodiment, the linear asymptotic property can be used with a matrix measure method for estimating stability margins of the optimal control modification adaptive law 170. The effective cross-over frequency and time delay margin of a linear asymptotic feedback control system using the optimal control modification adaptive law 170 are given by $$\omega = \bar{\mu}(-jA_c) + \|A_d\| \quad (71)$$

$$t_d = \frac{1}{\omega}\cos^{-1}\left[\frac{\bar{\mu}(A_c) + \bar{\mu}(jA_d)}{\|A_d\|}\right] \quad (72)$$

where the matrix measure $$\bar{\mu}(C) = \lambda_{max}\left(\frac{C + C^*}{2}\right)$$

is defined as the largest eigenvalue of the average of a complex-valued matrix C and its conjugate C*.

In yet another alternative embodiment, the linear asymptotic property can be used with a matrix measure method for estimating stability margins of the optimal control modification adaptive law 170 for an adaptive control system with a constant or zero reference model where $x_m(t)$ and $r(t)$ are constants. Then, the effective cross-over frequency and time delay margin of a linear asymptotic feedback control system using the optimal control modification adaptive law 170 are given by $$\omega = \bar{\mu}(-jA - jB\Theta^{*T}) + \left\|BK_x - \frac{1}{v}P^{-1}A_m^TP\right\|$$ (73)

$$t_d = \frac{1}{\omega}\cos^{-1}\left[\frac{\bar{\mu}(A + B\Theta^{*T}) + \bar{\mu}\left(j\left[BK_x - \frac{1}{v}P^{-1}A_m^TP\right]\right)}{\left\|BK_x - \frac{1}{v}P^{-1}A_m^TP\right\|}\right]$$ (74)

The linear asymptotic property can be used to compute the modification parameter v to guarantee stability for a given specification of the uncertainty $\Theta^*$. In an alternative embodiment, the Lyapunov stability theory can be used to establish the maximum value of the modification parameter $v_{max}$. Taking the limit of the largest $\dot{V}(e,\tilde{\Theta})$ as $\|\Phi(x)\|=\|x\|\to\infty$ yields $$\dot{V}(e,\tilde{\Theta}) \leq -\lambda_{min}(Q)(\|x_m-x\|-c_2)^2 + c_1 C_2^2 + v\lambda_{min}(B^T A_m^{-T} Q A_m^{-1} B)\|x\|^2 c_4^2$$ (75)

Then, the maximum value of the modification parameter $v_{max}$ to render $\dot{V}(e,\tilde{\Theta}) \leq 0$ is a function of the upper bound on the uncertainty as follows:

$$v_{max} = \frac{\lambda_{min}(Q)\lambda_{min}(B^T A_m^{-T} Q A_m^{-1} B)}{\|B^T P A_m^{-1} B\|^2 \Theta_0^2}$$ (76)

Yet, in an alternative embodiment where the uncertainty is non-destabilizing, then the nominal feedback control system with no adaptation is robustly stable if the following condition is satisfied $$\|\Phi(x)\| \leq \frac{\lambda_{min}(Q)\|e\| - 2\lambda_{max}(P)w_0}{2\|PB\|\Theta_0}$$ (77)

This condition is obtained from the Lyapunov stability theory using the following Lyapunov candidate function:

$$V(e) = e^T P e$$ (78)

Then using the largest $\dot{V}(e,\tilde{\Theta})$ for the optimal control modification adaptive law 170, the maximum value of the modification parameter $v_{max}$ to render $\dot{V}(e,\tilde{\Theta}) \leq 0$ is established for non-destabilizing uncertainty as $$v_{max} = \frac{4\lambda_{min}(B^T A_m^{-T} Q A_m^{-1} B)\|PB\|^2}{\lambda_{min}(Q)\|B^T P A_m^{-1} B\|^2}$$ (79)

Since the uncertainty is no destabilizing, the maximum value of the modification parameter $v_{max}$ is found to be independent of the upper bound on the uncertainty.

Consider a linear plant with unmodeled dynamics or a non-minimum phase plant given by a transfer function $$y = W_p(s)u = k_p\frac{Z_p(s)}{R_p(s)}u$$ (80)

where $k_p$ is a high-frequency gain, and $Z_p(s)$ and $R_p(s)$ are monic Hurwitz polynomials of degrees $m_p$ and $n_p$, respectively, and $n_p - m_b > 1$.

The reference model is given by a transfer function $$y_m = W_m(s)r = k_m\frac{Z_m(s)}{R_m(s)}r$$ (81)

where $k_m$ is a high-frequency gain, and $Z_m(s)$ and $R_m(s)$ are monic Hurwitz polynomials of degrees $m_m$ and $n_m$, respectively, and $n_m - m_m \geq 1$.

Let $n_p - m_p > n_m - m_m$. So the SPR condition is no longer possible to ensure tracking of the reference model. Stability of an adaptive control system cannot also be guaranteed with the standard model reference adaptive control.

Suppose an adaptive controller is designed with the optimal control modification adaptive law 170 as $$u = k_y y + k_r r$$ (82)

where $$\dot{k}_y = \gamma_y(ye - vx^2 k_y)$$ (83)

$$\dot{k}_r = \gamma_r(re - vr^2 k_r)$$ (84)

Using the linear asymptotic property of the optimal control modification adaptive law 170, the equilibrium value of the adaptive controller u can be computed as $\gamma_y \to \infty$ and $\gamma_r \to \infty$.

$$\bar{u} = \frac{2y_m - 2y}{v}$$ (85)

The asymptotic closed-loop transfer function can now be computed as $$\bar{y} = \frac{2W_p(s)W_m(s)}{v + 2W_p(s)}r = \frac{2k_m k_p Z_p(s)Z_m(s)}{R_m(s)(vR_p(s) + 2k_p Z_p(s))}r$$ (86)

The modification parameter v can be chosen such that the linear asymptotic closed-loop transfer function has closed-loop stability.

To demonstrate the linear asymptotic property of the optimal control modification adaptive law 170, three examples are provided: 1) linear systems with input time delay, 2) linear systems with unmodeled dynamics, and 3) non-minimum phase linear systems. All these three classes of problems generally challenge conventional adaptive control methods.

Consider the following linear control system with input time delay and a reference model $$\dot{x} = ax + b[u(t-t_d) + \theta^* x] \quad (87)$$

$$\dot{x}_m = a_m x_m + b_m r \quad (88)$$

with $a = a_m = -1$, $b = b_m = 1$, $\theta^* = 2$, and $r(t) = 1$.
The controller is given by $$u = k_r r - \theta x \quad (89)$$

where $\theta(t)$ is computed by the adaptive control modification adaptive law 170.

The maximum value of the modification parameter $v_{max}$ is computed from the linear asymptotic property and the Lyapunov stability theory to be $$v_{max} = \min\left[-\frac{a_m}{a_m + b\theta^*}, \left(\frac{2a_m}{b\theta^*}\right)^2\right] = \min(1, 1) = 1 \quad (90)$$

Choose $v = 0.2 < 1$. The time delay margin for the linear asymptotic system is calculated to be $$\omega = \sqrt{\frac{1}{v^2} - 1} = 4.8990 \text{ rad/sec} \quad (91)$$

$$t_d = \frac{1}{\sqrt{\frac{1}{v^2} - 1}} \cos^{-1} v = 0.2795 \text{ sec} \quad (92)$$

The steady state error is estimated to be $$\bar{e} = \left[-a_m^{-1} + \left(a_m + \frac{a_m}{v} + b\theta^*\right)^{-1}\left(\frac{1}{v} + 1\right)\right] b_m r = -0.5 \quad (93)$$

The equilibrium value of $\theta$ is computed to be $$\bar{\theta} = \frac{\bar{e}}{va_m^{-1}b\bar{x}} = \frac{\bar{e}}{va_m^{-1}b(\bar{x}_m - \bar{e})} = 1.6667 \quad (94)$$

A time delay of 0.0020 sec in injected at the input in the simulation. This time delay causes the standard model-reference adaptive control to go unstable. The adaptive control system with the optimal control modification adaptive law 170 is completely stable, as shown in FIG. 14. The simulation results agree with the steady state error $\bar{e}$ and the equilibrium value $\bar{\theta}$.

When a time delay equal to the time delay margin of 0.2795 sec is injected at the input, the adaptive control system begins to diverge, as shown in FIG. 15. Thus, the numerical evidence of the time delay margin is also in excellent agreement with the analytical time delay margin computed from linear asymptotic property.

To illustrate the scaled input-output linear behavior of the optimal control modification adaptive law 170, the reference command signal is doubled so that $r(t) = 2$. The optimal control modification adaptive law 170 exhibits the scaled input-output property, as shown in FIG. 16.

For comparison, the responses with both the σ-modification and e-modification are also shown in FIG. 16. The σ-modification does not exhibit the scaled input-output behavior and the e-modification exhibits oscillations at a different frequency and amplitude as the reference command signal is doubled. This demonstrates that both the σ-modification and e-modification are highly nonlinear adaptive control. The optimal control modification adaptive law 170, on the other hand, behaves more or less like a linear system. This linear asymptotic property, therefore, makes the optimal control modification adaptive law 170 much more predictable than conventional adaptive control methods.

Consider the linear system with unmodeled dynamics in the well-known Rohrs counterexample which was one of the first studies that shows the non-robustness of the standard model-reference adaptive control (MRAC) for systems with unmodeled dynamics.

$$y = \frac{2}{s+1} \frac{229}{s^2 + 30s + 229} u \quad (95)$$

The system has a relative degree 3 and is minimum phase since there are no zeros.

The reference model is specified as $$y_m = \frac{3}{s+3} r \quad (96)$$

The reference model has relative degree 1. Since the relative degree of the reference model is less than the relative degree of the plant, perfect tracking is not possible. Adaptive control of systems with relative degrees greater than 1 is generally more difficult since the model reference cannot be chosen to be strictly positive real (SPR).

The original controller in the Rohrs counterexample is based on the standard model-reference adaptive control and is given by $$u = k_y y + k_r r \quad (97)$$

$$\dot{k}_y = \gamma_x y e \quad (98)$$

$$\dot{k}_r = \gamma_r r e \quad (99)$$

where $e = y_m - y$, and $k_y$ and $k_r$ are initialized with $k_y(0) = -0.65$ and $k_r(0) = 1.14$ The reference command signal is given by $$r = 0.3 + 1.85 \sin 16.1 t \quad (100)$$

where the frequency 16.1 rad/sec is the frequency at which the closed-loop transfer function with $k_y = k_y(0)$ has a $-180°$ phase shift which implies a $0°$ phase margin. The closed-loop system is unstable, as shown in FIG. 17.

The original controller is revised using the optimal control modification adaptive law 170 as $$\dot{k}_y = \gamma_y(ye - vx^2 k_y) \quad (101)$$

$$\dot{k}_r = \gamma_r(re - vr^2 k_r) \quad (102)$$

Based on the linear asymptotic property, the revised controller asymptotically tends to $$\bar{u} = \frac{2y_m - 2y}{v} = \frac{6r}{v(s+3)} - \frac{2y}{v} \quad (103)$$

Then the linear asymptotic closed-loop transfer function is obtained as $$\frac{\bar{y}}{r} = \frac{2748}{v(s+3)\left(s^3 + 31s^2 + 259s + 229 + \frac{916}{v}\right)} \quad (104)$$

It can be shown that the effective cross-over frequency and phase margin of the closed-loop transfer function can be obtained as functions of the modification parameter $v$ as $$\omega^6 + 443\omega^4 + 52883\omega^2 + 229^2 - \frac{916^2}{v^2} = 0 \quad (105)$$

$$\phi = \omega t_d = \tan^{-1}\left(\frac{-\omega^3 + 259\omega}{31\omega^2 - 229}\right) \quad (106)$$

The plot of $v$ versus $\Phi$ and $\omega$ is shown in FIG. 18. Notice that at $v=0.117$, the cross-over frequency $\omega=16.1$ rad/sec has zero phase margin. This explains the instability of the adaptive control system in the Rohrs counterexample. A good phase margin of $\Phi=45°$ is selected to guarantee stability. This corresponds to $v=0.426$.

The linear asymptotic closed-loop transfer function with $v=0.426$ is computed to be $$\frac{\bar{y}}{r} = \frac{2748}{0.426s^4 + 14.484s^3 + 149.952s^2 + 1344.556s + 3040.662} \quad (107)$$

The adaptive control system is therefore robustly stable with an effective phase margin of $45°$ in the limit. The linear asymptotic response $\bar{y}(t)$ and control signal $\bar{u}(t)$ evaluated analytically agree very well with the simulation results of $y(t)$ and $r(t)$, as shown in FIG. 19. Thus, the linear asymptotic property of the optimal control modification adaptive law 170 is demonstrated to be able to handle linear uncertain systems with unmodeled dynamics.

The σ-modification and e-modification also exhibit minimum values of the modification parameters at which the adaptive control system in the Rohrs counterexample begins to stabilize. However, unlike the optimal control modification adaptive law 170, the σ and e modification parameters can only be found by trial and error, whereas the modification parameter $v$ is found analytically by utilizing the linear asymptotic property of the optimal control modification adaptive law 170.

Non-minimum phase plants are well-known to be very difficult to control by adaptive control. Output feedback adaptive control generally relies on the SPR property to ensure stability. For non-minimum phase plants, the SPR property does not exist, thereby destroying the ability to analyze stability of adaptive control using the SPR property. The linear asymptotic property of the optimal control modification adaptive law 170 can be used to analyze non-minimum phase systems.

Consider the following non-minimum phase linear system $$\dot{x} = ax + u - 2z + w \quad (108)$$

$$\dot{z} = -z + u \quad (109)$$

$$y = x \quad (110)$$

where $a<0$ is unknown, but $a=-1$ for simulation purposes. The system is non-minimum phase with a transfer function $$y = \frac{(s-1)u + (s+1)w}{(s-a)(s+1)} \quad (111)$$

An adaptive regulator is designed with the optimal control modification adaptive law 170 as $$u = k_y y \quad (112)$$

$$\dot{k}_y = -\gamma_y(y^2 + vy^2 k_y) \quad (113)$$

Since the system non-minimum phase, the standard model-reference adaptive control will result in instability. Therefore, there exists a minimum value of the modification parameter $v$ that stabilizes the adaptive control system. Using the linear asymptotic property, this minimum value can be computed analytically.

Using the linear asymptotic property, the equilibrium value of $k_y$ is $\bar{k}_y \to -1/v$. Therefore, the linear asymptotic closed-loop transfer function is $$\frac{\bar{y}}{w} = \frac{s+1}{(s-a)(s+1) + \frac{1}{v}(s-1)} \quad (114)$$

This transfer function is stable for any modification parameter $v<-1/a$. The steady state closed-loop transfer function is equal to $$\frac{\bar{y}}{w} = -\frac{1}{a + \frac{1}{v}} \quad (115)$$

The response of the adaptive control system with $v=2>-1/a$ since $a=-1$ for a unit step disturbance $w(t)=1$ is shown in FIG. 20. The numerical results are in agreement with the equilibrium value $\bar{k}_y(t)=-1/2$ and the steady state response $\bar{y}(t)=2$.

Optimal Control Modification Adaptive Law with Time-Varying Adaptive Gains

The optimal control modification adaptive law 120 and the various alternative embodiments thereof 150, 155, 160, and 170 as taught by the present invention are normally implemented by a constant adaptive gain matrix $\Gamma$. In situations when large adaptive gains or large input amplitudes are present, robustness of the optimal control modification adaptive law 120 and the various alternative embodiments thereof 150, 155, 160, and 170 can be improved by employing two methods that provide mechanisms to change the adaptive gain matrix $\Gamma$ with time.

4.1 Covariance Adaptive Gain Adjustment

In the presence of large uncertainty, an adaptive control system needs to be able to adapt rapidly to regain performance. Fast adaptation is referred to the implementation of adaptive control with a large adaptive gain to reduce the tracking error rapidly. However, a large adaptive gain can lead to high-frequency oscillations which can adversely affect robustness of an adaptive control system. As the adaptive gain increases, the time delay margin for a standard model-reference adaptive control decreases, hence loss of robustness. The optimal control modification adaptive law 120 and the various alternative embodiments thereof 150, 155, 160, and 170 as taught by the present invention can achieve fast adaptation with robustness. While in theory fast adaptation may be desired to improve tracking performance, in practice when the adaptation has achieved the tracking performance objective, fast adaptation usually may no longer be needed. Maintaining fast adaptation even after the adaptation has achieved its objective can result in persistent learning. At best, persistent learning would do nothing to further improve tracking performance once the adaptation has achieved its objective. At worst, persistent learning may tend to reduce stability margins which is not highly desired.

In a preferred embodiment, the optimal control modification adaptive law 120 and the various alternative embodiments thereof 150, 155, 160, and 170 can include a covariance-like adjustment mechanism to enable the adaptive gain matrix $\Gamma$ to vary in time so as to prevent persistent learning which can reduce robustness. The covariance adaptive gain adjustment method can also include a forgetting factor in a similar practice as a standard recursive least-squares estimation algorithm. The covariance adaptive gain adjustment method allows an arbitrarily large initial adaptive gain to be used to enable fast adaptation to reduce the initial transients rapidly. The covariance adaptive gain adjustment method then continuously adjusts the adaptive gain toward a lower value as the adaptation continues, thereby achieving desired improved robustness while retaining tracking performance during the initial adaptation.

Referring to FIG. 21 illustrating an adaptive control system 175 comprising the same constituents as that in FIG. 1 and further including therein a covariance adaptive gain adjustment method 175 as taught by the present invention.

The adaptive gain matrix $\Gamma$ in the optimal control modification adaptive law 120 and the various alternative embodiments thereof 150, 155, 160, and 170 is adjusted in a continuous time-varying manner by the covariance adaptive gain adjustment method 175 as follows:

$$\dot{\Gamma} = -\eta \Gamma \Phi(x) \Phi^T(x) \Gamma \quad (116)$$

where $0 \leq \eta < v\lambda_{min}(B^T A_m^{-T} Q A_m^{-1} B)$ is the adjustment parameter which depends on the modification parameter $v$ and has an upper bound that is not present in the prior art.

Using the standard Lyapunov stability theory, it can be shown that the optimal control modification adaptive law 120 is stable and results in an uniformly ultimately bounded tracking with the following ultimate bound:

$$\|e\| \leq \rho = \sqrt{\frac{\lambda_{max}(P)\delta^2 + \lambda_{max}(\Gamma^{-1})\kappa^2}{\lambda_{min}(P)}} \quad (117)$$

where $$\delta = c_2 + \sqrt{c_2^2 + \frac{v c_6 c_7^2}{c_1}} \quad (118)$$

$$\kappa = c_7 + \sqrt{c_7^2 + \frac{c_1 c_2^2}{v c_6}} \quad (119)$$

for any modification parameter $0 \leq v < v_{max}$ where $c_1$ and $c_2$ are defined previously, $$c_6 = \left[\lambda_{min}(B^T A_m^{-T} Q A_m^{-1} B) - \frac{\eta}{v}\right]\Phi_0^2, \text{ and}$$

$$c_7 = \frac{\|B^T P A_m^{-1} B\|\Theta_0}{\lambda_{min}(B^T A_m^{-T} Q A_m^{-1} B) - \frac{\eta}{v}}.$$

Using the same Lyapunov candidate function as in Eq. (21), then $\dot{V}(e,\tilde{\Theta})$ is evaluated as $$\dot{V}(e,\tilde{\Theta}) \leq -c_1(\|e\|-c_2)^2 - v c_6(\|\tilde{\Theta}\|-c_7)^2 + c_1 c_2^2 + v c_6 c_7^2 \quad (120)$$

It follows that $\dot{V}(e,\tilde{\Theta}) \leq 0$ outside the compact set $$B_\delta = \{(e,\tilde{\Theta}) \in R^n \times R^{m \times p} : c_1(\|e\|-c_2)^2 + v c_6(\|\tilde{\Theta}\|-c_7)^2 \leq c_1 c_2^2 + v c_6 c_7^2\} \quad (121)$$

Therefore, the solution is uniformly ultimately bounded for any modification parameter $0 < v < v_{max}$.

The maximum value of the modification parameter $v_{max}$ can be determined explicitly for three general cases:

If the basis function $\Phi(x)$ is bounded such that $\|\Phi(x)\| \leq \Phi_0$, then there is no upper limit on the modification parameter $v$. Such basis functions include $\sin(x)$, $\cos^2 x$, $e^{-x^2}$, and many others.

If the basis function $\Phi(x)$ belongs to a class of functions such that $\|\Phi(x)\| \leq \|x\|$, then the largest $\dot{V}(e,\tilde{\Theta})$ with $\|\Phi(x)\| \leq \|x\|$ is given by $$\dot{V}(e,\tilde{\Theta}) \leq -c_1(\|x_m-x\|-c_2)^2 - v c_6(\|\tilde{\Theta}\|-c_7)^2 + c_1 c_2^2 + [v\lambda_{min}(B^T A_m^{-T} Q A_m^{-1} B) - \eta]\|x\|^2 c_7^2 \quad (122)$$

Then, $\dot{V}(e,\tilde{\Theta}) \leq 0$ requires $0 < v < v_{max}$ where the maximum value of the modification parameter $v_{max}$ is determined by $$v_{max} = \frac{\lambda_{min}(Q)\lambda_{min}(B^T A_m^{-T} Q A_m^{-1} B)}{2\|B^T P A_m^{-1} B\|^2 \Theta_0^2} \left[1 + \sqrt{1 - \frac{4\eta\|B^T P A_m^{-1} B\|^2 \Theta_0^2}{\lambda_{min}(Q)\lambda_{min}(B^T A_m^{-T} Q A_m^{-1} B)}}\right] \quad (123)$$

This expression can also be used to determine the maximum value of the modification parameter $v_{max}$ for the optimal control modification adaptive law 120 and various alternative embodiments thereof 150, 155, 160, and 170 by letting $\eta = 0$ which yields $$v_{max} = \frac{\lambda_{min}(Q)\lambda_{min}(B^T A_m^{-T} Q A_m^{-1} B)}{\|B^T P A_m^{-1} B\|^2 \Theta_0^2} \quad (124)$$

If the uncertainty $\Theta^{*T}\Phi(x)$ is non-destabilizing, then the feedback control system without adaptation is robustly stable. Using the Lyapunov stability theory with the candidate function $$V(e) = e^T P e \quad (125)$$

$\dot{V}(e) \leq 0$ implies $$\|\Phi(x)\| \leq \frac{\lambda_{min}(Q)\|e\| - 2\lambda_{max}(P)w_0}{2\|PB\|\Theta_0} \quad (126)$$

Then, the largest $\dot{V}(e,\tilde{\Theta})$ is given by $$\dot{V}(e,\tilde{\Theta}) \leq -c_1(\|x_m - x\| - c_2)^2 - vc_6(\|\tilde{\Theta}\| - c_7)^2 + \quad (127)$$
$$c_1 c_2^2 + [v\lambda_{min}(B^T A_m^{-T} Q A_m^{-1} B) - \eta] \frac{\lambda_{min}(Q)\|e\| - 2\lambda_{max}(P)w_0}{2\|PB\|\Theta_0} c_7^2$$

The maximum value of the modification parameter $v_{max}$ is then determined to be $$v_{max} = \frac{2\lambda_{min}(B^T A_m^{-T} Q A_m^{-1} B)\|PB\|^2}{\lambda_{min}(Q)\|B^T P A_m^{-1} B\|^2} \quad (128)$$
$$\left[1 + \sqrt{1 - \frac{\eta\lambda_{min}(Q)\|B^T P A_m^{-1} B\|^2}{\lambda_{min}^2(B^T A_m^{-T} Q A_m^{-1} B)\|PB\|^2}}\right]$$

This expression can also be used to determine the maximum value of the modification parameter $v_{max}$ for the optimal control modification adaptive law 120 and various alternative embodiments thereof 150, 155, 160, and 170 by letting $\eta = 0$ which yields $$v_{max} = \frac{4\lambda_{min}(B^T A_m^{-T} Q A_m^{-1} B)\|PB\|^2}{\lambda_{min}(Q)\|B^T P A_m^{-1} B\|^2} \quad (129)$$

The covariance adaptive gain adjustment 175 generally causes the adaptive gain matrix $\Gamma(t)$ to decrease uniformly from some initial values to small equilibrium values. In an alternative embodiment, the adjustment parameter $\eta$ is a matrix whose elements are the adjustment parameters for each individual element of the adaptive gain matrix. These adjustment parameters can be selectively chosen to change the time-varying rates of the individual elements of the adaptive gain matrix $\Gamma(t)$. The stability condition for the matrix of the adjustment parameters to be satisfied is $$\lambda_{max}(\eta) < v\lambda_{min}(B^T A_m^{-T} Q A_m^{-1} B) \quad (130)$$

In another preferred embodiment, the covariance adaptive gain adjustment method 175 includes a normalization factor which can also be used to change the time-varying rate of the adaptive gain matrix $\Gamma(t)$. This alternative embodiment is referred herein to as the covariance adaptive gain adjustment method 180 and is described by $$\dot{\Gamma} = -\eta\Gamma \frac{\Phi(x)\Phi^T(x)}{1 + \Phi^T(x)R\Phi(x)} \Gamma \quad (131)$$

where $R = R^T > 0$ is a positive-definite normalization matrix.

Yet in another alternative embodiment, the covariant adaptive gain adjustment method 175 can include a forgetting factor which can also be used to change the time-varying rate of the adaptive gain matrix $\Gamma(t)$. This alternative embodiment is referred herein to as the covariance adaptive gain adjustment method 185 and is described by $$\dot{\Gamma} = \beta\Gamma - \eta\Gamma\Phi(x)\Phi^T(x)\Gamma \quad (132)$$

where $\beta = \beta^T > 0$ is the forgetting factor matrix.

Yet in another alternative embodiment, the covariance adaptive gain adjustment method 185 includes a normalization factor which can also be used to change the time-varying rate of the adaptive gain matrix $\Gamma(t)$. This alternative embodiment is referred herein to as the covariance adaptive gain adjustment method 190 and is described by $$\dot{\Gamma} = \beta\Gamma - \frac{\eta\Gamma\Phi(x)\Phi^T(x)\Gamma}{1 + \Phi^T(x)R\Phi(x)} \quad (133)$$

With a forgetting factor, the adaptive gain matrix $\Gamma(t)$ can grow without bound. This can lead to poor robustness and may not improve performance. Therefore, a projection method can be used to limit the effect of the forgetting factor. The projection method for the covariance adaptive gain adjustment method 185 is given by $$\dot{\Gamma}_{ij} = \begin{cases} [\beta\Gamma - \eta\Gamma\Phi(x)\Phi^T(x)\Gamma]_{ij} & \text{if } \Gamma_{ij} \leq \Gamma_{ij}(t_0) \\ 0 & \text{otherwise} \end{cases} \quad (134)$$

and the projection method for the covariance adaptive gain adjustment method 190 is given by $$\dot{\Gamma}_{ij} = \begin{cases} \left[\beta\Gamma - \frac{\eta\Gamma\Phi(x)\Phi^T(x)\Gamma}{1 + \Phi^T(x)R\Phi(x)}\right]_{ij} & \text{if } \Gamma_{ij} \leq \Gamma_{ij}(t_0) \\ 0 & \text{otherwise} \end{cases} \quad (135)$$

The effects of the covariance adaptive gain adjustment method 175 and the alternative embodiment thereof 180 is to gradually shut down the adaptation process. The effects of persistent learning and fast adaptation are therefore eliminated. A problem associated with the covariance adaptive gain adjustment methods 175 and 180 is that, once the adaptive gain matrix $\Gamma(t)$ is reduced to an equilibrium value near zero, the adaptation process has to be restarted if a new uncertainty becomes present. Thus, in an alternative embodiment, the covariance adaptive gain adjustment methods 175 and 180 are used in conjunction with a resetting mechanism 195. The adaptation process can be reset with a new initial value of the adaptive gain to restart the covariance adaptive gain adjustment methods 175 and 180 whenever a threshold criterion is satisfied. The resetting mechanism 195 is expressed as $$\dot{\Gamma} = \quad (136)$$
$$\begin{cases} \dot{\Gamma} \text{ with } \Gamma(t_i) = \Gamma_i & t \geq t_i \text{ when threshold is exceeded at } t = t_i \\ \dot{\Gamma} \text{ with } \Gamma(0) = \Gamma_0 & \text{otherwise} \end{cases}$$

where $\Gamma_i$ is a properly chosen new initial condition for the covariance adaptive gain adjustment methods 175 and 180 for $t \geq t_i$ when a new uncertainty becomes present.

The threshold should be chosen judiciously so that the trigger would occur appropriately to prevent false triggering. Also when a switching action occurs with a large change in the value of the initial condition $\Gamma_i$, to prevent transient behaviors, a filter 200 can be used to phase in the new initial condition $\Gamma_i$. Be for example only, a first-order filter can be selected for the filter 200. Then $$\dot{\Gamma} = -\lambda(\Gamma - \Gamma_i) \quad (137)$$

for $t \in [t_i, t_i + n\Delta t]$, where $\lambda > 0$, $\Gamma = \Gamma(t)$ at $t = t_i - \Delta t$ computed from the previous time step, and $n\Delta t$ is the duration of transition from some previous adaptive gain value to the new initial condition $\Gamma_i$ where n can be selected appropriately to ensure $\Gamma \to \Gamma_i$ to within a specified tolerance.

4.2 Optimal Control Modification Adaptive Law with Adaptive Gain Normalization Fast adaptation can lead to loss of robustness in the standard model-reference adaptive control. Fast adaptation is usually associated with the use of a large adaptive gain. However, this is not the only effect of fast adaptation. When the amplitude of the basis function is large, the effect is equivalent. Normalization is a technique that can be used to achieve more robust adaptation for large amplitude inputs. The objective of the normalization is to reduce the effect of large amplitude of the input basis function. Normalized adaptation can achieve a significant increase in the time delay margin of adaptive control.

Referring to FIG. 22 illustrating an adaptive control system 175 comprising the same constituents as that in FIG. 1 and further including therein an adaptive gain normalization method 205 as taught by the present invention.

The adaptive gain $\Gamma$ in the optimal control modification adaptive law 120 and the various alternative embodiments thereof 150, 155, 160, and 170 is adjusted in a continuous time-varying manner by the adaptive gain normalization method 205 as follows:

$$\Gamma(t) = \frac{\Gamma}{1 + \Phi^T(x) R \Phi(x)} \quad (138)$$

where $\Gamma$ on the right hand side is a constant adaptive gain matrix and $R = R^T > 0 \in \mathbb{R}^{m \times m}$ is a positive-definite normalization matrix such that $0 \leq R < R_{max}$.

The optimal control modification adaptive law 120 with the adaptive gain normalization method 205 can be expressed alternatively as $$\dot{\Theta} = -\frac{\Gamma}{1 + \Phi^T(x) R \Phi(x)} \Phi(x)[e^T P - v\Phi^T(x) \Theta B^T P A_m^{-1}] B \quad (139)$$

The maximum value of the normalization matrix $R_{max}$ is determined by $$\Phi^T(x) R_{max} \Phi(x) \leq c_{12} = \frac{v \lambda_{min}(Q) \lambda_{min}(B^T A_m^{-T} Q A_m^{-1} B)}{2\|PB\|^2} \times \times \left[ 1 + \sqrt{1 + \frac{4\|PB\|^2}{v \lambda_{min}(Q) \lambda_{min}(B^T A_m^{-T} Q A_m^{-1} B)}} \right] \quad (140)$$

Using the standard Lyapunov stability theory, it can be shown that the optimal control modification adaptive law 120 is stable and results in an uniformly ultimately bounded tracking with the following ultimate bound:

$$\|e\| \leq \rho = \sqrt{\frac{\lambda_{max}(P)\delta^2 + \lambda_{max}(\Gamma^{-1})\kappa^2}{\lambda_{min}(P)}} \quad (141)$$

where $$\delta = \frac{vc_3(c_1 c_2 c_{10} + c_4 c_{11})}{vc_1 c_3 c_{10} - c_{11}^2} \left[ 1 + \sqrt{1 + \frac{c_4^2(vc_1 c_3 c_{10} - c_{11}^2)}{(c_1 c_2 c_{10} + c_4 c_{11})^2}} \right] \quad (142)$$

$$\kappa = \frac{c_1 c_{10}(vc_3 c_4 + c_2 c_{11})}{vc_1 c_3 c_{10} - c_{11}^2} \left[ 1 + \sqrt{1 + \frac{c_4^2(vc_1 c_3 c_{10} - c_{11}^2)}{(vc_3 c_4 + c_2 c_{11})^2}} \right] \quad (143)$$

where $c_1$, $c_2$, and $c_4$ are defined previously, $c_3 = c_{12} \lambda_{max}^{-1}(R) \lambda_{min}(B^T A_m^{-T} Q A_m^{-1} B)$, $c_{10} = 1 + c_{12} \lambda_{min}(R) \lambda_{max}^{-1}(R)$, and $$c_{11} = \sqrt{c_{12}^3 \lambda_{max}^{-3}(R)} \|PB\|.$$

Using the same Lyapunov candidate function as in Eq. (21), then $\dot{V}(e, \tilde{\Theta})$ is evaluated as $$\dot{V}(e, \tilde{\Theta}) \leq -c_1(\|e\| - c_2)^2 + c_1 c_2^2 - \frac{vc_3(\|\tilde{\Theta}\| - c_4)^2 - 2c_{11}\|e\|\|\tilde{\Theta}\|}{c_{10}} + \frac{vc_3 c_4^2}{c_{10}} \quad (144)$$

Then, $\dot{V}(e, \tilde{\Theta}) \leq 0$ implies $$-c_1(\|e\| - c_2)^2 + c_1 c_2^2 + \frac{c_{11}^2 \|e\|^2}{vc_3 c_{10}} + \frac{2c_4 c_{11} \|e\| + vc_3 c_4^2}{c_{10}} \leq 0 \quad (145)$$

or $$\frac{-vc_3(\|\tilde{\Theta}\| - c_4)^2 + vc_3 c_4^2 + 2c_2 c_{11}\|\tilde{\Theta}\|}{c_{10}} + c_1 c_2^2 + \frac{c_{11}^2 \|\tilde{\Theta}\|^2}{c_1 c_{10}^2} \leq 0 \quad (146)$$

For $0 \leq R < R_{max}$, then it can be shown that such that $vc_1 c_3 c_{10} - c_{11}^2 > 0$. It follows that $\dot{V}(e, \tilde{\Theta}) \leq 0$ outside the compact set $$B_\delta = \left\{ (e, \tilde{\Theta}) : c_1(\|e\| - c_2)^2 + \frac{vc_3(\|\tilde{\Theta}\| - c_4)^2 - 2c_{11}\|e\|\|\tilde{\Theta}\|}{c_{10}} \leq c_1 c_2^2 + \frac{vc_3 c_4^2}{c_{10}} \right\} \quad (147)$$

Therefore, the solution is uniformly ultimately bounded for any modification parameter $0 < v < v_{max}$ and normalization matrix $0 \leq R < R_{max}$.

4.3 Adaptive Flight Control Simulations

To demonstrate the effectiveness of the covariance adaptive gain adjustment method 175 and the adaptive gain normalization method 205 in conjunction with the optimal control modification adaptive law 120 and the various alternative embodiments thereof 150, 155, 160, and 170, simulations of a damaged medium-range, twin-engine, single-aisle generic transport aircraft with a 28% loss 2301 of the left wing 2302, as shown in FIG. 23, are conducted. Due to the asymmetric damage, the motions in the roll, pitch, and yaw axes are completely coupled together. A level flight condition of Mach 0.6 at 15,000 ft is selected. The remaining right aileron is the only roll control effector available.

Referring to FIG. 2, the adaptive flight control architecture 125 is designed for the adaptive flight controller 145 with the optimal control modification adaptive law 150 for a nominal PI feedback controller in conjunction with the covariance adaptive gain adjustment method 175 and the adaptive gain normalization method 205. The reference model 135 is specified by $\omega_p=2.0$ rad/sec, $\omega_q=1.5$ rad/sec, $\omega_r=1.0$ rad/sec, and $\zeta_p=\zeta_q=\zeta_r=1/\sqrt{2}$.

The pilot pitch rate command is simulated with a series of ramp input longitudinal stick command doublets, corresponding to the reference pitch angle ±3.81° from trim. The tracking performance of the baseline flight controller with no adaptation is compared against the standard model-reference adaptive control and the optimal control modification adaptive law 150 with the covariance adaptive gain adjustment method 175 and the adaptive gain normalization method 205. The adaptive gains are selected as large as possible within the numerical stability limit of the adaptive laws. This results in $\Gamma=150$ for the standard model-reference adaptive control and $\Gamma=3000$ for the optimal control modification adaptive law 150. The design parameters are chosen to be $\nu=0.2$ and $\eta=0.0125$ since $\lambda_{min}(B^T A_m^{-T} Q A_m^{-1} B)=0.0625$. The maximum value of $\nu$ is computed to be $\nu_{max}=0.75$ for $\eta=0$ and $\nu_{max}=0.375$ for $\eta=0.0125$. Thus, the choice of $\nu=0.2$ is acceptable. For the adaptive gain normalization, R is chosen to be 100.

The aircraft roll, pitch, and yaw rate responses are shown in FIGS. 24, 25, and 26. The baseline flight controller is not able to maintain the aircraft in trim in roll and yaw. Both the roll and yaw rates are significant as compared to the responses due to the adaptive flight controllers. All three adaptive controllers perform well to maintain the roll and yaw rates close to zero. The pitch rate tracking is quite good with all the three adaptive flight controllers. The standard model-reference adaptive control shows higher roll and yaw rate responses than the optimal control modification adaptive law 150 with the covariance adaptive gain adjustment method 175 and the adaptive gain normalization method 205. In all cases, the behaviors of the covariance adaptive gain adjustment method 175 and the adaptive gain normalization method 205 are very similar.

The pitch angle and bank angle responses are shown in FIGS. 27 and 28. The baseline flight controller does not track the pitch angle reference model very well. All the adaptive controllers show good tracking of the pitch angle. The bank angle response with the baseline flight controller is quite excessive due to the left wing damage. The optimal control modification adaptive law 150 with the covariance adaptive gain adjustment method 175 and the adaptive gain normalization method 205 reduce the bank angle responses better than the standard model-reference adaptive control.

The control surface deflections are shown in FIGS. 29, 30, and 31. In all cases, there is no unusual behavior in the control surface deflections. All surface deflections are within the position limits of the aileron, elevator, and rudder; although the optimal control modification adaptive law 150 with the covariance adaptive gain adjustment method 175 and the adaptive gain normalization method 205 produce larger aileron surface deflections as expected to reduce the roll rate.

Table 1 shows the time delay margin estimates of all the adaptive flight controllers for a constant adaptive gain $\Gamma=150$. The optimal control modification adaptive law 150 with the adaptive gain normalization method 205 achieves the greatest time delay margin among all the adaptive flight controllers. The standard model-reference adaptive control has the smallest time delay margin, as expected. In terms of tracking performance, both the covariance adaptive gain adjustment method 175 and the adaptive gain normalization method 205 have very similar behaviors. Yet, the adaptive gain normalization method 205 achieves almost twice the time delay margin of the covariance adaptive gain adjustment method 175.

TABLE 1

Time Delay Margin Estimates for $\Gamma = 150$

| Adaptive Flight Control | Time Delay Margin, sec |
|---|---|
| Model-Reference Adaptive Control | 0.19 |
| Optimal Control Modification | 0.29 |
| Optimal Control Modification with Covariance Adjustment | 0.33 |
| Optimal Control Modification with Normalization | 0.59 |

Implementation of Simplified Optimal Control Modification Adaptive Law On-Board NASA F/A-18 Aircraft Flight tests of several versions of model-reference adaptive control were carried out on the NASA Full-scale Advanced Systems Testbed (FAST), which is an F/A-18 (McDonnell Douglas, now The Boeing Company, Chicago, Ill.) high-performance military jet aircraft, as shown in the photograph of FIG. 32. This aircraft has a research flight control system that allows for testing of experimental control laws.

In 2009, a request for information (RFI) was released by NASA Integrated Resilient Aircraft Control (IRAC) Project seeking ideas for adaptive control experiments for loss-of-control events. One of the focus areas identified from the responses that NASA received was to investigate simple yet effective adaptive control algorithms to help address the issue of verification and validation (V&V) testing of adaptive flight controls. Adaptive flight controllers, such as the standard model-reference adaptive control, face many difficulties with regards to being able to be certified and implemented on civilian or military aircraft. There are large gaps in the certification process for dealing with adaptive controllers. To date, the Federal Aviation Administration (FAA) has not certified any adaptive flight controllers for commercial aircraft. Part of the process to certification is V&V testing. Adaptive controllers can become complex with many adaptive parameters and complex update laws as well as nonlinearity. The required testing to prove that the controller will behave appropriately and predictably under all situations, while also providing beneficial results in the presence of failures, can require extensive testing. By simplifying the controllers, the required testing could potentially be greatly reduced. Simplification is often at the expense of performance and the controller's ability to handle more complex failure conditions. So there exists a trade-off between complexity and performance of a controller.

FIG. 33 shows the nonlinear dynamic inversion adaptive flight controller 210 implemented on the NASA FAST aircraft. The nonlinear dynamic inversion controller 210 further comprises a control vector 215, a nonlinear dynamic inversion controller 220, angular acceleration command 225, on-board aerodynamic lookup tables 230, a nonlinear dynamic inversion reference model 235, an adaptive control reference model 240, an error compensator 245, an adaptive augmentation controller 250 employing three adaptive laws 255, 260, and 265, a pilot command 270, and a plant 275 which is the NASA FAST aircraft.

The control vector 215 has ten control surface commands, denoted as δ, and is computed by the nonlinear dynamic inversion controller 220 as $$\delta = B_\delta^{-1}[\dot{x}_{cmd} + \Omega \times I\Omega - \hat{f}_A(y)] + \delta_0 \qquad (148)$$

where the vector of estimated aerodynamic moments $\hat{f}_A(y)$ is calculated from the on-board aerodynamic lookup tables 230, while the angular rates Ω are measured using aircraft sensors, I is the inertia matrix of the aircraft, $\delta_0$ are predetermined trim surface commands appropriate for the test flight condition, and $B_\delta^{-1}$ is a weighted pseudo-inverse of the control effectiveness derivatives with respect to the surface positions weighted by a control allocation matrix.

The weighted pseudo-inverse $B_\delta^{-1}$ is computed as follows:

$$B_\delta^{-1} = W^{-1} B_\delta^T (B_\delta W^{-1} B_\delta^T)^{-1} \qquad (149)$$

The angular acceleration commands $\dot{x}_{cmd}(t)$ contain the sum of the desired reference dynamics $\dot{x}_{ref}(t)$ produced by the nonlinear dynamic inversion reference model 235, the output $\dot{x}_c(t)$ of the error compensator 245, and adaptive control augmentation $\dot{x}_a(t)$ computed by the adaptive augmentation controller 250. This is described as $$\dot{x}_{cmd} = \dot{x}_{ref} + \dot{x}_c + \dot{x}_a = \begin{bmatrix} \dot{p}_{ref} + \dot{p}_c + \dot{p}_a \\ \dot{q}_{ref} + \dot{q}_c + \dot{q}_a \\ \dot{r}_{ref} + \dot{r}_c \end{bmatrix} \qquad (150)$$

Note that the adaptive controller only augments the pitch and roll axes.

The nonlinear dynamic inversion reference model 235 for the adaptive control reference model 240 each are by the pilot command 270 r(t). The nonlinear dynamic inversion reference model 235 generally represents the same desired dynamics as the adaptive control reference model 240, but may be modified to simulate a failed or damaged aircraft. The state feedback vector y(t) contains measurements of the inputs required for the aerodynamic lookup tables 230, such as angle of attack and velocity, as well as the angular rates.

The adaptive control reference model 240 for the aircraft axis of interest is specified as a stable, linear time-invariant system as $$\dot{x}_m = A_m x_m + B_m r \qquad (151)$$

or $$\begin{bmatrix} \dot{p}_m \\ q_m \\ \dot{q}_m \end{bmatrix} = \begin{bmatrix} -\omega_p & 1 & 0 \\ 0 & 0 & 1 \\ 0 & -\omega_q^2 & -2\zeta_q \omega_q \end{bmatrix} \begin{bmatrix} p_m \\ \int_0^t q_m(\tau)\,d\tau \\ q_m \end{bmatrix} + \begin{bmatrix} 1 & 0 \\ 0 & 0 \\ 0 & 1 \end{bmatrix} \begin{bmatrix} r_p \\ r_q \end{bmatrix} \qquad (152)$$

The pitch axis reference model is second order, representing the desired short-period dynamics. The roll axis reference model is first order, and no adaptive augmentation is applied in the yaw axis.

The pilot commands 270 $r_p(t)$ and $r_q(t)$ are computed from the pilot stick inputs $\delta_{lat}(t)$ and $\delta_{lon}(t)$ according to $$\begin{bmatrix} r_p \\ r_q \end{bmatrix} = \begin{bmatrix} \left(\frac{r_{max}}{\alpha}\right) k_p \omega_p \delta_{lat} \\ k_q \omega_q^2 \left[\delta_{lon} + L_\alpha \int_0^t \delta_{lon}\,d\tau \right] \end{bmatrix} \qquad (153)$$

The error compensator 245 is necessary to improve tracking of the reference model in the presence of model uncertainty and disturbances by the nonlinear dynamic inversion controller 220 without adaptive augmentation. The nonlinear dynamic inversion controller 220 in the pitch axis contains a proportional-integral (PI) error compensator. The nonlinear dynamic inversion controller 220 in the roll axis contains a proportional error compensator. The gains of the error compensator 245 are tuned to match the adaptive control reference model 240. Thus $$\begin{bmatrix} \dot{p}_c \\ \dot{q}_c \end{bmatrix} = \begin{bmatrix} \omega_p(p_{ref} - p) \\ 2\zeta_q \omega_q (q_{ref} - q) + \omega_q^2 \int_0^t (q_{ref} - q)\,d\tau \end{bmatrix} \qquad (154)$$

The aircraft's true, unknown dynamics are written as $$\dot{x} = Ax + B_m(u - \sigma) \qquad (155)$$

or $$\begin{bmatrix} \dot{p} \\ q \\ \dot{q} \end{bmatrix} = \begin{bmatrix} -(\omega_p + \theta_p) & 1 & 0 \\ 0 & 0 & 1 \\ 0 & -(\omega_p^2 + \theta_{q_1}) & -(2\zeta_p \omega_p + \theta_{q_2}) \end{bmatrix} \begin{bmatrix} p \\ \int_0^t q\,d\tau \\ q \end{bmatrix} + \begin{bmatrix} 1 & 0 \\ 0 & 0 \\ 0 & 1 \end{bmatrix} \begin{bmatrix} u_p - \sigma_p \\ u_q - \sigma_q \end{bmatrix} \qquad (156)$$

where $\theta_p$, $\theta_{q_1}$, and $\theta_{q_2}$ the uncertain parameters; and $\sigma_p(t)$ and $\sigma_q(t)$ are scalar, time-varying uncertain disturbances.

The nonlinear dynamic inversion adaptive flight controller 210 is then designed to cancel out the effects of the uncertain parameters $\theta_p$, $\theta_{q_1}$, $\theta_{q_2}$, $\sigma_p(t)$, and $\sigma_q(t)$ by the adaptive augmentation controller 250. This is expressed as $$\begin{bmatrix} u_p \\ u_q \end{bmatrix} = \begin{bmatrix} r_p + \dot{p}_a \\ r_p + \dot{q}_a \end{bmatrix} \qquad (157)$$

where $$\begin{bmatrix} \dot{p}_a \\ \dot{q}_a \end{bmatrix} = \begin{bmatrix} \hat{\theta}_p p + \hat{\sigma}_p \\ \hat{\theta}_{q_1} \int_0^t q\,d\tau + \hat{\theta}_{q_2} q + \hat{\sigma}_q \end{bmatrix} \qquad (158)$$

5.1 Simple Model-Reference Adaptive Control

In one embodiment, the adaptive augmentation controller 250 employs a simple model-reference adaptive control 255, designated as sMRAC adaptive lazes. The sMRAC adaptive laws 255 are used to estimate the uncertain parameters $\theta_p$, $\theta_{q_1}$ and $\theta_{q_2}$ according to $$\dot{\theta}_p = \Gamma_{\theta_p} \tilde{p} P_p B_{m_p} \tag{159}$$

$$\dot{\theta}_q = \Gamma_{\theta_q} x_q \tilde{x}_q^T P_q B_{m_q} \tag{160}$$

where $\hat{\theta}_q = [\hat{\theta}_{q_1}, \hat{\theta}_{q_2}]^T$, $\tilde{p} = p_m - p$, $x_q = [\int_0^t q d\tau \ q]^T$, and $\tilde{x}_p = [\int_0^t (q_m - q) d\tau \ q_m - q]^T$.

5.2 Optimal Control Modification with Normalization Model-Reference Adaptive Control In a preferred embodiment, the adaptive augmentation controller 250 employs the optimal control modification adaptive law 120 or any of the various alternative embodiments thereof 150, 155, 160, and 170 in conjunction with the adaptive gain normalization method 205, collectively referred to as onMRAC adaptive laws 260. The onMRAC adaptive laws 260 is described by $$\dot{\theta}_p = \frac{\Gamma_{\theta_p}}{1 + N_{\theta_q} p^2} \left( p \tilde{p} P_q B_{m_p} + v_{\theta_p} p^2 \hat{\theta}_p B_{m_p}^T P_p A_{m_p}^{-1} B_{m_p} \right) \tag{161}$$

$$\dot{\theta}_q = \frac{\Gamma_{\theta_q}}{1 + x_q^T N_{\theta_q} x_p} \left( x_q \tilde{x}_q^T P_q B_{m_q} + v_{\theta_q} x_q x_q^T \hat{\theta}_q B_{m_q}^T P_q A_{m_q}^{-1} B_{m_q} \right) \tag{162}$$

5.3 Optimal Control Modification with Normalization Model-Reference Adaptive Control Plus Disturbance Rejection In another preferred embodiment, the adaptive augmentation controller 250 employs the onMRAC adaptive laws 260 plus adaptive laws to cancel out the effects of the disturbances σ, collectively referred to as onMRAC+adaptive laws 265. The onMRAC+adaptive laws 265 include the following adaptive laws in addition to the onMRAC adaptive laws 260:

$$\dot{\theta}_p = \frac{\Gamma_{\sigma_p}}{1 + N_{\sigma_p} p^2} \left( \tilde{p} P_p B_{m_p} + v_{\sigma_p} \hat{\theta}_p B_{m_p}^T P_p A_{m_p}^{-1} B_{m_p} \right) \tag{163}$$

$$\dot{\sigma}_q = \frac{\Gamma_{\sigma_q}}{1 + x_q^T N_{\sigma_p} x_p} \left( \tilde{x}_q^T P_q B_{m_q} + v_{\sigma_q} \hat{\sigma}_q B_{m_q}^T P_q A_{m_q}^{-1} B_{m_q} \right) \tag{164}$$

5.4 Flight Test Results

Two pilots evaluated the reduced pitch damping failure during a 2-g air-to-air tracking task. Handling qualities ratings given by Pilot A and Pilot B for each of the four controllers during the 2-g air-to-air tracking task with a reduced pitch damping failure are tabulated in FIG. 34. Due to the high workload required to maintain pitch control in gross acquisition, Pilot B was unable to maintain sufficient airspeed to complete the fine tracking portion of the task with the nonlinear dynamic inversion controller 210, and consequently no rating was given for that case. An overall assessment of the ratings indicate that all three of the adaptive controllers improved the handling qualities of the aircraft during the gross acquisition portion of the task, but that the varying levels of controller complexity had minimal effect on the ratings. Little to no improvement was observed in the ratings for the fine tracking portion of the task even when compared against the nonlinear dynamic inversion controller 210 controller without adaptation.

Two pilots evaluated the reduced roll damping failure during an in-trail formation tracking task. The ratings of Pilot A and Pilot B for gross acquisition and fine tracking with the simulated roll damping failure are tabulated in FIG. 35. Both pilots rated the nonlinear dynamic inversion controller 210 controller with no failures (not shown) as Level 1 for this task, with Pilot A giving it Cooper-Harper ratings of 2 and 3, and Pilot B giving it ratings of 3 and 2 for gross acquisition and fine tracking, respectively. Clearly, the failure degraded the gross acquisition handling qualities more than those of the fine tracking portion of the task. All of the adaptive controllers improved the gross acquisition ratings, but the fine tracking results were less conclusive. Generally speaking, the onMRAC+controller performs as well or better than any of the other controllers, completely restoring the Level 1 fine tracking handling qualities of the nonlinear dynamic inversion controller 210 with no failures.

It was found that normalization suppresses adaptation during large dynamic maneuvers through attenuation of the learning rate by the inverse of the weighted square of the feedback parameters. Squaring the input vector ensures that it is always positive, and weighting allows the designer to control the relative influence of each feedback term on the normalizing behavior. In the pitch axis onMRAC update law, the relative influence of the $\int_0^t q(c\tau) d\tau$ term was kept very low. The normalization terms are also biased by a constant of one to prevent a divide-by-zero when the feedback vectors are zero. Inclusion of OCM and normalization allowed the adaptive gain to be increased from 1 to 50, enabling faster adaptation.

It is noted that the optimal control modification term is present in the update law for $\hat{\sigma}_p(t)$, but not for $\hat{\sigma}_q(t)$. In the initial design, it was not clear whether the optimal control modification term was necessary in the calculation of the disturbance adaptive parameters. In the interest of keeping the adaptive augmentation controller 250 as simple as possible, the optimal control modification term was not included in either. During the first research flight, a persistent 1 Hz, 0.5 deg/s oscillation was present in roll rate and was also observed in the value of $\hat{\sigma}_p(t$. Implementation of the optimal control modification term in the $\hat{\sigma}_p(t)$ law eliminated the oscillation on all of the remaining flights. Because a similar oscillation was not observed in $\hat{\sigma}_q(t)$, no optimal control modification term was added for that parameter. During handling qualities maneuvers at the end of the flight phase of the experiment, interactions between the pilot and the adaptive augmentation controller 250 in the pitch axis with the onMRAC+adaptive laws 265 were observed that likely adversely affected the pilot's rating of the system. Subsequent simulation studies indicated that the addition of the optimal control modification term to the $\hat{\sigma}_q(t)$ adaptive law would eliminate these interactions.

NON-LIMITING EXAMPLES

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module", or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable storage product or computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems), and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium or computer readable storage medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for adaptive control of a physicals system, the method comprising:

modeling a physical system using a nonlinear plant as $\dot{x}=Ax+B[u+f(x)]$, where $x(t):[0,\infty)\rightarrow R^n$ is a state vector, $u(t): 0,\infty)\rightarrow R^p$ is a control vector, $A\in R^{n\times n}$ and $B\in R^{n\times p}$ are known such that the pair (A,B) is controllable, and $f(x):R^n\rightarrow R^p$ is a matched uncertainty;

modeling at least one of an unstructured uncertainty and a structured uncertainty, wherein the unstructured uncertainty f(x) is modeled as $f(x)=\Sigma_{i=1}^n \theta^*_i \Phi_i(x)+\epsilon(x)=\Theta^{*T}\Phi(x)+\epsilon(x)$, where $\Theta^*\in R^{m\times p}$ is an unknown constant ideal weight matrix that represents a parametric uncertainty, $\Phi(x):R^n\rightarrow R^m$ is a vector of chosen basis functions that are continuous and differentiable in $C^1$, and $\epsilon(x):R^n\rightarrow R^p$ is an approximation error which can be made small on a compact domain $x(t)\in D \subset R^n$ by a suitable selection of basis functions, and the structured uncertainty f(x) is modeled as $f(x)=\Theta^{*T}\Phi(x)$, where $\Phi(x):R_n\rightarrow R^m$ is a vector of known basis functions that are continuous and differentiable in $C^1$;

using a feedback controller specified by $u=-K_x x+K_r r-u_{ad}$, where $r(t):0,\infty)\rightarrow R^p\in L_\infty$ is a command vector, $K_x\in R^{p\times n}$ is a stable gain matrix such that $A-BK_x$ is Horwitz, $K_r\in R^{p\times p}$ is a gain matrix for r(t), and $u_{ad}(t)\in R^p$ is a direct adaptive signal which estimates the parametric uncertainty in the plant such that $u_{ad}=\Theta^T\Phi(x)$, where $\Theta(t)\in R^{m\times p}$ is an estimate of the parametric uncertainty $\Theta^*$;

using a reference model specified as $\dot{x}_m = A_m x_m + B_m r$, where $A_m \in R^{n \times n}$ and $B_m \in R^{n \times p}$ are given by $A_m = A - BK_x$ and $B_m = BK_r$;

modeling an estimation error of a parametric uncertainty by $\tilde{\Theta} = \Theta - \Theta^*$ in a tracking error equation $\dot{e} = A_m e + B[\tilde{\Theta}^T \Phi(x) - \epsilon(x)]$, where $e(t) = x_m(t) - x(t)$ is the tracking error;

estimating a parametric uncertainty by an optimal control modification adaptive law specified by at least one of $\dot{\Theta} = -\Gamma \Phi(x)[e^T P - \nu \Phi^T(x) \Theta B^T P A_m^{-1}]B$, where $\nu > 0 \in R$ is a modification parameter, $\Gamma = \Gamma^T > 0 \in R^{m \times m}$ is an adaptive gain matrix, and $P = P^T > 0 \in R^{n \times n}$ solves $PA_m + A_m^T P = -Q$, where $Q = Q^T > 0 \in R^{n \times n}$ is a positive-definite weighting matrix, and $\dot{\Theta} = -\Gamma \Phi(x)[e^T PB + \nu \Phi^T(x) \Theta R]$, where $R = R^T > 0 \in R^{p \times p}$ is a positive-definite weighting matrix.

2. A computer-implemented method for adaptive control of an aircraft, the method comprising:

modeling an aircraft using a nonlinear plant as $\dot{x} = A_{11}x + A_{12}z + B_1 U + f_1(x,z)$ and $\dot{z} = A_{21}x + A_{22}z + B_2 u + f_2(x,z)$, where $A_{ij}$ and $B_i$, $i=1,2$, $j=1,2$ are nominal aircraft matrices which are assumed to be known, $x = [p \ q \ r]^T$ is a state vector of roll, pitch, and yaw rates, $z = [\Delta \Phi \ \Delta \alpha \ \Delta \beta \ \Delta V \ \Delta h \ \Delta \theta]^T$ is a state vector of aircraft attitude angles, airspeed, and altitude, and $u = [\Delta \delta_a \ \Delta \delta_e \ \Delta \delta_r]^T$ is a control vector of aileron, elevator, and rudder deflections, and $f_i(x,z)$, $i=1,2$ is an uncertainty;

modeling at least one of an unstructured uncertainty and a structured uncertainty, wherein the unstructured uncertainty $f_i(x,z)$ is modeled as $f_i(x,z) = \Theta^{*T}_i \Phi(x,z,u(x,z)) + \epsilon(x,z)$, where $\Theta^*_i$ is an unknown, constant ideal weight matrix that represents a parametric uncertainty, $\Phi(x,z,u(x,z))$ is a vector of chosen basis functions that are continuous and differentiable in $C^1$, and $\epsilon(x,z)$ is an approximation error which can be made small by a suitable selection of basis functions, and the structured uncertainty $f_i(x,z)$ is modeled as $f_i(x,z) = \Theta^{*T}_i \Phi(x,z,u(x,z))$, where $\Phi(x,z,u(x,z))$ is a vector of known basis functions that are continuous and differentiable in $C^1$;

modeling a second-order reference model that specifies desired handling qualities with good damping and natural frequency characteristics in the roll axis by at least one of $(s^2 + 2\zeta_p \omega_p s + \omega_p^2)\Phi_m = g_p \delta_{lat}$ and $(s + \omega_p)p_m = g_p \delta_{lat}$, in the pitch axis by $(s^2 + 2\zeta_q \omega_q s + \omega_q^2)\theta_m = g_q \delta_{lon}$, and in the yaw axis by $(s^2 + 2\zeta_r \omega_r s + \omega_r^2)\beta_m = g_r \delta_{rud}$, where $\Phi_m$, $\theta_m$, and $\beta_m$ are the reference bank, pitch, and sideslip angles, $\omega_p$, $\omega_q$, and $\omega_r$ are the natural frequencies for desired handling qualities in the roll, pitch, and yaw axes, $\zeta_p$, $\zeta_q$, and $\zeta_r$ are the desired damping ratios, $\delta_{lat}$, $\delta_{lon}$, and $\delta_{rud}$ are the lateral stick input, longitudinal stick input, and rudder pedal input, and $g_p$, $g_q$, and $g_r$ are the input gains;

representing the reference model in a state-space form as $\dot{x}_m = -K_p x_m - K_i \int_0^t x_m d\tau + Gr$, where $x_m = [p_m \ q_m \ r_m]^T = [\dot{\Phi}_m \ \dot{\theta}_m \ \dot{\beta}_m]^T$, $K_p = \text{diag}(2\zeta_p \omega_p, 2\zeta_q \omega_q, 2\zeta_r \omega_r)$, $K_i = \text{diag}(\omega_p^2, \omega_q^2, \omega_r^2) = \Omega^2$, $G = \text{diag}(g_p, g_q, g_r)$, and $r = [\delta_{lat} \ \delta_{lon} \ \delta_{rud}]^T$;

using a proportional-integral (PI) dynamic inversion feedback controller with adaptive augmentation control to improve aircraft rate response characteristics specified by at least one of $u = B_1^{-1}(\dot{x}_m - A_{11}x - A_{12}z + u_e - u_{ad})$, where $u_e = K_p(x_m - x) + K_i \int_0^t (x_m - x) d\tau$ is a nominal PI error compensator, and $u_{ad} = \Theta_1^T \Phi(x,u)$ is an adaptive augmentation controller, and $u = B_1^T (B_1 B_1^T)^{-1}(\dot{x}_m - A_{11}x - A_{12}z + u_e - u_{ad})$;

modeling a tracking error as $e = [\int_0^1 (x_m - x) d\tau \ x_m - x]^T$ in a tracking error equation $\dot{e} = A_m e + B[\Theta_1^T \Phi(x,z) - f_1(x,z)]$, where $$A_m = \begin{bmatrix} 0 & I \\ -K_i & -K_p \end{bmatrix} \text{ and } B = \begin{bmatrix} 0 \\ I \end{bmatrix};$$

estimating the parametric uncertainty $\Theta^*_1$ by an optimal control modification adaptive law for a nominal PI feedback controller specified by at least one of $\dot{\Theta}_1 = -\Gamma[\Phi(x,z) e^T P - \nu \Phi(x,z) \Phi^T(x,z) \Theta_1 B^T P A_m^{-1}]B$, $\dot{\Theta}_1 = -\Gamma[\Phi(x,z) e^T PB + c\nu \Phi(x,z) \Phi^T(x,z) \Theta_1 K_i^{-2}]$, where $c > 0 \in R$ is a weighting constant, and $\dot{\Theta}_1 = -\Gamma[\Phi(x,z) e^T PB + c\nu \Phi(x,z) \Phi^T(x,z) \Theta_1 \Omega^{-4}]$.

3. The computer-implemented method of claim 2, further comprising:

using a proportional-integral-derivative (PID) dynamic inversion feedback controller with $u_e = K_p(x_m - x) + K_i \int_0^t (x_m - x) d\tau + K_d(\dot{x}_m - \dot{x})$, where $K_d = \text{diag}(k_{d_p}, k_{d_q}, k_{d_r})$;

modeling a tracking error as $e = [\int_0^1 (x_m - x) d\tau \ x_m - x]^T$ in a tracking error equation $\dot{e} = A_m e + B[\Theta_1^T \Phi(x,z) - f_1(x,z)]$, where $$A_m = \begin{bmatrix} 0 & I \\ -(I+K_d)^{-1} K_i & -(I+K_d)^{-1} K_p \end{bmatrix} \text{ and } B = \begin{bmatrix} 0 \\ (I+K_d)^{-1} \end{bmatrix};$$

estimating the parametric uncertainty $\Theta^*_1$ by an optimal control modification adaptive law for a nominal PID feedback controller specified by at least one of $\dot{\Theta}_1 = -\Gamma[\Phi(x,z) e^T P - \nu \Phi(x,z) \Phi^T(x,z) \Theta_1 B^T P A_m^{-1}]B$, $\dot{\Theta}_1 = -\Gamma[\Phi(x,z) e^T P(I+K_d)^{-1} B + c\nu \Phi(x,z) \Phi^T(x,z) \Theta_1 K_i^{-2}]$, where $$P(I+K_d)^{-1} B = c \begin{bmatrix} K_i^{-1} \\ K_p^{-1}[I + (I+K_d)K_i^{-1}] \end{bmatrix}, \text{ and}$$

$\dot{\Theta}_1 = -\Gamma[\Phi(x,z) e^T P(I+K_d)^{-1} B + c\nu \Phi(x,z) \Phi^T(x,z) \Theta_1 \Omega^{-4}]$.

4. The computer-implemented method of claim 2, further comprising:

modeling a first-order reference model in a state-space form $\dot{x}_m = -K_p x_m + Gr$ using a proportional dynamic inversion feedback controller with $u_e = K_p(x_m - x)$;

modeling a tracking error as $x_e = x_m - x$ in a tracking error equation $\dot{x}_e = -K_p x_e + \Theta_1^T \Phi(x,z) - f_1(x,z)$;

estimating the parametric uncertainty $\Theta^*_1$ by an optimal control modification adaptive law for a nominal proportional feedback controller specified by at least one of $\dot{\Theta}_1 = -\Gamma[\Phi(x,z) x_e^T P + \nu \Phi(x,z) \Phi^T(x,z) \Theta_1 P K_p^{-1}]$, and $\dot{\Theta}_1 = -c\Gamma[\Phi(x,z) x_e^T K_p^{-1} + \nu \Phi(x,z) \Phi^T(x,z) \Theta_1 K_p^{-2}]$.

5. The computer-implemented methods of claim 1, further comprising:

accessing an adaptive gain matrix $\Gamma$ allowed to be time-varying;

calculating, with a processor, optimal control modification adaptive laws with time-varying adaptive gain $\Gamma(t)$;

using a covariance adaptive gain adjustment method described by at least one of $\dot{\Gamma} = -\eta\Gamma\Phi(x)\Phi^T(x)\Gamma$, where $0 \leq \eta < \nu\lambda_{min}(B^T A_m^{-T} QA_m^{-1}B) \in R$ is an adjustment parameter which depends on the modification parameter $\nu$, and $0 \leq \nu < \nu_{max}$ where $\nu_{max}$ has no limit if the basis function $\Phi(x)$ is bounded such that $\|\Phi(x)\| \leq \Phi_0$ or $$\nu_{max} = \frac{\lambda_{min}(Q)\lambda_{min}(B^T A_m^{-T} QA_m^{-1}B)}{2\|B^T PA_m^{-1}B\|^2 \Theta_0^2} \left[1 + \sqrt{1 - \frac{4\eta\|B^T PA_m^{-1}B\|^2 \Theta_0^2}{\lambda_{min}(Q)\lambda_{min}^2(B^T A_m^{-T} QA_m^{-1}B)}}\right]$$

if the basis function $\Phi(x)$ belongs to a class of functions such that $\|\Phi(x)\| \leq \|x\|$ or $$\nu_{max} = \frac{2\lambda_{min}(B^T A_m^{-T} QA_m^{-1}B)\|PB\|^2}{\lambda_{min}(Q)\|B^T PA_m^{-1}B\|^2} \left[1 + \sqrt{1 - \frac{\eta\lambda_{min}(Q)\|B^T PA_m^{-1}B\|^2}{\lambda_{min}^2(B^T A_m^{-T} QA_m^{-1}B)\|PB\|^2}}\right]$$

if the uncertainty $\Theta^{*T}\Phi(x)$ is non-destabilizing and the feedback control system without adaptation is robustly stable, $\dot{\Gamma} = -\eta\Gamma\Phi(x)\Phi^T(x)\Gamma$, where $\eta > 0 \in R^{m \times m}$ is an adjustment matrix whose elements are the adjustment parameters for each individual element of the adaptive gain matrix such that $0 \leq \lambda_{max}(\eta) < \nu\lambda_{min}(B^T A_m^{-T} QA_m^{-1}B) \in R$ is the stability condition, $$\dot{\Gamma} = \frac{\eta\Gamma\Phi(x)\Phi^T(x)\Gamma}{1 + \Phi^T(x)R\Phi(x)},$$

where $R = R^T > 0$ is a positive-definite normalization matrix, $\dot{\Gamma} = \beta\Gamma - \eta\Gamma\Phi(x)\Phi^T(x)\Gamma$, where $\beta = \beta^T > 0$ is the forgetting factor matrix, $$\dot{\Gamma}_{ij} = \begin{cases} [\beta\Gamma - \eta\Gamma\Phi(x)\Phi^T(x)\Gamma]_{ij} & \text{if } \Gamma_{ij} \leq \Gamma_{ij}(t_0) \\ 0 & \text{otherwise} \end{cases},$$

$$\dot{\Gamma} = \beta\Gamma - \frac{\eta\Gamma\Phi(x)\Phi^T(x)\Gamma}{1 + \Phi^T(x)R\Phi(x)}, \text{ and}$$

$$\dot{\Gamma}_{ij} = \begin{cases} \left[\beta\Gamma - \frac{\eta\Gamma\Phi(x)\Phi^T(x)\Gamma}{1 + \Phi^T(x)R\Phi(x)}\right]_{ij} & \text{if } \Gamma_{ij} \leq \Gamma_{ij}(t_0) \\ 0 & \text{otherwise} \end{cases};$$

using any of the aforementioned covariance adaptive gain adjustment methods with a resetting mechanism described by $$\dot{\Gamma} = \begin{cases} \dot{\Gamma} \text{ with } \Gamma(t_i) = \Gamma_i & t \geq t_i \text{ when threshold is exceeded at } t = t_i \\ \dot{\Gamma} \text{ with } \Gamma(0) = \Gamma_0 & \text{otherwise} \end{cases},$$

where $\Gamma_i$ is a properly chosen new initial condition for the covariance adaptive gain adjustment method for $t \geq t_i$ when a new uncertainty becomes present, and $\Gamma_i$ is phased in by a first-order filter $\dot{\Gamma} = -\lambda(\Gamma - \Gamma_i)$ or any order filter so chosen for $t \in [t_i, t_i + n\Delta t]$, where $\lambda > 0$, $\Gamma = \Gamma(t)$ as $t = t_i - \Delta t$ computed from the previous time step and $n\Delta t$ is the duration of transition from some previous adaptive gain value to the new initial condition $\Gamma_i$ where n can be selected appropriately to ensure $\Gamma \to \Gamma_i$ to within a specified tolerance.

6. The computer-implemented methods of claim 2, further comprising:

accessing an adaptive gain matrix $\Gamma$ allowed to be time-varying;

calculating, with a processor, optimal control modification adaptive laws with a time-varying adaptive gain $\Gamma(t)$;

using a covariance adaptive gain adjustment method described by at least one of $\dot{\Gamma} = -\eta\Gamma\Phi(x)\Phi^T(x)\Gamma$, where $0 \leq \eta < \nu\lambda_{min}(B^T A_m^{-T} QA_m^{-1}B) \in R$ is an adjustment parameter which depends on the modification parameter $\nu$, and $0 \leq \nu < \nu_{max}$ where $\nu_{max}$ has no limit if the basis function $\Phi(x)$ is bounded such that $\|\Phi(x)\| \leq \Phi_0$ or $$\nu_{max} = \frac{\lambda_{min}(Q)\lambda_{min}(B^T A_m^{-T} QA_m^{-1}B)}{2\|B^T PA_m^{-1}B\|^2 \Theta_0^2} \left[1 + \sqrt{1 - \frac{4\eta\|B^T PA_m^{-1}B\|^2 \Theta_0^2}{\lambda_{min}(Q)\lambda_{min}^2(B^T A_m^{-T} QA_m^{-1}B)}}\right]$$

if the basis function $\Phi(x)$ belongs to a class of functions such that $\|\Phi(x)\| \leq \|x\|$ or $$\nu_{max} = \frac{2\lambda_{min}(B^T A_m^{-T} QA_m^{-1}B)\|PB\|^2}{\lambda_{min}(Q)\|B^T PA_m^{-1}B\|^2} \left[1 + \sqrt{1 - \frac{\eta\lambda_{min}(Q)\|B^T PA_m^{-1}B\|^2}{\lambda_{min}^2(B^T A_m^{-T} QA_m^{-1}B)\|PB\|^2}}\right]$$

if the uncertainty $\Theta^{*T}\Phi(x)$ is non-destabilizing and the feedback control system without adaptation is robustly stable, $\dot{\Gamma} = -\eta\Gamma\Phi(x)\Phi^T(x)\Gamma$, where $\eta > 0 \in R^{m \times m}$ is an adjustment matrix whose elements are the adjustment parameters for each individual element of the adaptive gain matrix such that $0 \leq \lambda_{max}(\eta) < \nu\lambda_{min}(B^T A_m^{-T} QA_m^{-1}B) \in R$ is the stability condition, $$\dot{\Gamma} = -\frac{\eta\Gamma\Phi(x)\Phi^T(x)\Gamma}{1 + \Phi^T(x)R\Phi(x)},$$

where $R = R^T > 0$ is a positive-definite normalization matrix, $\dot{\Gamma} = \beta\Gamma - \eta\Gamma\Phi(x)\Phi^T(x)\Gamma$, where $\beta = \beta^T > 0$ is the forgetting factor matrix, $$\dot{\Gamma}_{ij} = \begin{cases} [\beta\Gamma - \eta\Gamma\Phi(x)\Phi^T(x)\Gamma]_{ij} & \text{if } \Gamma_{ij} \leq \Gamma_{ij}(t_0) \\ 0 & \text{otherwise} \end{cases},$$

-continued $$\dot{\Gamma} = \beta\Gamma - \frac{\eta\Gamma\Phi(x)\Phi^T(x)\Gamma}{1+\Phi^T(x)R\Phi(x)}, \text{ and}$$

$$\dot{\Gamma}_{ij} = \begin{cases} \left[\beta\Gamma - \frac{\eta\Gamma\Phi(x)\Phi^T(x)\Gamma}{1+\Phi^T(x)R\Phi(x)}\right]_{ij} & \text{if } \Gamma_{ij} \leq \Gamma_{ij}(t_0) \\ 0 & \text{otherwise} \end{cases};$$

using any of the aforementioned covariance adaptive gain adjustment methods with a resetting mechanism described by $$\dot{\Gamma} = \begin{cases} \dot{\Gamma} \text{ with } \Gamma(t_i) = \Gamma_i & t \geq t_i \text{ when threshold is exceeded at } t = t_i \\ \dot{\Gamma} \text{ with } \Gamma(0) = \Gamma_0 & \text{otherwise} \end{cases},$$

where $\Gamma_i$ is a properly chosen new initial condition for the covariance adaptive gain adjustment method for $t \geq t_i$ when a new uncertainty becomes present, and $\Gamma_i$ is phased in by a first-order filter $\dot{\Gamma} = -\lambda(\Gamma - \Gamma_i)$ or any order filter so chosen for $t \in [t_i, t_i + n\Delta t]$, where $\lambda > 0$, $\Gamma = \Gamma(t)$ as $t = t_i - \Delta t$ computed from the previous time step and $n\Delta t$ is the duration of transition from some previous adaptive gain value to the new initial condition $\Gamma_i$ where n can be selected appropriately to ensure $\Gamma \to \Gamma_i$ to within a specified tolerance.

7. The computer-implemented methods of claim 3, further comprising:

accessing an adaptive gain matrix $\Gamma$ allowed to be time-varying;

calculating, with a processor, optimal control modification adaptive laws with time-varying adaptive gain $\Gamma(t)$;

using a covariance adaptive gain adjustment method described by at least one of $\dot{\Gamma} = -\eta\Gamma\Phi(x)\Phi^T(x)\Gamma$, where $0 \leq \eta < \nu\lambda_{min}(B^T A_m^{-T} Q A_m^{-1} B) \in R$ is an adjustment parameter which depends on the modification parameter $\nu$, and $0 \leq \nu < \nu_{max}$ where $\nu_{max}$ has no limit if the basis function $\Phi(x)$ is bounded such that $\|\Phi(x)\| \leq \Phi_0$ or $$\nu_{max} = \frac{\lambda_{min}(Q)\lambda_{min}(B^T A_m^{-T} Q A_m^{-1} B)}{2\|B^T P A_m^{-1} B\|^2 \Theta_0^2}\left[1 + \sqrt{1 - \frac{4\eta\|B^T P A_m^{-1} B\|^2 \Theta_0^2}{\lambda_{min}(Q)\lambda_{min}^2(B^T A_m^{-T} Q A_m^{-1} B)}}\right]$$

if the basis function $\Phi(x)$ belongs to a class of functions such that $\|\Phi(x)\| \leq \|x\|$ or $$\nu_{max} = \frac{2\lambda_{min}(B^T A_m^{-T} Q A_m^{-1} B)\|PB\|^2}{\lambda_{min}(Q)\|B^T P A_m^{-1} B\|^2}\left[1 + \sqrt{1 - \frac{\eta\lambda_{min}(Q)\|B^T P A_m^{-1} B\|^2}{\lambda_{min}^2(B^T A_m^{-T} Q A_m^{-1} B)\|PB\|^2}}\right]$$

if the uncertainty $\Theta^{*T}\Phi(x)$ is non-destabilizing and the feedback control system without adaptation is robustly stable, $\dot{\Gamma} = -\eta\Gamma\Phi(x)\Phi^T(x)\Gamma$, where $\eta > 0 \in R^{m \times m}$ is an adjustment matrix whose elements are the adjustment parameters for each individual element of the adaptive gain matrix such that $0 \leq \lambda_{max}(\eta) < \nu\lambda_{min}(B^T A_m^{-T} Q A_m^{-1} B) \in R$ is the stability condition, $$\dot{\Gamma} = -\frac{\eta\Gamma\Phi(x)\Phi^T(x)\Gamma}{1+\Phi^T(x)R\Phi(x)},$$

where $R = R^T > 0$ is a positive-definite normalization matrix, $\dot{\Gamma} = \beta\Gamma - \eta\Gamma\Phi(x)\Phi^T(x)\Gamma$, where $\beta = \beta^T > 0$ is the forgetting factor matrix, $$\dot{\Gamma}_{ij} = \begin{cases} [\beta\Gamma - \eta\Gamma\Phi(x)\Phi^T(x)\Gamma]_{ij} & \text{if } \Gamma_{ij} \leq \Gamma_{ij}(t_0) \\ 0 & \text{otherwise} \end{cases},$$

$$\dot{\Gamma} = \beta\Gamma - \frac{\eta\Gamma\Phi(x)\Phi^T(x)\Gamma}{1+\Phi^T(x)R\Phi(x)}, \text{ and}$$

$$\dot{\Gamma}_{ij} = \begin{cases} \left[\beta\Gamma - \frac{\eta\Gamma\Phi(x)\Phi^T(x)\Gamma}{1+\Phi^T(x)R\Phi(x)}\right]_{ij} & \text{if } \Gamma_{ij} \leq \Gamma_{ij}(t_0) \\ 0 & \text{otherwise} \end{cases};$$

using any of the aforementioned covariance adaptive gain adjustment methods with a resetting mechanism described by $$\dot{\Gamma} = \begin{cases} \dot{\Gamma} \text{ with } \Gamma(t_i) = \Gamma_i & t \geq t_i \text{ when threshold is exceeded at } t = t_i \\ \dot{\Gamma} \text{ with } \Gamma(0) = \Gamma_0 & \text{otherwise} \end{cases},$$

where $\Gamma_i$ is a properly chosen new initial condition for the covariance adaptive gain adjustment method for $t \geq t_i$ when a new uncertainty becomes present, and $\Gamma_i$ is phased in by a first-order filter $\dot{\Gamma} = -\lambda(\Gamma - \Gamma_i)$ or any order filter so chosen for $t \in [t_i, t_i + n\Delta t]$, where $\lambda > 0$, $\Gamma = \Gamma(t)$ as $t = t_i - \Delta t$ computed from the previous time step and $n\Delta t$ is the duration of transition from some previous adaptive gain value to the new initial condition $\Gamma_i$ where n can be selected appropriately to ensure $\Gamma \to \Gamma_i$ to within a specified tolerance.

8. The computer-implemented methods of claim 4, further comprising:

accessing an adaptive gain matrix $\Gamma$ allowed to be time-varying;

calculating, with a processor, optimal control modification adaptive laws with time-varying adaptive gain $\Gamma(t)$;

using a covariance adaptive gain adjustment method described by at least one of $\dot{\Gamma} = -\eta\Gamma\Phi(x)\Phi^T(x)\Gamma$, where $0 \leq \eta < \nu\lambda_{min}(B^T A_m^{-T} Q A_m^{-1} B) \in R$ is an adjustment parameter which depends on the modification parameter $\nu$, and $0 \leq \nu < \nu_{max}$ where $\nu_{max}$ has no limit if the basis function $\Phi(x)$ is bounded such that $\|\Phi(x)\| \leq \Phi_0$ or $$\nu_{max} = \frac{\lambda_{min}(Q)\lambda_{min}(B^T A_m^{-T} Q A_m^{-1} B)}{2\|B^T P A_m^{-1} B\|^2 \Theta_0^2}\left[1 + \sqrt{1 - \frac{4\eta\|B^T P A_m^{-1} B\|^2 \Theta_0^2}{\lambda_{min}(Q)\lambda_{min}^2(B^T A_m^{-T} Q A_m^{-1} B)}}\right]$$

if the basis function $\Phi(x)$ belongs to a class of functions such that $\|\Phi(x)\| \le \|x\|$ or $$v_{max} = \frac{2\lambda_{min}(B^T A_m^{-T} Q A_m^{-1} B) \|PB\|^2}{\lambda_{min}(Q) \|B^T P A_m^{-1} B\|^2} \left[ 1 + \sqrt{1 - \frac{\eta \lambda_{min}(Q) \|B^T P A_m^{-1} B\|^2}{\lambda_{min}^2(B^T A_m^{-T} Q A_m^{-1} B) \|PB\|^2}} \right]$$

if the uncertainty $\Theta^{*T}\Phi(x)$ is non-destabilizing and the feedback control system without adaptation is robustly stable, $\dot{\Gamma} = -\eta \Gamma \Phi(x) \Phi^T(x) \Gamma$, where $\eta > 0 \in R^{m \times m}$ is an adjustment matrix whose elements are the adjustment parameters for each individual element of the adaptive gain matrix such that $0 \le \lambda_{max}(\eta) < \nu \lambda_{min}(B^T A_m^{-T} Q A_m^{-1} B) \in R$ is the stability condition, $$\dot{\Gamma} = -\frac{\eta \Gamma \Phi(x) \Phi^T(x) \Gamma}{1 + \Phi^T(x) R \Phi(x)},$$

where $R = R^T > 0$ is a positive-definite normalization matrix, $\dot{\Gamma} = \beta \Gamma - \eta \Gamma \Phi(x) \Phi^T(x) \Gamma$, where $\beta = \beta^T > 0$ is the forgetting factor matrix, $$\dot{\Gamma}_{ij} = \begin{cases} [\beta \Gamma - \eta \Gamma \Phi(x) \Phi^T(x) \Gamma]_{ij} & \text{if } \Gamma_{ij} \le \Gamma_{ij}(t_0) \\ 0 & \text{otherwise} \end{cases},$$

$$\dot{\Gamma} = \beta \Gamma - \frac{\eta \Gamma \Phi(x) \Phi^T(x) \Gamma}{1 + \Phi^T(x) R \Phi(x)}, \text{ and}$$

$$\dot{\Gamma}_{ij} = \begin{cases} \left[\beta \Gamma - \frac{\eta \Gamma \Phi(x) \Phi^T(x) \Gamma}{1 + \Phi^T(x) R \Phi(x)}\right]_{ij} & \text{if } \Gamma_{ij} \le \Gamma_{ij}(t_0) \\ 0 & \text{otherwise} \end{cases};$$

using any of the aforementioned covariance adaptive gain adjustment methods with a resetting mechanism described by $$\Gamma = \begin{cases} \dot{\Gamma} \text{ with } \Gamma(t_i) = \Gamma_i & t \ge t_i \text{ when threshold is exceeded at } t = t_i \\ \dot{\Gamma} \text{ with } \Gamma(0) = \Gamma_0 & \text{otherwise} \end{cases},$$

where $\Gamma_i$ is a properly chosen new initial condition for the covariance adaptive gain adjustment method for $t \ge t_i$ when a new uncertainty becomes present, and $\Gamma_i$ is phased in by a first-order filter $\dot{\Gamma} = -\lambda(\Gamma - \Gamma_i)$ or any order filter so chosen for $t \in [t_i, t_i + n\Delta t]$, where $\lambda > 0$, $\Gamma = \Gamma(t)$ at $t = t_i - \Delta t$ computed from the previous time step and $n\Delta t$ is the duration of transition from some previous adaptive gain value to the new initial condition $\Gamma_i$ where n can be selected appropriately to ensure $\Gamma \to \Gamma_i$ to within a specified tolerance.

9. The computer-implemented method of claim 6, further comprising:
  accessing an adaptive gain matrix $\Gamma$ allowed to be time-varying;
  calculating, with a processor, optimal control modification adaptive laws with time-varying adaptive gain $\Gamma(t)$;
  using an adaptive gain normalization method described by $$\Gamma(t) = \frac{\Gamma}{1 + \Phi^T(x) R \Phi(x)},$$

where $\Gamma$ on the right hand side is a constant adaptive gain matrix and $R = R^T > 0 \in R^{m \times m}$ is a positive-definite normalization matrix such that $0 \le R < R_{max}$ whereupon $$\Phi^T(x) R_{max} \Phi(x) \le c_{12} = \frac{\nu \lambda_{min}(Q) \lambda_{min}(B^T A_m^{-T} Q A_m^{-1} B)}{2\|PB\|^2} \times \times \left[ 1 + \sqrt{1 + \frac{4\|PB\|^2}{\nu \lambda_{min}(Q) \lambda_{min}(B^T A_m^{-T} Q A_m^{-1} B)}} \right]$$

10. The computer-implemented method of claim 7, further comprising:
  accessing an adaptive gain matrix $\Gamma$ allowed to be time-varying;
  calculating, with a processor, optimal control modification adaptive laws with time-varying adaptive gain $\Gamma(t)$;
  using an adaptive gain normalization method described by $$\Gamma(t) = \frac{\Gamma}{1 + \Phi^T(x) R \Phi(x)},$$

where $\Gamma$ on the right hand side is a constant adaptive gain matrix and $R = R^T > 0 \in R^{m \times m}$ is a positive-definite normalization matrix such that $0 \le R < R_{max}$ whereupon $$\Phi^T(x) R_{max} \Phi(x) \le c_{12} = \frac{\nu \lambda_{min}(Q) \lambda_{min}(B^T A_m^{-T} Q A_m^{-1} B)}{2\|PB\|^2} \times \times \left[ 1 + \sqrt{1 + \frac{4\|PB\|^2}{\nu \lambda_{min}(Q) \lambda_{min}(B^T A_m^{-T} Q A_m^{-1} B)}} \right]$$

11. The computer-implemented methods of claim 9, further comprising:
  accessing an adaptive gain matrix $\Gamma$ allowed to be time-varying;
  calculating, with a processor, optimal control modification adaptive laws with time-varying adaptive gain $\Gamma(t)$;
  combining at least one of the covariance adaptive gain adjustment methods with the adaptive gain normalization method.

12. The computer-implemented methods of claim 10, further comprising:
  accessing an adaptive gain matrix $\Gamma$ allowed to be time-varying;
  calculating, with a processor, optimal control modification adaptive laws with time-varying adaptive gain $\Gamma(t)$;
  combining at least one of the covariance adaptive gain adjustment with the adaptive gain normalization.

13. The computer-implemented method of claim 1, further comprising:
  modeling a physical system using a linear plant as $\dot{x} = Ax + B[u + f(x)] + w$, where $f(x) = \Theta^{*T} x$ is a matched uncertainty;
  using a feedback controller $u(t)$ specified by $u = -K_x x + K_r r - u_{ad}$, where $u_{ad} = \Theta^T x$ is an adaptive controller;
  estimating a parametric uncertainty by an optimal control modification adaptive law as $\dot{\Theta} = -\Gamma x(e^T P - \nu x^T \Theta B^T P A_m^{-1}) B$, where $0 \le \nu < \nu_{max}$;

using the linear asymptotic property whereupon $\dot{\Theta} \to 0$ as $t \to \infty$ or whereupon $\Gamma^{-1}\dot{\Theta} \to 0$ under fast adaptation as $\Gamma \to \infty$ to establish the equilibrium value of the adaptive controller as $u_{ad} = \Theta^T x = 1/\nu(B^T A_m^{-T} P B)^{-1} B^T P e$;

using the linear asymptotic property whereupon $\dot{\Theta} \to 0$ as $t \to \infty$ or whereupon $\Gamma^{-1}\dot{\Theta} \to 0$ under fast adaptation as $\Gamma \to \infty$ to establish the linear feedback control system in the limit as $\dot{x} = (A_m + 1/\nu P^{-1} A_m^T P + B\Theta^{*T})x - 1/\nu P^{-1} A_m^T P x_m + B_m r + w$, where the modification parameter $\nu$ can be established such that the matrix $A_m + 1/\nu P^{-1} A_m^T P + B\Theta^{*T}$ is a Hurwitz matrix to guarantee closed-loop stability of the adaptive control system;

using the linear asymptotic property whereupon $\dot{\Theta} \to 0$ as $t \to \infty$ or whereupon $\Gamma^{-1}\dot{\Theta} \to 0$ under fast adaptation as $\Gamma \to \infty$ to analyze the stability margins of the linear feedback control system in the limit using linear time-invariant (LTI) methods to provide robustness of the adaptive control system;

using the linear asymptotic property whereupon $\dot{\Theta} \to 0$ as $t \to \infty$ or whereupon $\Gamma^{-1}\dot{\Theta} \to 0$ under fast adaptation as $\Gamma \to \infty$ to compute the steady state tracking error in the limit as $t \to \infty$ or $\Gamma \to \infty$ as $\lim_{t \to \infty}\|e\| = \|-A_m^{-1}B_m + (A_m + 1/\nu P^{-1}A_m^T P + B\Theta^{*T})^{-1}(1/\nu P^{-1}A_m^T P A_m^{-1} + I)B_m\|\|r\|_\infty$ which exhibits a linear input-output mapping to guarantee performance and provide predictability of the adaptive control system.

14. The computer-implemented method of claim 1, further comprising:

modeling a physical system using a input-delay linear plant as $\dot{x} = Ax + B[u(t-t_d) + f(x)] +$, where $f(x) = \Theta^{*T}x$ is a matched uncertainty and $t_d$ is a given input time delay;

using the linear asymptotic property whereupon $\dot{\Theta} \to 0$ as $t \to \infty$ or whereupon $\Gamma^{-1}\dot{\Theta} \to 0$ under fast adaptation as $\Gamma \to \infty$ to establish the linear feedback control system in the limit as $\dot{x} = (A + B\Theta^{*T})x + (-BK_x x + 1/\nu P^- A_m^T P)x(t-t_d) - 1/\nu P^{-1} A_m^T P x_m(t-t_d) + B_m r(t-t_d) + w$, where the modification parameter $\nu$ can be established such that the matrix $A_m + 1/\nu P^{-1} A_m^T P + B\Theta^{*T}$ is a Hurwitz and the stability condition $\det(j\omega - A_c + A_d e^{-j\omega t_d}) = 0$ is satisfied or alternatively using the matrix measure method $$t_d \le \frac{1}{\omega}\cos^{-1}\left[\frac{\overline{\mu}(A_c) + \overline{\mu}(jA_d)}{\|A_d\|}\right],$$

where $$\omega = \overline{\mu}(-jA_c) + \|A_d\|, A_c = \begin{bmatrix} A + B\Theta^{*T} & 0 & 0 \\ 0 & A_m & 0 \\ 0 & 0 & \frac{1}{t_d} \end{bmatrix}, \text{ and}$$

$$A_d = \begin{bmatrix} BK_x x - \frac{1}{\nu}P^{-1}A_m^T P & \frac{1}{\nu}P^{-1}A_m^T P & 0 \\ 0 & 0 & 0 \\ 0 & 0 & \frac{1}{t_d} \end{bmatrix}$$

to guarantee closed-loop stability of the input-delay adaptive control system;

using the linear asymptotic property whereupon $\dot{\Theta} \to 0$ as $t \to \infty$ or whereupon $\Gamma^{-1}\dot{\Theta} \to 0$ under fast adaptation as $\Gamma \to \infty$ to establish the linear feedback control system in the limit as $\dot{x} = (A + B\Theta^{*T})x + (-BK_x x + 1/\nu P^- A_m^T P)x(t-t_d) - 1/\nu P^{-1} A_m^T P x_m(t-t_d) + B_m r(t-t_d) + w$ when $r(t)$ is a constant command, where the modification parameter $\nu$ can be established such that the matrix $A_m + 1/\nu P^{-1} A_m^T P + B\Theta^{*T}$ is a Hurwitz and the stability condition $\det(j\omega - A_c + A_d e^{-j\omega t_d}) = 0$ is satisfied or alternatively using the matrix measure method $$t_d \le \frac{1}{\omega}\cos^{-1}\left[\frac{\overline{\mu}(A_c) + \overline{\mu}(jA_d)}{\|A_d\|}\right],$$

where $$\omega = \overline{\mu}(-jA_c) + \|A_d\|, A_c = \begin{bmatrix} A + B\Theta^{*T} & 0 \\ 0 & A_m \end{bmatrix},$$

$$A_d = \begin{bmatrix} BK_x x - \frac{1}{\nu}P^{-1}A_m^T P & \frac{1}{\nu}P^{-1}A_M^T P \\ 0 & 0 \end{bmatrix}$$

to guarantee closed-loop stability of the input-delay adaptive control system;

using the linear asymptotic property whereupon $\dot{\Theta} \to 0$ as $t \to \infty$ or whereupon $\Gamma^{-1}\dot{\Theta} \to 0$ under fast adaptation as $\Gamma \to \infty$ to establish the linear feedback control system in the limit as $\dot{x} = (A + B\Theta^{*T})x + (-BK_x x + 1/\nu P^- A_m^T P)x(t-t_d) + w$ when $x_m(t)$ and $r(t)$ are constant or zero for an adaptive regulator design, where the modification parameter $\nu$ can be established such that the matrix $A_m + 1/\nu P^{-1} A_m^T P + B\Theta^{*T}$ is a Hurwitz and the stability condition $\det[j\omega - A - B\Theta^{*T} + (BK_x x - 1/\nu P^{-1} A_m^T P)e^{-j\omega t_d}] = 0$ is satisfied or alternatively using the matrix measure method where $$t_d \le \frac{1}{\omega}\cos^{-1}\left[\frac{\overline{\mu}(A + B\Theta^{*T}) + \overline{\mu}\left(j\left[BK_x - \frac{1}{\nu}P^{-1}A_m^T P\right]\right)}{\left\|BK_x - \frac{1}{\nu}P^{-1}A_m^T P\right\|}\right],$$

where $\omega = \overline{u}(-jA - jB\Theta^{*T}) + \|BK_x - 1/\nu P^{-1}A_m^T P\|$ to guarantee closed-loop stability of the input-delay adaptive control system.

15. The computer-implemented method of claim 13, further comprising:

modeling a physical system using an input-delay linear plant as $\dot{x} = Ax + B[u(t-t_d) + f(x)] + w$, where $f(x) = \Theta^{*T}x$ is a matched uncertainty and $t_d$ is a given input time delay;

using the linear asymptotic property whereupon $\dot{\Theta} \to 0$ as $t \to \infty$ or whereupon $\Gamma^{-1}\dot{\Theta} \to 0$ under fast adaptation as $\Gamma \to \infty$ to establish the linear feedback control system in the limit as $\dot{x} = (A + B\Theta^{*T})x + (-BK_x x + 1/\nu P^- A_m^T P)x(t-t_d) - 1/\nu P^{-1} A_m^T P x_m(t-t_d) + B_m r(t-t_d) + w$, where the modification parameter $\nu$ can be established such that the matrix $A_m + 1/\nu P^{-1} A_m^T P + B\Theta^{*T}$ is a Hurwitz and the stability condition $\det(j\omega - A_c + A_d e^{-j\omega t_d}) = 0$ is satisfied or alternatively using the matrix measure method $$t_d \leq \frac{1}{\omega} \cos^{-1}\left[\frac{\bar{\mu}(A_c + \bar{\mu}(jA_d)}{\|A_d\|}\right],$$

where $$\omega = \bar{\mu}(-jA_c) + \|A_d\|, \; A_c = \begin{bmatrix} A + B\Theta^{*T} & 0 & 0 \\ 0 & A_m & 0 \\ 0 & 0 & \frac{1}{t_d} \end{bmatrix}, \text{ and}$$

$$A_d = \begin{bmatrix} BK_x x - \frac{1}{v}P^{-1}A_m^T P & \frac{1}{v}P^{-1}A_m^T P & 0 \\ 0 & 0 & 0 \\ 0 & 0 & \frac{1}{t_d} \end{bmatrix}$$

to guarantee closed-loop stability of the input-delay adaptive control system;

using the linear asymptotic property whereupon $\dot{\Theta} \to 0$ as $t \to \infty$ or whereupon $\Gamma^{-1}\dot{\Theta} \to 0$ under fast adaptation as $\Gamma \to \infty$ to establish the linear feedback control system in the limit as $\dot{x}=(A+B\Theta^{*T})x+(-BK_x x+1/vP^{-}A_m^T P)x(t-t_d)-1/vP^{-1}A_m^T Px_m(t-t_d)+B_m r(t-t_d)+w$ when $r(t)$ is a constant command, where the modification parameter $v$ can be established such that the matrix $A_m+1/vP^{-1}A_m^T P+B\Theta^{*T}$ is a Hurwitz and the stability condition $\det(j\omega - A_c + A_d e^{-j\omega t_d})=0$ is satisfied or alternatively using the matrix measure method $$t_d \leq \frac{1}{\omega} \cos^{-1}\left[\frac{\bar{\mu}(A_c + \bar{\mu}(jA_d)}{\|A_d\|}\right], \text{ where}$$

$$\omega = \bar{\mu}(-jA_c) + \|A_d\|, \; A_c = \begin{bmatrix} A + B\Theta^{*T} & 0 \\ 0 & A_m \end{bmatrix},$$

and $$A_d = \begin{bmatrix} BK_x x - \frac{1}{v}P^{-1}A_m^T P & \frac{1}{v}P^{-1}A_M^T P \\ 0 & 0 \end{bmatrix}$$

to guarantee closed-loop stability of the input-delay adaptive control system;

using the linear asymptotic property whereupon $\dot{\Theta} \to 0$ as $t \to \infty$ or whereupon $\Gamma^{-1}\dot{\Theta} \to 0$ under fast adaptation as $\Gamma \to \infty$ to establish the linear feedback control system in the limit as $\dot{x}=(A+B\Theta^{*T})x+(-BK_x x+1/vP^{-}A_m^T P)x(t-t_d)+w$ when $x_m(t)$ and $r(t)$ are constant or zero for an adaptive regulator design, where the modification parameter $v$ can be established such that the matrix $A_m+1/vP^{-1}A_m^T P+B\Theta^{*T}$ is a Hurwitz and the stability condition $\det[j\omega - A - B\Theta^{*T}+(BK_x x-1/vP^{-1}A_m^T P) e^{-\omega t_d}]=0$ is satisfied or alternatively using the matrix measure method $$t_d \leq \frac{1}{\omega} \cos^{-1}\left[\frac{\bar{\mu}(A+B\Theta^{*T}) + \bar{\mu}\left(j\left[BK_x - \frac{1}{v}P^{-1}A_m^T P\right]\right)}{\left\|BK_x - \frac{1}{v}P^{-1}A_m^T P\right\|}\right],$$

where $\omega = \bar{u}(-jA - jB\Theta^{*T})+\|BK_x - 1/vP^{-1}A_m^T P\|$ to guarantee closed-loop stability of the input-delay adaptive control system.

16. The computer-implemented method of claim 1, further comprising:

modeling a physical system using an input-delay linear plant as $\dot{x}=Ax+B[u(t-t_d)+f(x)]+w$, where $f(x)=\Theta^{*T}x$ is a matched uncertainty and $t_d$ is a given input time delay;

using the linear asymptotic property whereupon $\dot{\Theta} \to 0$ as $t \to \infty$ or whereupon $\Gamma^{-1}\dot{\Theta} \to 0$ under fast adaptation as $\Gamma \to \infty$ to establish the linear feedback control system in the limit as $\dot{x}=(A+B\Theta^{*T})x+(-BK_x x+1/vP^{-1}A_m^T P)x(t-t_d)-1/vP^{-1}A_m^T Px_m(t-t_d)+B_m r(t-t_d)+w$, where the modification parameter $v$ can be established such that the matrix $A_m+1/vP^{-1}A_m^T P+B\Theta^{*T}$ is a Hurwitz and the stability condition $\det(j\omega - A_c + A_d e^{-j\omega t_d})=0$ is satisfied or alternatively using the matrix measure method $$t_d \leq \frac{1}{\omega} \cos^{-1}\left[\frac{\bar{\mu}(A_c + \bar{\mu}(jA_d)}{\|A_d\|}\right],$$

where $$\omega = \bar{\mu}(-jA_c) + \|A_d\|, \; A_c = \begin{bmatrix} A + B\Theta^{*T} & 0 & 0 \\ 0 & A_m & 0 \\ 0 & 0 & \frac{1}{t_d} \end{bmatrix}, \text{ and}$$

$$A_d = \begin{bmatrix} BK_x x - \frac{1}{v}P^{-1}A_m^T P & \frac{1}{v}P^{-1}A_m^T P & 0 \\ 0 & 0 & 0 \\ 0 & 0 & \frac{1}{t_d} \end{bmatrix}$$

to guarantee closed-loop stability of the input-delay adaptive control system;

using the linear asymptotic property whereupon $\dot{\Theta} \to 0$ as $t \to \infty$ or whereupon $\Gamma^{-1}\dot{\Theta} \to 0$ under fast adaptation as $\Gamma \to \infty$ to establish the linear feedback control system in the limit as $\dot{x}=(A+B\Theta^{*T})x+(-BK_x x+1/vP^{-1}A_m^T P)x(t-t)-1/vP^{-1}A_m^T Px_m(t-t_d)+B_m r(t-t_d)+w$ when $r(t)$ is a constant command, where the modification parameter $v$ can be established such that the matrix $A_m+1/vP^{-1}A_m^T P+B\Theta^{*T}$ is a Hurwitz and the stability condition $\det(j\omega - A_c+A_d e^{j\omega t_d})=0$ is satisfied or alternatively using the matrix measure method $$t_d \leq \frac{1}{\omega} \cos^{-1}\left[\frac{\bar{\mu}(A_c) + \bar{\mu}(jA_d)}{\|A_d\|}\right], \text{ where}$$

$$\omega = \bar{\mu}(-jA_c) + \|A_d\|, \; A_c = \begin{bmatrix} A + B\Theta^{*T} & 0 \\ 0 & A_m \end{bmatrix},$$

and $$A_d = \begin{bmatrix} BK_x x - \frac{1}{v}P^{-1}A_m^T P & \frac{1}{v}P^{-1}A_m^T P \\ 0 & 0 \end{bmatrix}$$

to guarantee closed-loop stability of the input-delay adaptive control system;

using the linear asymptotic property whereupon $\dot{\Theta} \to 0$ as $t \to \infty$ or whereupon $\Gamma^{-1}\dot{\Theta} \to 0$ under fast adaptation as $\Gamma \to \infty$ to establish the linear feedback control system in the limit as $\dot{x} = (A+B\Theta^{*T})x + (-BK_x x + 1/vP^{-1}A_m^T P)x(t-t_d) + w$ when $x_m(t)$ and $r(t)$ are constant or zero for an adaptive regulator design, where the modification parameter $v$ can be established such that the matrix $A_m + 1/vP^{-1}A_m^T P + B\Theta^{*T}$ is a Hurwitz and the stability condition $\det[j\omega - A - B\Theta^{*T} + (BK_x x - 1/vP^{-1}A_m^T P)e^{-j\omega t_d}] = 0$ is satisfied or alternatively using the matrix measure method $$t_d \leq \frac{1}{\omega} \cos^{-1}\left[\frac{\bar{\mu}(A+B\Theta^{*T}) + \bar{\mu}\left(j\left[BK_x - \frac{1}{v}P^{-1}A_m^T P\right]\right)}{\left\|BK_x - \frac{1}{v}P^{-1}A_m^T P\right\|}\right],$$

where $\omega = \bar{u}(-jA-jB\Theta^{*T}) + \|BK_x - 1/vP^{-1}A_m^T P\|$ to guarantee closed-loop stability of the input-delay adaptive control system.

17. A computer-implemented method for adaptive control of a physical system such as an aircraft, the method comprising:

modeling a physical system with unmodeled dynamics or non-minimum phase behaviors using an input-output transfer function as $$y = W_p(s)u = k_p \frac{Z_p(s)}{R_p(s)} u,$$

where $k_p$ is a high-frequency gain, and $Z_p(s)$ and $R_p(s)$ are monic Hurwitz polynomials of degrees $m_p$ and $n_p$, respectively, and $n_p - m_p \geq 1$;

modeling a reference model using a transfer function as $$y_m = W_m(s)r = k_m \frac{Z_m(s)}{R_m(s)} r,$$

where $k_m$ is a high-frequency gain, and $Z_m(s)$ and $R_m(s)$ are monic Hurwitz polynomials degrees $m_m$ and $n_m$, respectively, and $n_m - m_m \geq 1$;

specifying $n_p - m_p > n_m - m_m$, so that the strictly positive real (SPR) condition is no longer possible to ensure tracking of the reference model;

using an adaptive controller $u = k_y y + k_r r$ with the optimal control modification adaptive laws $\dot{k}_y = \gamma_y(ye - vx^2 k_y)$ and $\dot{k}_r = \gamma_r(re - vr^2 k_r)$;

using the linear asymptotic property whereupon $\dot{k}_{yb} \to 0$ and $\dot{k}_r \to 0$ as $t \to \infty$ or whereupon $\gamma_y^{-1}\dot{k}_y \to 0$ and $\gamma_r^{-1}\dot{k}_r \to 0$ under fast adaptation as $\gamma_y \to \infty$ and $\gamma_r \to \infty$ to establish the equilibrium value of the adaptive controller as $$\bar{u} = \frac{2y_m - 2y}{v};$$

using the linear asymptotic property whereupon $\dot{k}_y \to 0$ and $\dot{k}_r \to 0$ as $t \to \infty$ or whereupon $\gamma_y^{-1}\dot{k}_y \to 0$ ad $\gamma_r^{-1}\dot{k}_r \to 0$ under fast adaptation as $\gamma_y \to \infty$ and $\gamma_r \to \infty$ to establish the linear feedback control system in the limit as $$\bar{y} = W_c(s)r = \frac{2k_m k_p Z_p(s) Z_m(s)}{R_m(s)(vR_p(s) + 2k_p Z_p(s))} r,$$

where the modification parameter $v$ can be established such that he linear asymptotic closed-loop transfer function $W_c(s)$ is stable.

18. The computer-implemented method for adaptive control of an aircraft of claim 17, further comprising:

modeling an aircraft using a linear plant as $$\begin{bmatrix} \dot{p} \\ q \\ \dot{q} \end{bmatrix} = \begin{bmatrix} -(\omega_p + \theta_p) & 1 & 0 \\ 0 & 0 & 1 \\ 0 & -(\omega_p^2 + \theta_{q_1}) & -(2\zeta_p\omega_p + \theta_{q_2}) \end{bmatrix} \begin{bmatrix} p \\ \int_0^t q\,d\tau \\ q \end{bmatrix} +$$

$$\begin{bmatrix} 1 & 0 \\ 0 & 0 \\ 0 & 1 \end{bmatrix} \begin{bmatrix} u_p - \sigma_p \\ u_q - \sigma_q \end{bmatrix}, \text{ where } \theta_p, \theta_{q_1},$$

and $\theta_{q_2}$ the uncertain parameters, and $\sigma_p(t)$ and $\sigma_q(t)$ are scalar, time-varying uncertain disturbances;

modeling the pitch axis reference model as a second order reference model and the roll axis reference model as a first order reference model as $$\begin{bmatrix} \dot{p}_m \\ q_m \\ \dot{q}_m \end{bmatrix} = \begin{bmatrix} -\omega_p & 1 & 0 \\ 0 & 0 & 1 \\ 0 & -\omega_q^2 & -2\zeta_q\omega_q \end{bmatrix} \begin{bmatrix} p_m \\ \int_0^t q_m\,d\tau \\ q_m \end{bmatrix} + \begin{bmatrix} 1 & 0 \\ 0 & 0 \\ 0 & 1 \end{bmatrix} \begin{bmatrix} r_p \\ r_q \end{bmatrix},$$

where the pilot commands $r_p(t)$ and $r_q(t)$ are computed from the pilot stick inputs $\delta_{lat}(t)$ and $\delta_{lon}(t)$ according to $$\begin{bmatrix} r_p \\ r_q \end{bmatrix} = \begin{bmatrix} \left(\frac{r_{max}}{\alpha}\right) k_p \omega_p \delta_{lat} \\ k_q \omega_q^2 \left[\delta_{lon} + L_\alpha \int_0^t \delta_{lon}\,d\tau\right] \end{bmatrix};$$

using a nonlinear dynamic inversion controller as $\delta = B_\delta^{-1}[I\dot{x}_{cmd} + \Omega \times I\Omega - \hat{f}_A(y)] + \delta_0$, where the vector of estimated aerodynamic moments $\hat{f}_A(y)$ is calculated from the on-board aerodynamic lookup tables, while the angular rates $\Omega$ are measured using aircraft sensors, I is the inertia matrix of the aircraft, $\delta_0$ are pre-determined trim surface commands appropriate for the test flight condition, and $B_\delta^{-1}$ is a weighted pseudo-inverse of the control effectiveness derivatives with respect to the surface positions weighted by a control allocation matrix computed as $B_\delta^{-1} = W^{-1}B_\delta^T(B_\delta W^{-1}B_\delta^T)^{-1}$;

modeling the angular acceleration commands $$\dot{x}_{cmd}(t) = \dot{x}_{ref} + \dot{x}_c + \dot{x}_a = \begin{bmatrix} \dot{p}_{ref} + \dot{p}_c + \dot{p}_a \\ \dot{q}_{ref} + \dot{q}_c + \dot{q}_a \\ \dot{r}_{ref} + \dot{r}_c \end{bmatrix}$$

as the sum of the desired reference dynamics $\dot{x}_{ref}(t)$ produced by the nonlinear dynamic inversion reference model, the output $\dot{x}_c(t)$ of the error compensator, and adaptive control augmentation $\dot{x}_a(t)$;

using the nonlinear dynamic inversion adaptive flight controller to cancel out the effects of the uncertain parameters $\theta_p$, $\theta_{q_1}$, $\theta_{q_2}$, $\sigma_p(t)$, and $\sigma_q(t)$ by the adaptive augmentation controller $$\begin{bmatrix} u_p \\ u_q \end{bmatrix} = \begin{bmatrix} r_p + \dot{p}_a \\ r_p + \dot{q}_a \end{bmatrix}, \text{ where } \begin{bmatrix} \dot{p}_a \\ \dot{q}_a \end{bmatrix} = \begin{bmatrix} \hat{\theta}_p p + \hat{\sigma}_p \\ \hat{\theta}_{q_1} \int_0^t q d\tau + \hat{\theta}_{q_2} q + \hat{\sigma}_q \end{bmatrix};$$

estimating the uncertain parameters by the optimal control modification adaptive laws with adaptive gain normalization as $$\dot{\hat{\theta}}_p = \frac{\Gamma_{\theta_p}}{1 + N_{\theta_p} p^2} \left( p \tilde{p} P_p B_{m_p} + v_{\theta_p} p^2 \hat{\theta}_p B_{m_p}^T P_p A_{m_p}^{-1} B_{m_p} \right)$$

and $$\dot{\hat{\theta}}_q = \frac{\Gamma_{\theta_q}}{1 + x_q^T N_{\theta_q} x_p} \left( x_q \tilde{x}_q^T P_q B_{m_q} + v_{\theta_q} x_q x_q^T \hat{\theta}_q B_{m_q}^T P_q A_{m_q}^{-1} B_{m_q} \right), \text{ where}$$

$$\hat{\theta}_q = \begin{bmatrix} \hat{\theta}_{q_1} & \hat{\theta}_{q_2} \end{bmatrix}^T, \tilde{p} = p_m - p,$$

$$x_q = \begin{bmatrix} \int_0^t q d\tau & q \end{bmatrix}^T, \text{ and } \tilde{x}_p = \begin{bmatrix} \int_0^t (q_m - q) d\tau & q_m - q \end{bmatrix}^T;$$

rejecting disturbances by the optimal control modification adaptive laws with adaptive gain normalization plus disturbance rejection as $$\dot{\hat{\sigma}}_p = \frac{\Gamma_{\sigma_p}}{1 + N_{\sigma_p} p^2} \left( \tilde{p} P_p B_{m_p} + v_{\sigma_p} \hat{\sigma}_p B_{m_p}^T P_p A_{m_p}^{-1} B_{m_p} \right)$$

and $$\dot{\hat{\sigma}}_q = \frac{\Gamma_{\sigma_q}}{1 + x_q^T N_{\sigma_q} x_p} \left( \tilde{x}_q^T P_q B_{m_q} + v_{\sigma_q} \hat{\sigma}_q B_{m_q}^T P_q A_{m_q}^{-1} B_{m_q} \right).$$

\* \* \* \* \*